(12) United States Patent
Bandy

(10) Patent No.: US 10,161,473 B2
(45) Date of Patent: Dec. 25, 2018

(54) PROCESS FOR CONSTRUCTING THE MULTIPLE STAGE AIR SHOCK

(71) Applicant: Ronald Scott Bandy, Visalia, CA (US)

(72) Inventor: Ronald Scott Bandy, Visalia, CA (US)

( * ) Notice: Subject to any disclaimer, the term of this patent is extended or adjusted under 35 U.S.C. 154(b) by 157 days.

(21) Appl. No.: 14/935,423

(22) Filed: Nov. 8, 2015

(65) Prior Publication Data

US 2017/0130798 A1    May 11, 2017
US 2018/0128340 A9    May 10, 2018

Related U.S. Application Data

(63) Continuation-in-part of application No. 13/854,055, filed on Mar. 30, 2013, now abandoned.

(51) Int. Cl.
     *F16F 9/06*      (2006.01)
     *F16F 9/32*      (2006.01)
     *F16F 9/00*      (2006.01)

(52) U.S. Cl.
     CPC ............ *F16F 9/3271* (2013.01); *F16F 9/006* (2013.01); *F16F 9/06* (2013.01); *B60G 2202/152* (2013.01); *B60G 2206/82* (2013.01); *F16F 2226/04* (2013.01); *F16F 2238/02* (2013.01)

(58) Field of Classification Search
     CPC .. F16F 9/3271; F16F 2238/02; F16F 2226/04; B60G 2206/82; B60G 2202/152
See application file for complete search history.

(56) References Cited

U.S. PATENT DOCUMENTS

| | | | |
|---|---|---|---|
| 2,774,447 | A | 12/1956 | de Carbon |
| 3,971,551 | A | 7/1976 | Kendall et al. |
| 4,352,417 | A | 10/1982 | Stinson |
| 5,624,105 | A | 4/1997 | Runkel |
| 7,100,908 | B2 | 9/2006 | Bergmeier et al. |
| 7,478,708 | B2 | 1/2009 | Bugaj |
| 8,714,321 | B2 | 5/2014 | Powell |
| 8,967,346 | B2 | 3/2015 | Polakowski et al. |
| 8,991,841 | B2 | 3/2015 | Holden et al. |

(Continued)

OTHER PUBLICATIONS

Billavista, The Fox Air Shox Report, pirate4x4.com, 2003.
(Continued)

*Primary Examiner* — Jun Yoo
(74) *Attorney, Agent, or Firm* — Kenny Nguyen; Eastman & McCartney LLP

(57) ABSTRACT

Disclosed herein is a process suitable for constructing the multiple stage air shock. The multiple stage air shock is unique among shocks in that the multiple stage design possesses qualities not available to other shock absorbers. The process includes a means for determining the compressed and extended lengths of the air shock based on the lengths of the parts for each stage. This means refers to one methodology and offers the air shock an extended length that is greater than twice its compressed length, an optimized extended length, and a construction capability based on adding stages. In particular, the extended length-compressed length relationship is a quality inherently unobtainable by current shock absorbers. The process also includes a means of determining the spring rate. This means refers to a second methodology and offers the capability to both set-up the air shock with a relatively linear spring rate and make the relatively linear spring rate more linear.

9 Claims, 30 Drawing Sheets

(56) References Cited

U.S. PATENT DOCUMENTS

2011/0101579 A1* 5/2011 Polakowski ........... B60G 15/12
    267/64.26
2014/0291085 A1* 10/2014 Bandy .................... F16F 9/006
    188/269

OTHER PUBLICATIONS

Air Shock Technical-Air Shocks 4 Rocks, 4wheeloffroad.com, Feb. 2009.
Gustavo, Air Shocks Spring Rates, bajasae.net, Jun. 7, 2010.
Calijk, Beast, Building a 6.1 Hemi Powered JK on 43s, jkowners.com, Oct. 5, 2012.
Solid Brass Telescope (Spyglass), robindocksideshop.com.

* cited by examiner

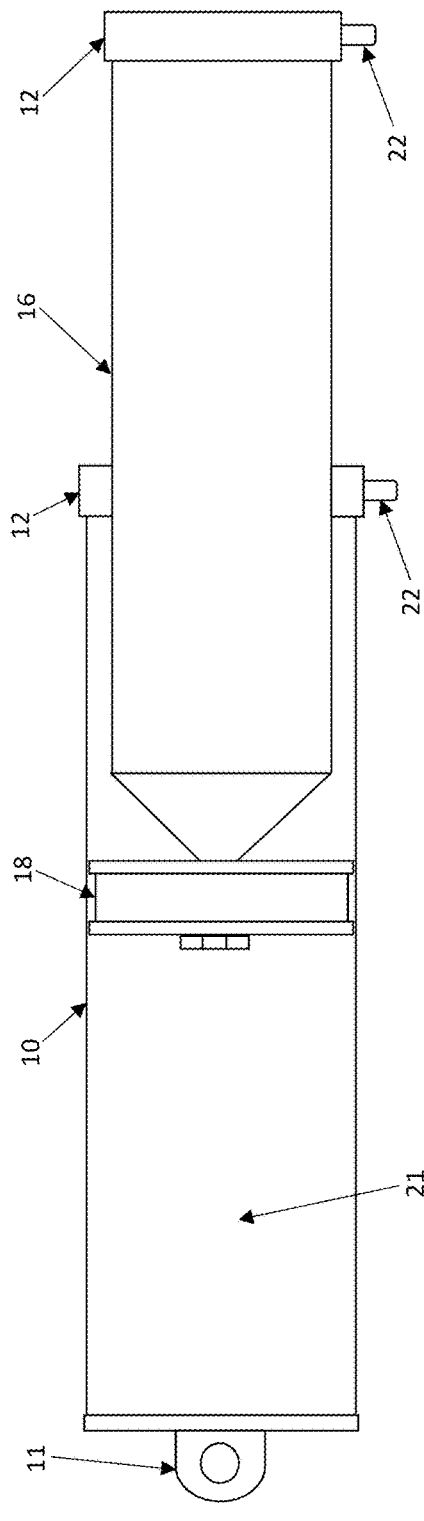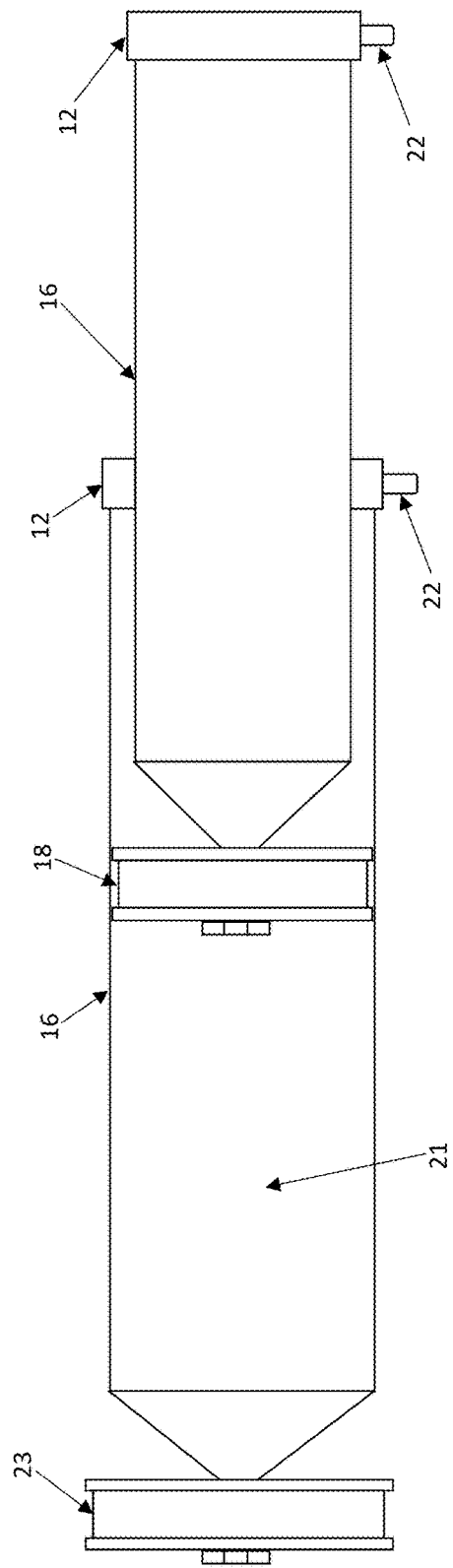
Fig. 12
Fig. 13

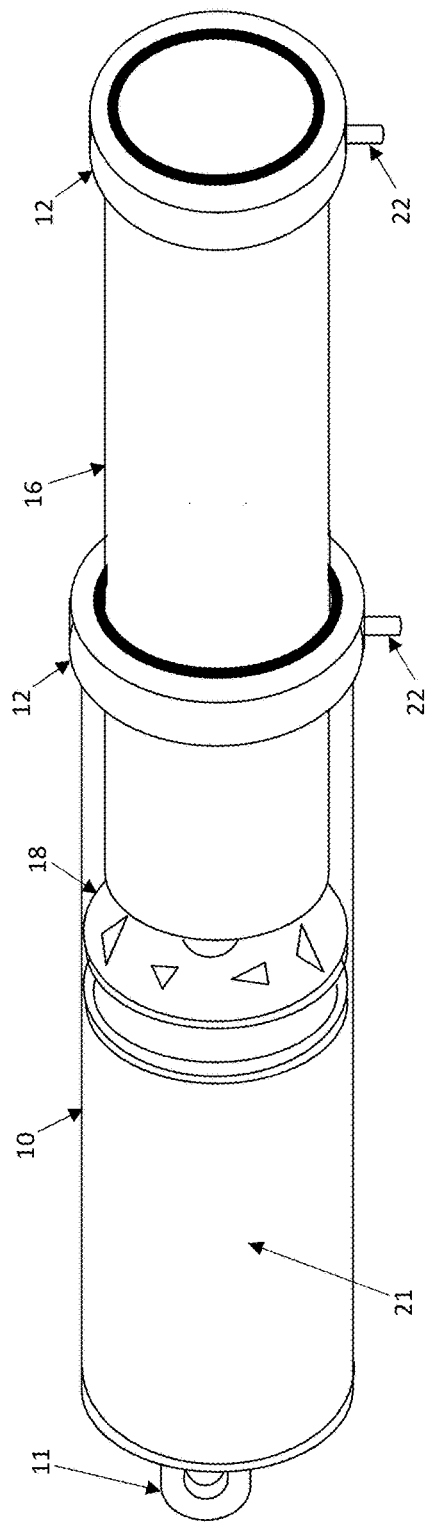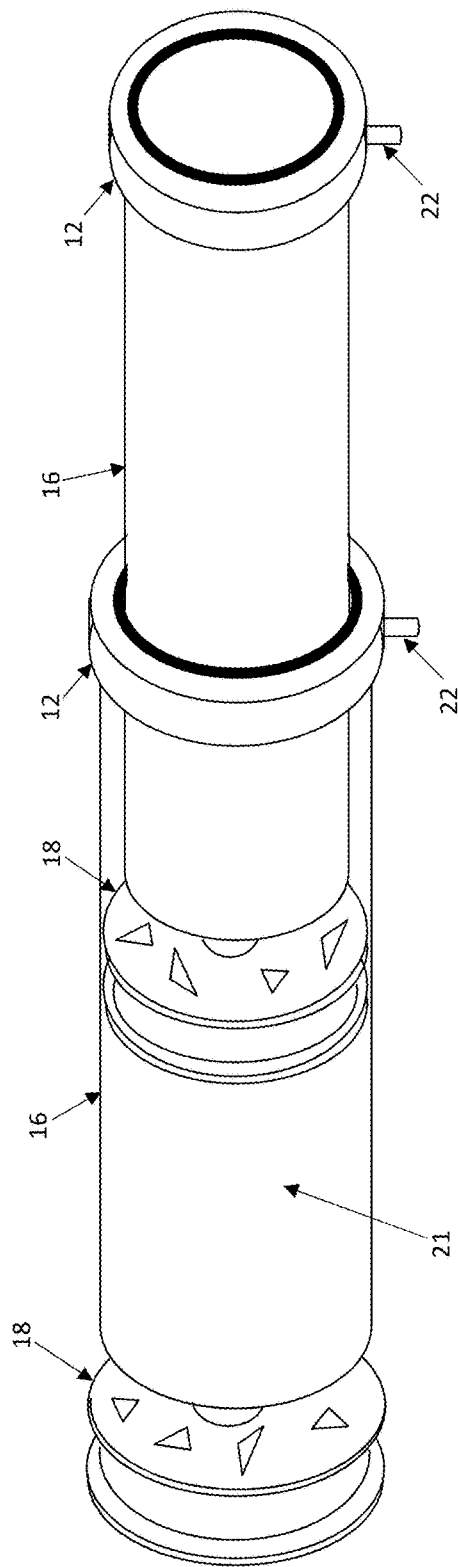

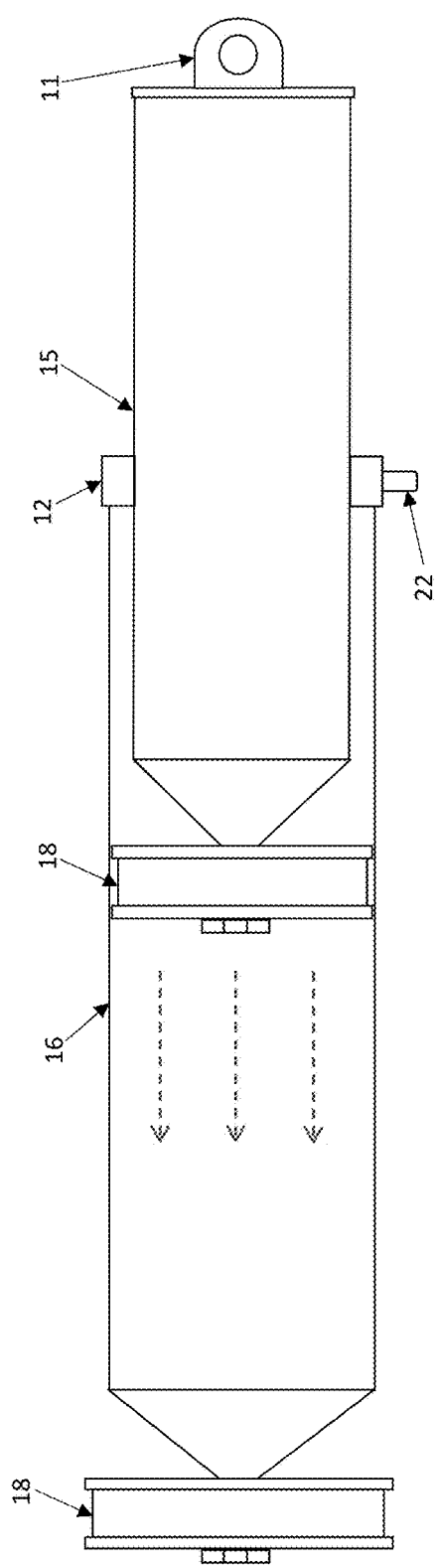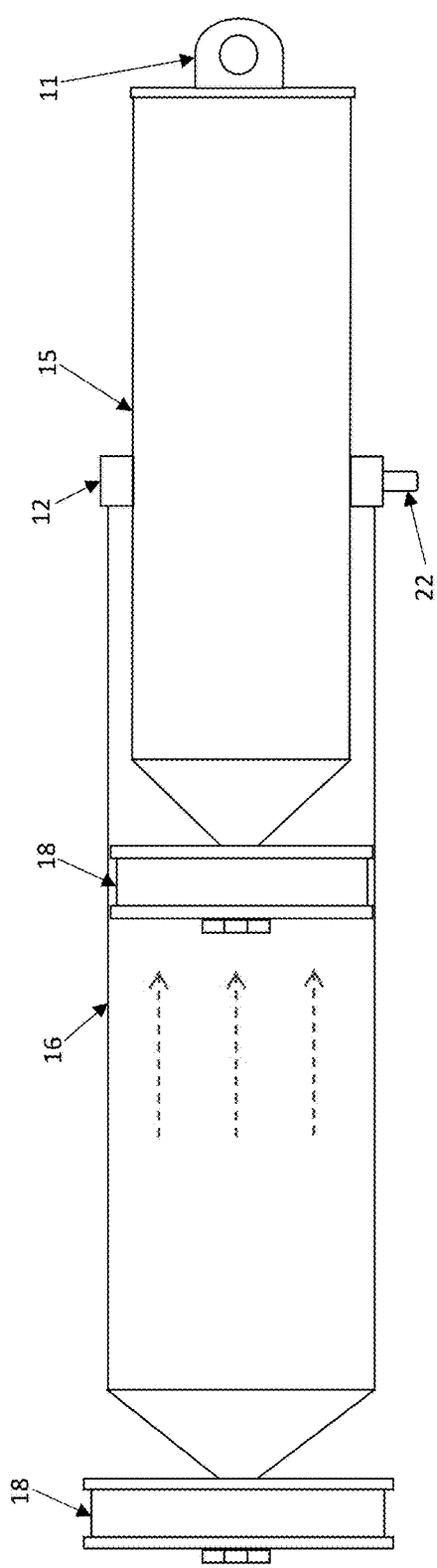

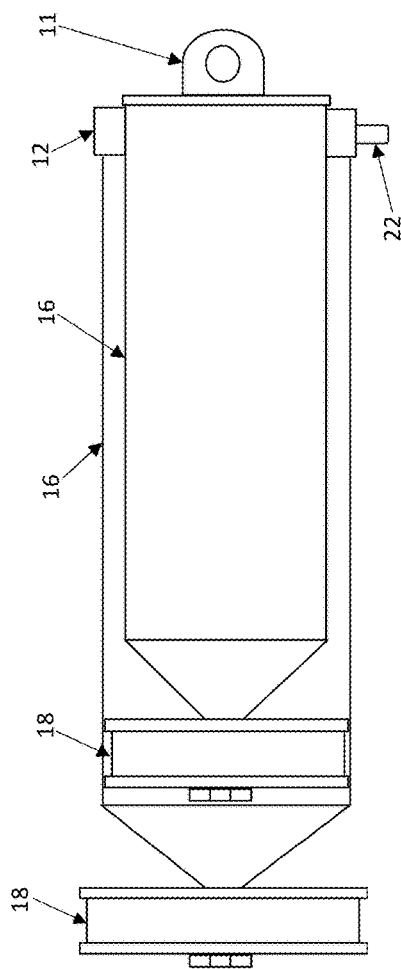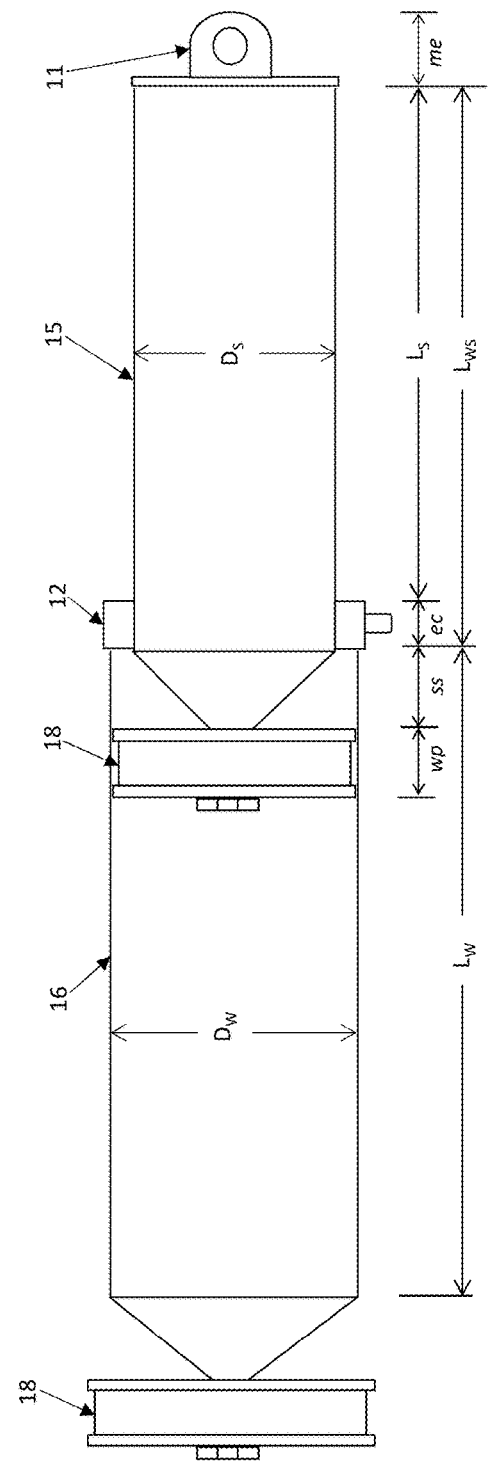

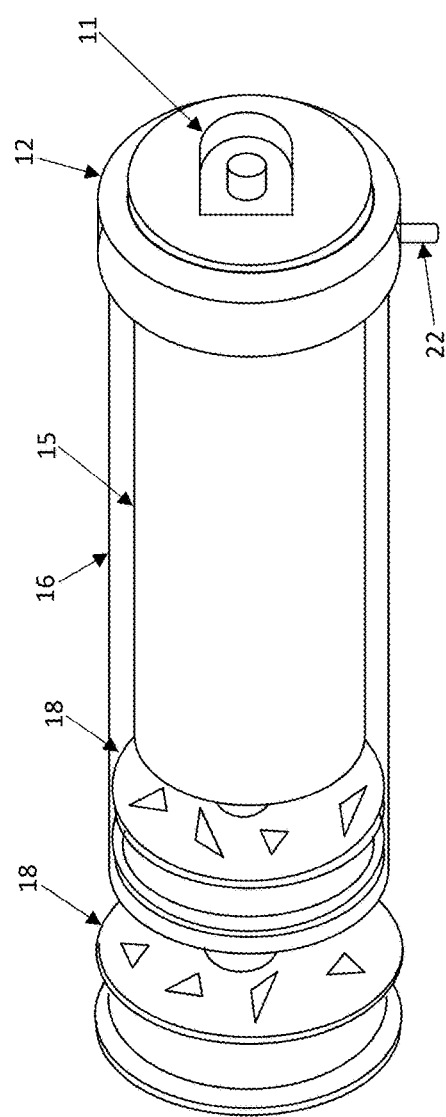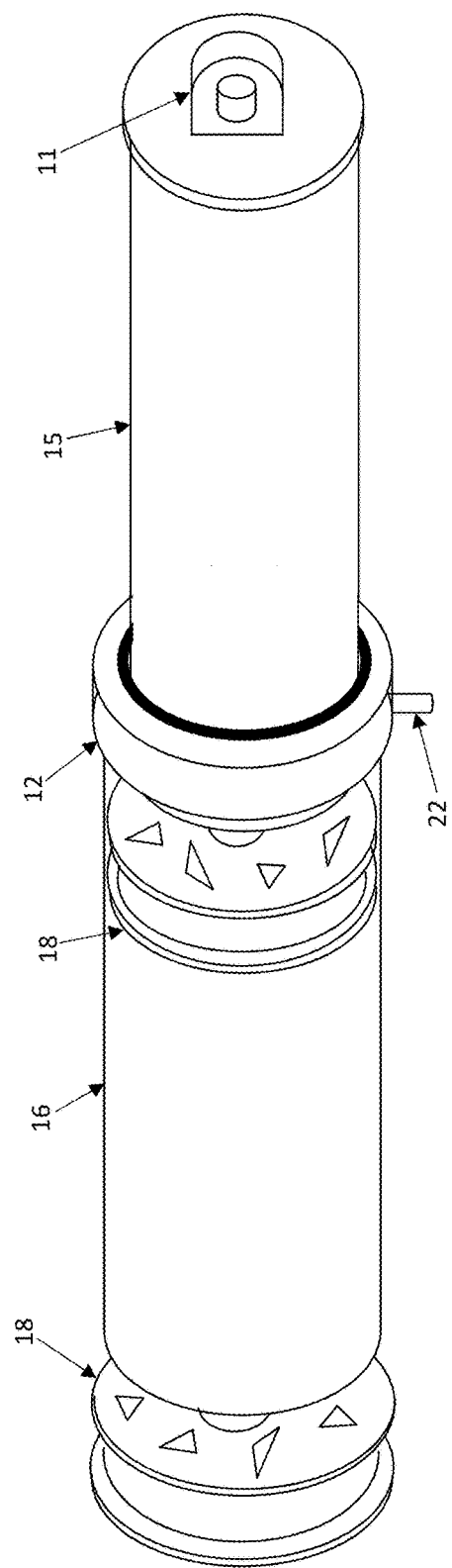

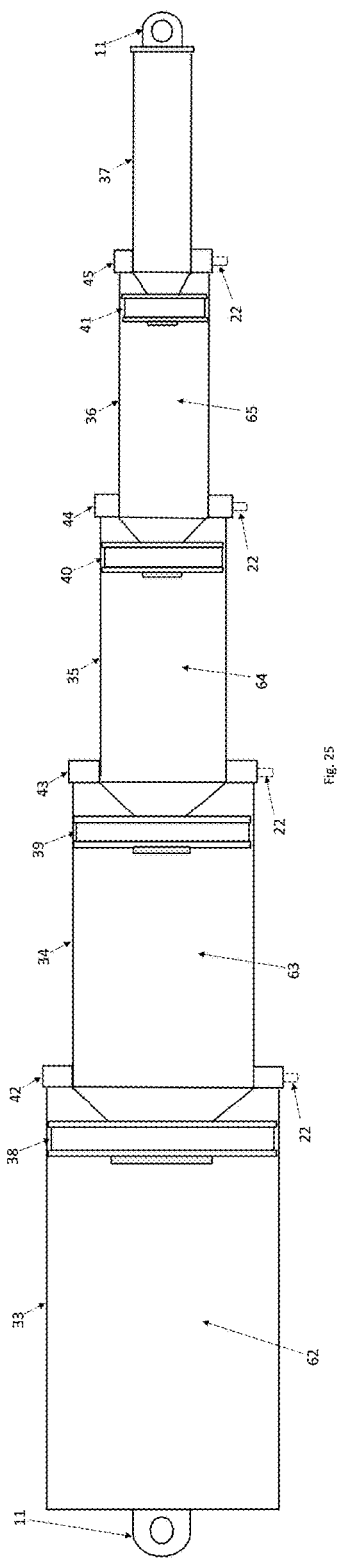
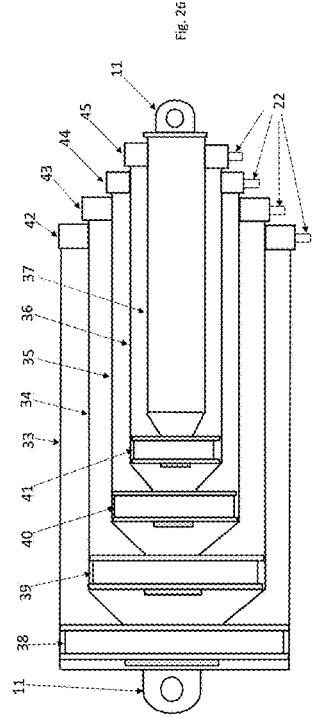
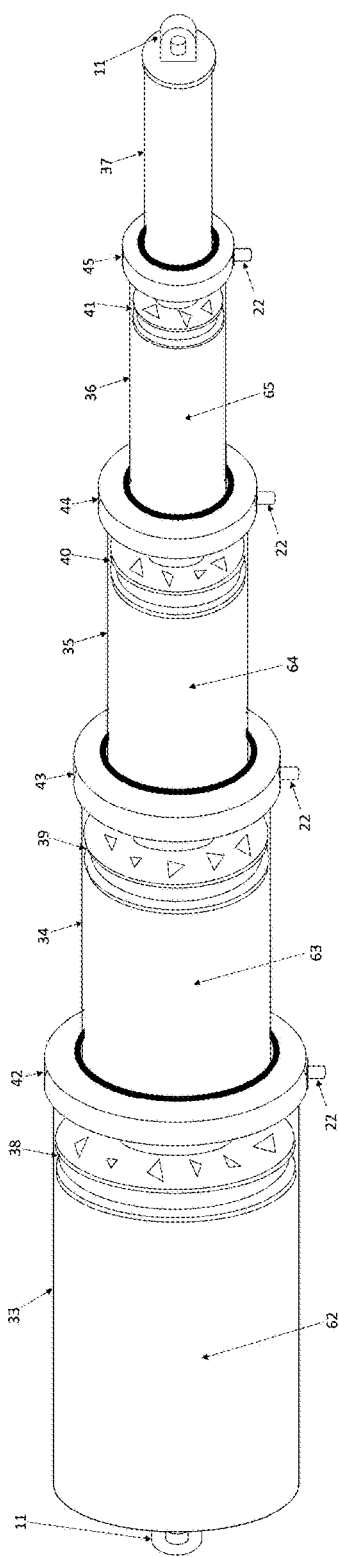
Fig. 25
Fig. 26
Fig. 27

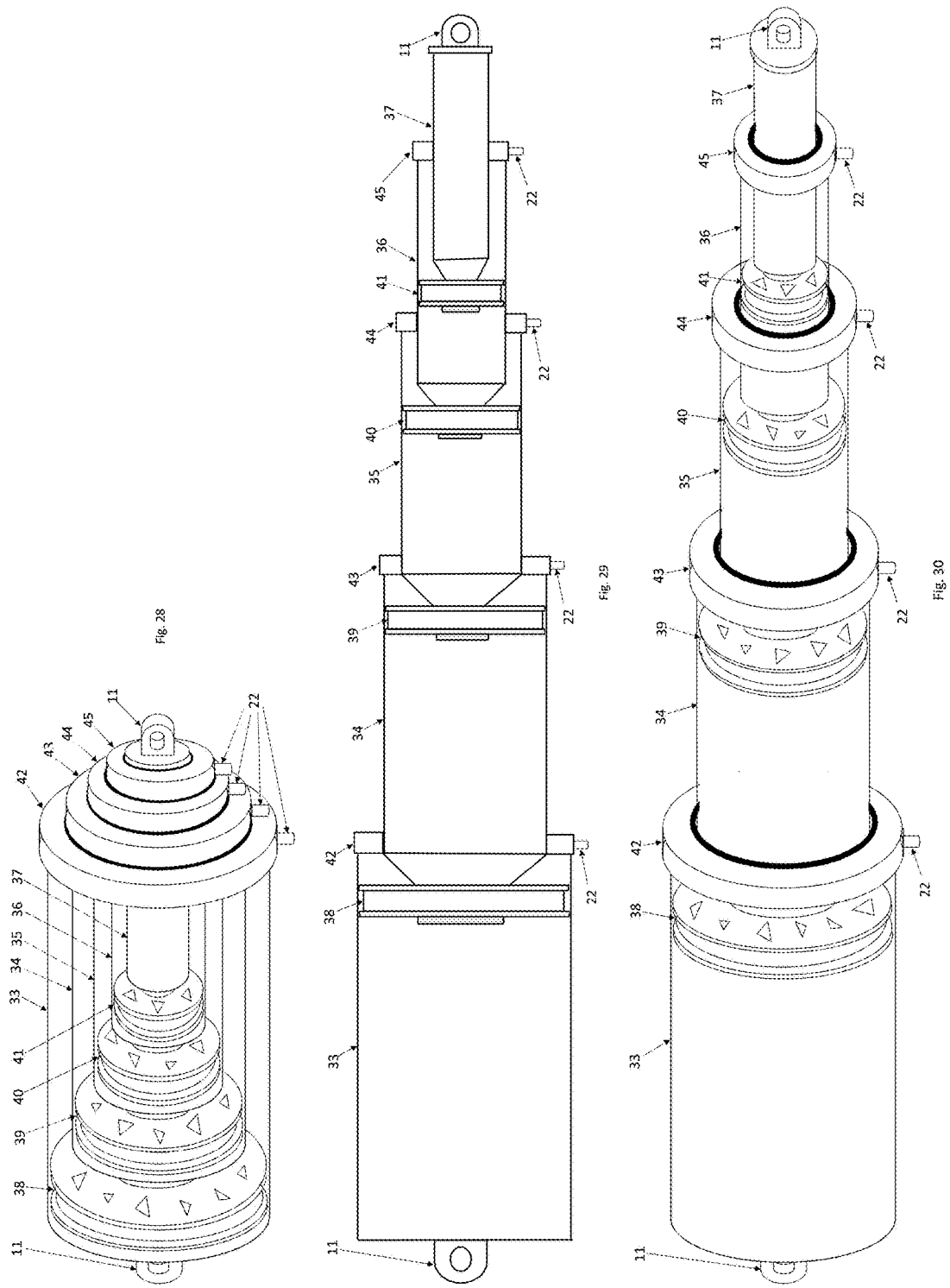

(1) where: $L_{W1} = L_{W0} - wp_1 - ss_1 + ec_1,$
$L_{W2} = L_{W1} - wp_2 - ss_2 + ec_2,$
$L_{W3} = L_{W2} - wp_3 - ss_3 + ec_3,$ therefore: $L_{Wn} = L_{W(n-1)} - wp_n - ss_n + ec_n,$ where n =1-3

(2) where: $L_{S1} = L_{W0} - wp_1 - ss_1,$
$L_{S2} = L_{W1} - wp_2 - ss_2,$
$L_{S3} = L_{W2} - wp_3 - ss_3,$ therefore: $L_{Sn} = L_{W(n-1)} - wp_n - ss_n,$ where n =1-3

Fig. 38  $L_{x,1} = L_x - ec_{x+1}$  where: $X = 1-7$

Fig. 39  $L_{wn} = L_{wn-1} - wp_n - ss_n + ec_n$,  where $n = 1, 2, \cdots, 7$ and $L_{w0} \equiv L_1$ Fig. 40  $L_{s2} = L_x - wp_1 - ss_1$  where: $X = 1-8$ Fig. 41  $L_{sn} = L_{wn-1} - wp_n - ss_n$  where $X = 2-8$ and $n = 2, 3, \cdots, X$ Fig. 42  $CL_x = L_x + (2 \times me) + \Sigma ec_n$  where $X = 1-8$ and $n = 1, 2, \cdots, X$ Fig. 43  $EL_x = CL_x + \Sigma L_{sn}$  where $X = 1-8$ and $n = 1, 2, \cdots, X$ Fig. 44  $me$ (in) = 1.5

Fig. 45: Table 1

| n | $wp_n$ (in) | $ss_n$ (in) | $ec_n$ (in) |
|---|---|---|---|
| 1 | 0.500 | 0.5 | 0.5 |

Fig. 46: Table 2

| n | $wp_n$ (in) | $ss_n$ (in) | $ec_n$ (in) |
|---|---|---|---|
| 1 | 0.625 | 0.5 | 0.5 |
| 2 | 0.500 | 0.5 | 0.5 |

Fig. 47: Table 3

| n | $wp_n$ (in) | $ss_n$ (in) | $ec_n$ (in) |
|---|---|---|---|
| 1 | 0.750 | 0.5 | 0.5 |
| 2 | 0.625 | 0.5 | 0.5 |
| 3 | 0.500 | 0.5 | 0.5 |

Fig. 48: Table 4

| n | $wp_n$ (in) | $ss_n$ (in) | $ec_n$ (in) |
|---|---|---|---|
| 1 | 0.875 | 0.5 | 0.5 |
| 2 | 0.750 | 0.5 | 0.5 |
| 3 | 0.625 | 0.5 | 0.5 |
| 4 | 0.500 | 0.5 | 0.5 |

Fig. 49: Table 5

| n | $wp_n$ (in) | $ss_n$ (in) | $ec_n$ (in) |
|---|---|---|---|
| 1 | 1.000 | 0.5 | 0.5 |
| 2 | 0.875 | 0.5 | 0.5 |
| 3 | 0.750 | 0.5 | 0.5 |
| 4 | 0.625 | 0.5 | 0.5 |
| 5 | 0.500 | 0.5 | 0.5 |

Fig. 50: Table 6

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 0.875 | 0.5 | 0.5 |
| 4 | 0.750 | 0.5 | 0.5 |
| 5 | 0.625 | 0.5 | 0.5 |
| 6 | 0.500 | 0.5 | 0.5 |

Fig. 51: Table 7

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 1.000 | 0.5 | 0.5 |
| 4 | 0.875 | 0.5 | 0.5 |
| 5 | 0.750 | 0.5 | 0.5 |
| 6 | 0.625 | 0.5 | 0.5 |
| 7 | 0.500 | 0.5 | 0.5 |

Fig. 52: Table 8

| n | $wp_n$ (in) | $ss_n$ (in) | $ec_n$ (in) |
|---|---|---|---|
| 1 | 1.000 | 0.5 | 0.5 |
| 2 | 1.000 | 0.5 | 0.5 |
| 3 | 1.000 | 0.5 | 0.5 |
| 4 | 1.000 | 0.5 | 0.5 |
| 5 | 0.875 | 0.5 | 0.5 |
| 6 | 0.750 | 0.5 | 0.5 |
| 7 | 0.625 | 0.5 | 0.5 |
| 8 | 0.500 | 0.5 | 0.5 |

Fig. 53: Extended Length Data Table 1

| X | $L_X$ | $L_{W1}$ | $L_{W2}$ | $L_{W3}$ | $L_{W4}$ | $L_{W5}$ | $L_{W6}$ | $L_{W7}$ | $L_{S1}$ | $L_{S2}$ | $L_{S3}$ | $L_{S4}$ | $L_{S5}$ | $L_{S6}$ | $L_{S7}$ | $L_{S8}$ | $CL_X$ | $EL_X$ | $EL_X/CL_X$ |
|---|---|---|---|---|---|---|---|---|---|---|---|---|---|---|---|---|---|---|---|
| 1 | 8.00 | --- | --- | --- | --- | --- | --- | --- | 7.00 | --- | --- | --- | --- | --- | --- | --- | 11.50 | 18.50 | 1.61 |
| 2 | 7.50 | 6.88 | --- | --- | --- | --- | --- | --- | 6.38 | 5.88 | --- | --- | --- | --- | --- | --- | 11.50 | 23.75 | 2.07 |
| 3 | 7.00 | 6.25 | 5.63 | --- | --- | --- | --- | --- | 5.75 | 5.13 | 4.63 | --- | --- | --- | --- | --- | 11.50 | 27.00 | 2.35 |
| 4 | 6.50 | 5.63 | 4.88 | 4.25 | --- | --- | --- | --- | 5.13 | 4.38 | 3.75 | 3.25 | --- | --- | --- | --- | 11.50 | 28.00 | 2.43 |
| 5 | 6.00 | 5.00 | 4.13 | 3.38 | 2.75 | --- | --- | --- | 4.50 | 3.63 | 2.88 | 2.25 | 1.75 | --- | --- | --- | 11.50 | 26.50 | 2.30 |
| 6 | 5.50 | 4.50 | 3.50 | 2.63 | 1.88 | 1.25 | --- | --- | 4.00 | 3.00 | 2.13 | 1.38 | 0.75 | 0.25 | --- | --- | 11.50 | 23.00 | 2.00 |
| 7 | 5.00 | 4.00 | 3.00 | 2.00 | 1.13 | 0.38 | -0.25 | --- | 3.50 | 2.50 | 1.50 | 0.63 | -0.13 | -0.75 | -1.25 | --- | 11.50 | 17.50 | 1.52 |
| 8 | 4.50 | 3.50 | 2.50 | 1.50 | 0.50 | -0.38 | -1.13 | -1.75 | 3.00 | 2.00 | 1.00 | 0.00 | -0.88 | -1.63 | -2.25 | -2.75 | 11.50 | 10.00 | 0.87 |

Fig. 54: Extended Length Data Table 2

| X | $L_X$ | $L_{W1}$ | $L_{W2}$ | $L_{W3}$ | $L_{W4}$ | $L_{W5}$ | $L_{W6}$ | $L_{W7}$ | $L_{S1}$ | $L_{S2}$ | $L_{S3}$ | $L_{S4}$ | $L_{S5}$ | $L_{S6}$ | $L_{S7}$ | $L_{S8}$ | $CL_X$ | $EL_X$ | $EL_X/CL_X$ |
|---|---|---|---|---|---|---|---|---|---|---|---|---|---|---|---|---|---|---|---|
| 1 | 10.00 | — | — | — | — | — | — | — | 9.00 | — | — | — | — | — | — | — | 13.50 | 22.50 | 1.67 |
| 2 | 9.50 | 8.88 | — | — | — | — | — | — | 8.38 | 7.88 | — | — | — | — | — | — | 13.50 | 29.75 | 2.20 |
| 3 | 9.00 | 8.25 | 7.63 | — | — | — | — | — | 7.75 | 7.13 | 6.63 | — | — | — | — | — | 13.50 | 35.00 | 2.59 |
| 4 | 8.50 | 7.63 | 6.88 | 6.25 | — | — | — | — | 7.13 | 6.38 | 5.75 | 5.25 | — | — | — | — | 13.50 | 38.00 | 2.81 |
| 5 | 8.00 | 7.00 | 6.13 | 5.38 | 4.75 | — | — | — | 6.50 | 5.63 | 4.88 | 4.25 | 3.75 | — | — | — | 13.50 | 38.50 | 2.85 |
| 6 | 7.50 | 6.50 | 5.50 | 4.63 | 3.88 | 3.25 | — | — | 6.00 | 5.00 | 4.13 | 3.38 | 2.75 | 2.25 | — | — | 13.50 | 37.00 | 2.74 |
| 7 | 7.00 | 6.00 | 5.00 | 4.00 | 3.13 | 2.38 | 1.75 | — | 5.50 | 4.50 | 3.50 | 2.63 | 1.88 | 1.25 | 0.75 | — | 13.50 | 33.50 | 2.48 |
| 8 | 6.50 | 5.50 | 4.50 | 3.50 | 2.50 | 1.63 | 0.88 | 0.25 | 5.00 | 4.00 | 3.00 | 2.00 | 1.13 | 0.38 | -0.25 | -0.75 | 13.50 | 28.00 | 2.07 |

Fig. 55: Extended Length Data Table 3

| X | $L_X$ | $L_{W1}$ | $L_{W2}$ | $L_{W3}$ | $L_{W4}$ | $L_{W5}$ | $L_{W6}$ | $L_{W7}$ | $L_{S1}$ | $L_{S2}$ | $L_{S3}$ | $L_{S4}$ | $L_{S5}$ | $L_{S6}$ | $L_{S7}$ | $L_{S8}$ | $CL_X$ | $EL_X$ | $EL_X/CL_X$ |
|---|---|---|---|---|---|---|---|---|---|---|---|---|---|---|---|---|---|---|---|
| 1 | 12.00 | — | — | — | — | — | — | — | 11.00 | — | — | — | — | — | — | — | 15.50 | 26.50 | 1.71 |
| 2 | 11.50 | 10.88 | — | — | — | — | — | — | 10.38 | 9.88 | — | — | — | — | — | — | 15.50 | 35.75 | 2.31 |
| 3 | 11.00 | 10.25 | 9.63 | — | — | — | — | — | 9.75 | 9.13 | 8.63 | — | — | — | — | — | 15.50 | 43.00 | 2.77 |
| 4 | 10.50 | 9.63 | 8.88 | 8.25 | — | — | — | — | 9.13 | 8.38 | 7.75 | 7.25 | — | — | — | — | 15.50 | 48.00 | 3.10 |
| 5 | 10.00 | 9.00 | 8.13 | 7.38 | 6.75 | — | — | — | 8.50 | 7.63 | 6.88 | 6.25 | 5.75 | — | — | — | 15.50 | 50.50 | 3.26 |
| 6 | 9.50 | 8.50 | 7.50 | 6.63 | 5.88 | 5.25 | — | — | 8.00 | 7.00 | 6.13 | 5.38 | 4.75 | 4.25 | — | — | 15.50 | 51.00 | 3.29 |
| 7 | 9.00 | 8.00 | 7.00 | 6.00 | 5.13 | 4.38 | 3.75 | — | 7.50 | 6.50 | 5.50 | 4.63 | 3.88 | 3.25 | 2.75 | — | 15.50 | 49.50 | 3.19 |
| 8 | 8.50 | 7.50 | 6.50 | 5.50 | 4.50 | 3.63 | 2.88 | 2.25 | 7.00 | 6.00 | 5.00 | 4.00 | 3.13 | 2.38 | 1.75 | 1.25 | 15.50 | 46.00 | 2.97 |

Fig. 56: Optimized Extended Length

| | Figure | | |
|---|---|---|---|
| | 53 | 54 | 55 |
| $EL_{MAX}$ | 28.00 | 38.50 | 51.00 |

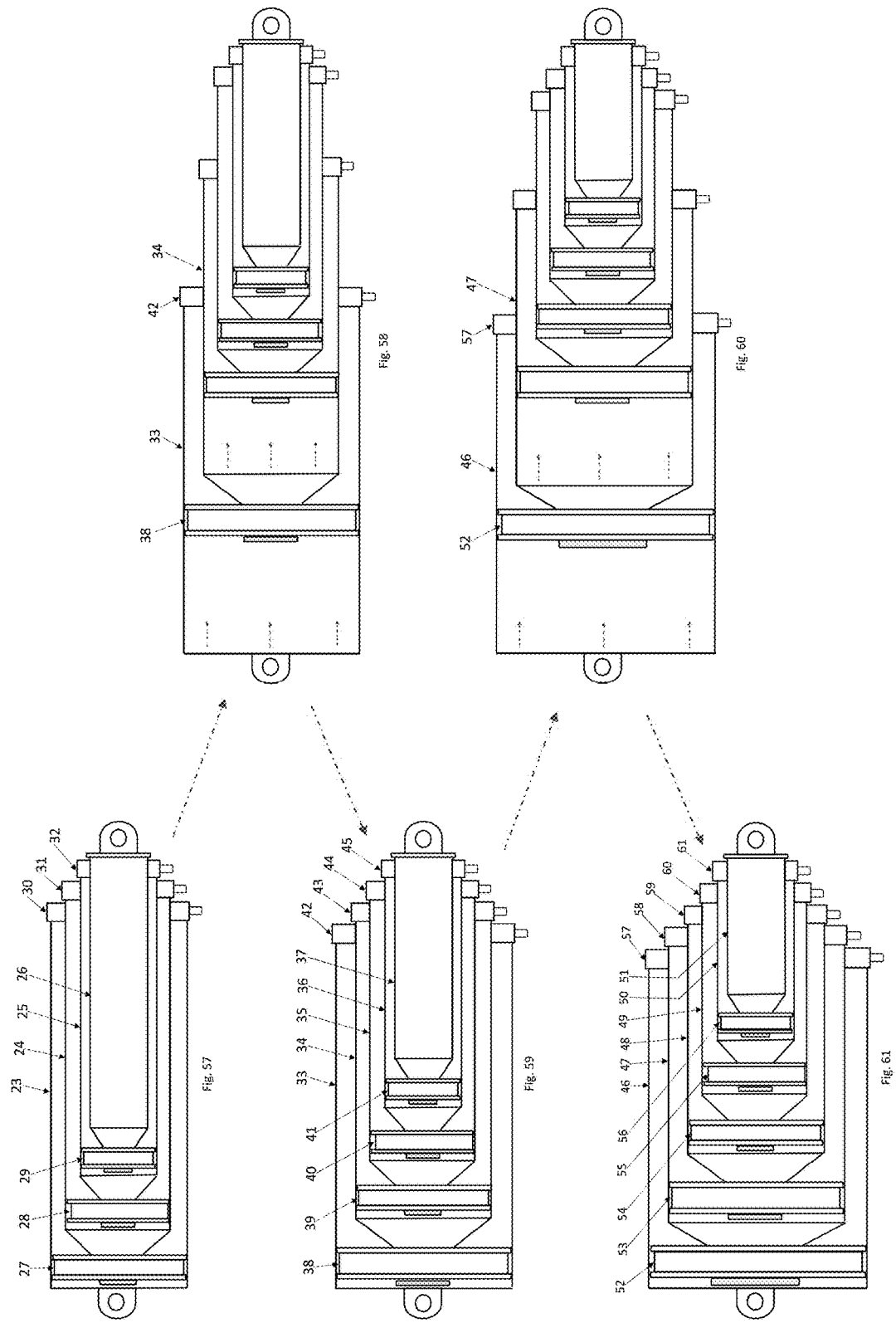

Fig. 66   $A_a = \pi(½D_a)^2$, where a = m or n, m = W, W1, W2, or W3 and n = D1, D2, or D3, or S1

Fig. 67   $V_m = A_m \cdot L_m$, where m = W, W1, W2, or W3

Fig. 68   $V_n = A_n \cdot L_n$, where n = D1, D2, D3, or S1

Fig. 69   $V_{Gt} = V_n$, where t = 1, 2, 3, or 4 and n = D1, D2, D3, or S1, respectively Fig. 70   $V_{Ot}$ (in$^3$) = $V_m - V_n$, where t = 1, 2, 3, or 4, m = W, W1, W2, or W3, and n = D1, D2, D3, or S1, respectively Fig. 71   $V_{Ot}$ (cc) = $V_{Ot}$ (in$^3$)•16.38, where t = 1, 2, 3, or 4

Fig. 72   $L_t = L_n \cdot (\%L_t/100)$, where t = 1, 2, 3, or 4 and n = D1, D2, D3, or S1, respectively Fig. 73   $V_t = A_n \cdot L_t$, where t = 1, 2, 3, or 4 and n = D1, D2, D3, or S1, respectively Fig. 74   $P_{Gt} = (F_t/A_n)(V_t/V_{Gt})$, where t = 1, 2, 3, or 4 and n = D1, D2, D3, or S1, respectively Fig. 75   $c_t = P_{Gt} \cdot V_{Gt}$, where t = 1, 2, 3, or 4

Fig. 76   $V_z = A_n \cdot L_z$, where z = 1e, 2f, 3g, or 4h and n = D1, D2, D3, or S1, respectively Fig. 77   $P_z = c_t/V_z$, where z = 1e, 2f, 3g, or 4h and t = 1, 2, 3, or 4, respectively Fig. 78   $F_z = P_z \cdot A_n$, where z = 1e, 2f, 3g, or 4h and n = D1, D2, D3, or S1, respectively Fig. 79   $SR_z = F_z/L_z$, where z = 1e, 2f, 3g, or 4h Fig. 80   $\%\Delta L_z = ((L_z - L_{z+1})/L_z) \cdot 100$, where z = 1e, 2f, 3g, or 4h and e = 1-21, f, g = 1-19, or h = 1-10

Fig. 81   $\%\Delta P_z = ((P_{z+1} - P_z)/P_z) \cdot 100$, where z = 1e, 2f, 3g, or 4h and e = 1-21, f, g = 1-19, or h = 1-10

Fig. 82   $\%\Delta SR_z = ((SR_{z+1} - SR_z)/SR_z) \cdot 100$, where z = 1e, 2f, 3g, or 4h and e = 1-21, f, g = 1-19, or h = 1-10

Fig. 83   $\Delta L_z = L_z - L_{z+1}$ where z = 1e, 2f, 3g, or 4h and e, g = 1-9, f, h = 1-10

Fig. 84: Selected Values

| a = m or n | | stage | $D_a$ | $L_m$ | $L_n$ | | $F_t$ |
|---|---|---|---|---|---|---|---|
| m | n | t | (in) | (in) | (in) | %$L_t$ | (lbs) |
| W | — | — | 4.0 | 8.5 | — | — | — |
| W1 | D1 | 1 | 3.5 | 7.6 | 7.1 | 100.0 | 2000 |
| W2 | D2 | 2 | 3.0 | 6.9 | 6.4 | 100.0 | 1500 |
| W3 | D3 | 3 | 2.5 | 6.3 | 5.8 | 70.0 | 1500 |
| — | S1 | 4 | 2.0 | — | 5.3 | 40.0 | 1500 |

Fig. 86: Ride Height Values

| stage | $L_t$ | $V_t$ | $P_{Gt}$ |
|---|---|---|---|
| t | (in) | (in³) | (psi) |
| 1 | 7.1 | 68.6 | 207.8 |
| 2 | 6.4 | 45.1 | 212.2 |
| 3 | 4.0 | 19.8 | 213.9 |
| 4 | 2.1 | 6.6 | 191.0 |

Fig. 85: Properties of the Stage

| a = m or n | | stage | $A_a$ | $V_m$ | $V_n$ | $V_{Gt}$ | $V_{ot}$ | $V_{ot}$ | |
|---|---|---|---|---|---|---|---|---|---|
| m | n | t | (in²) | (in³) | (in³) | (in³) | (in³) | (cc) | $c_t$ |
| W | — | — | 12.6 | 106.8 | — | — | — | — | — |
| W1 | D1 | 1 | 9.6 | 73.4 | 68.6 | 68.6 | 38.2 | 626.1 | 14260 |
| W2 | D2 | 2 | 7.1 | 48.6 | 45.1 | 45.1 | 28.3 | 463.8 | 9570 |
| W3 | D3 | 3 | 4.9 | 30.7 | 28.2 | 28.2 | 20.4 | 334.3 | 6038 |
| — | S1 | 4 | 3.1 | — | 16.5 | 16.5 | 14.2 | 232.4 | 3150 |

Fig. 87: First Stage Data Table

| e | $L_{1e}$ (in) | $V_{1e}$ (in³) | $P_{1e}$ (psi) | $F_{1e}$ (lbs) | %$\Delta L_{1e}$ | %$\Delta P_{1e}$ | $SR_{1e}$ (lbs/in) | %$\Delta SR_{1e}$ |
|---|---|---|---|---|---|---|---|---|
| 1 | 7.13 | 68.61 | 207.85 | 2000.0 | — | — | 281 | — |
| 2 | 6.63 | 63.80 | 223.52 | 2150.8 | 7 | 8 | 324 | 16 |
| 3 | 6.42 | 61.75 | 230.94 | 2222.2 | 10 | 11 | 346 | 23 |
| 4 | 6.13 | 58.99 | 241.76 | 2326.3 | 14 | 16 | 379 | 35 |
| 5 | 5.70 | 54.89 | 259.81 | 2500.0 | 20 | 25 | 438 | 56 |
| 6 | 5.63 | 54.17 | 263.23 | 2532.9 | 21 | 27 | 450 | 60 |
| 7 | 5.13 | 49.36 | 288.88 | 2779.7 | 28 | 39 | 542 | 93 |
| 8 | 4.99 | 48.03 | 296.93 | 2857.1 | 30 | 43 | 572 | 104 |
| 9 | 4.63 | 44.55 | 320.08 | 3079.9 | 35 | 54 | 665 | 137 |
| 10 | 4.28 | 41.16 | 346.41 | 3333.3 | 40 | 67 | 779 | 178 |
| 11 | 4.13 | 39.74 | 358.83 | 3452.8 | 42 | 73 | 836 | 198 |
| 12 | 3.63 | 34.93 | 408.25 | 3928.4 | 49 | 96 | 1082 | 286 |
| 13 | 3.57 | 34.30 | 415.70 | 4000.0 | 50 | 100 | 1122 | 300 |
| 14 | 3.13 | 30.12 | 473.47 | 4555.9 | 56 | 128 | 1456 | 419 |
| 15 | 2.85 | 27.44 | 519.62 | 5000.0 | 60 | 150 | 1753 | 525 |
| 16 | 2.63 | 25.31 | 563.48 | 5422.1 | 63 | 171 | 2062 | 635 |
| 18 | 2.14 | 20.58 | 692.83 | 6666.7 | 70 | 233 | 3117 | 1011 |
| 19 | 1.64 | 15.77 | 904.19 | 8700.4 | 77 | 335 | 5308 | 1792 |
| 20 | 1.43 | 13.72 | 1039.24 | 10000.0 | 80 | 400 | 7013 | 2400 |
| 21 | 1.14 | 10.96 | 1301.11 | 12519.8 | 84 | 526 | 10992 | 3819 |
| 22 | 0.71 | 6.86 | 2078.49 | 20000.0 | 90 | 900 | 28050 | 9900 |
| 23 | 0.64 | 6.15 | 2319.19 | 22316.1 | 91 | 1016 | 34924 | 12350 |

| f | $L_{2f}$ (in) | $V_{2f}$ (in³) | $P_{2f}$ (psi) | $F_{2f}$ (lbs) | %Δ$L_{2f}$ | %Δ$P_{2f}$ | $SR_{2f}$ (lbs/in) | %Δ$SR_{2f}$ |
|---|---|---|---|---|---|---|---|---|
| 1 | 6.38 | 45.10 | 212.18 | 1500.0 | — | — | 235 | — |
| 2 | 5.88 | 41.57 | 230.22 | 1627.6 | 8 | 9 | 277 | 18 |
| 3 | 5.74 | 40.59 | 235.75 | 1666.7 | 10 | 11 | 290 | 23 |
| 4 | 5.38 | 38.03 | 251.62 | 1778.8 | 16 | 19 | 331 | 41 |
| 5 | 5.10 | 36.08 | 265.22 | 1875.0 | 20 | 25 | 367 | 56 |
| 6 | 4.88 | 34.50 | 277.40 | 1961.1 | 24 | 31 | 402 | 71 |
| 7 | 4.79 | 33.83 | 282.91 | 2000.0 | 25 | 33 | 418 | 78 |
| 8 | 4.47 | 31.57 | 303.11 | 2142.9 | 30 | 43 | 480 | 104 |
| 9 | 4.38 | 30.96 | 309.06 | 2184.9 | 31 | 46 | 499 | 112 |
| 10 | 3.88 | 27.43 | 348.89 | 2466.5 | 39 | 64 | 636 | 170 |
| 11 | 3.83 | 27.06 | 353.63 | 2500.0 | 40 | 67 | 653 | 178 |
| 12 | 3.38 | 23.89 | 400.50 | 2831.4 | 47 | 89 | 838 | 256 |
| 13 | 3.19 | 22.55 | 424.36 | 3000.0 | 50 | 100 | 940 | 300 |
| 14 | 2.88 | 20.36 | 470.04 | 3322.9 | 55 | 122 | 1154 | 391 |
| 15 | 2.55 | 18.04 | 530.45 | 3750.0 | 60 | 150 | 1469 | 525 |
| 16 | 2.38 | 16.83 | 568.78 | 4021.0 | 63 | 168 | 1689 | 619 |
| 17 | 1.91 | 13.53 | 707.26 | 5000.0 | 70 | 233 | 2612 | 1011 |
| 18 | 1.88 | 13.29 | 720.05 | 5090.4 | 71 | 239 | 2708 | 1052 |
| 19 | 1.38 | 9.76 | 980.94 | 6934.8 | 78 | 362 | 5025 | 2037 |
| 20 | 1.28 | 9.02 | 1060.90 | 7500.0 | 80 | 400 | 5878 | 2400 |
| 21 | 0.88 | 6.22 | 1538.30 | 10875.0 | 86 | 625 | 12358 | 5156 |
| 22 | 0.64 | 4.51 | 2121.79 | 15000.0 | 90 | 900 | 23511 | 9900 |

Fig. 88: Second Stage Data Table

| | | | Fig. 89: Third Stage Data Table | | | | | |
|---|---|---|---|---|---|---|---|---|
| | $L_{3g}$ | $V_{3g}$ | $P_{3g}$ | $F_{3g}$ | | | $SR_{3g}$ | |
| g | (in) | (in$^3$) | (psi) | (lbs) | %Δ$L_{3g}$ | %Δ$P_{3g}$ | (lbs/in) | %Δ$SR_{3g}$ |
| 1 | 5.75 | 28.23 | 213.88 | 1050.0 | — | — | 183 | — |
| 2 | 5.25 | 25.77 | 234.25 | 1150.0 | 9 | 10 | 219 | 20 |
| 3 | 5.18 | 25.41 | 237.64 | 1166.7 | 10 | 11 | 225 | 23 |
| 4 | 4.75 | 23.32 | 258.90 | 1271.1 | 17 | 21 | 268 | 47 |
| 5 | 4.60 | 22.58 | 267.35 | 1312.5 | 20 | 25 | 285 | 56 |
| 6 | 4.25 | 20.86 | 289.36 | 1420.6 | 26 | 35 | 334 | 83 |
| 7 | 4.03 | 19.76 | 305.54 | 1500.0 | 30 | 43 | 373 | 104 |
| 8 | 3.75 | 18.41 | 327.94 | 1610.0 | 35 | 53 | 429 | 135 |
| 9 | 3.45 | 16.94 | 356.46 | 1750.0 | 40 | 67 | 507 | 178 |
| 10 | 3.25 | 15.96 | 378.40 | 1857.7 | 43 | 77 | 572 | 213 |
| 11 | 2.88 | 14.11 | 427.75 | 2100.0 | 50 | 100 | 730 | 300 |
| 12 | 2.75 | 13.50 | 447.20 | 2195.5 | 52 | 109 | 798 | 337 |
| 13 | 2.30 | 11.29 | 534.69 | 2625.0 | 60 | 150 | 1141 | 525 |
| 14 | 2.25 | 11.05 | 546.57 | 2683.3 | 61 | 156 | 1193 | 553 |
| 15 | 1.73 | 8.47 | 712.92 | 3500.0 | 70 | 233 | 2029 | 1011 |
| 16 | 1.25 | 6.14 | 983.83 | 4830.0 | 78 | 360 | 3864 | 2016 |
| 17 | 1.15 | 5.65 | 1069.38 | 5250.0 | 80 | 400 | 4565 | 2400 |
| 18 | 0.75 | 3.68 | 1639.72 | 8050.0 | 87 | 667 | 10733 | 5778 |
| 19 | 0.58 | 2.82 | 2138.77 | 10500.0 | 90 | 900 | 18261 | 9900 |

| h | $L_{4h}$ (in) | $V_{4h}$ (in³) | $P_{4h}$ (psi) | $F_{4h}$ (lbs) | $\%\Delta L_{4h}$ | $\%\Delta P_{4h}$ | $SR_{4h}$ (lbs/in) | $\%\Delta SR_{4h}$ |
|---|---|---|---|---|---|---|---|---|
| 1 | 5.25 | 16.50 | 190.96 | 600.0 | — | — | 114 | — |
| 2 | 4.73 | 14.85 | 212.18 | 666.7 | 10 | 11 | 141 | 23 |
| 3 | 4.25 | 13.35 | 235.89 | 741.2 | 19 | 24 | 174 | 53 |
| 4 | 4.20 | 13.20 | 238.70 | 750.0 | 20 | 25 | 179 | 56 |
| 5 | 3.75 | 11.78 | 267.35 | 840.0 | 29 | 40 | 224 | 96 |
| 6 | 3.68 | 11.55 | 272.80 | 857.1 | 30 | 43 | 233 | 104 |
| 7 | 3.25 | 10.21 | 308.48 | 969.2 | 38 | 62 | 298 | 161 |
| 8 | 3.15 | 9.90 | 318.27 | 1000.0 | 40 | 67 | 317 | 178 |
| 9 | 3.00 | 9.43 | 334.18 | 1050.0 | 43 | 75 | 350 | 206 |
| 10 | 2.75 | 8.64 | 364.56 | 1145.5 | 48 | 91 | 417 | 264 |
| 11 | 2.63 | 8.25 | 381.92 | 1200.0 | 50 | 100 | 457 | 300 |
| 12 | 2.25 | 7.07 | 445.58 | 1400.0 | 57 | 133 | 622 | 444 |
| 13 | 2.10 | 6.60 | 477.40 | 1500.0 | 60 | 150 | 714 | 525 |
| 14 | 1.75 | 5.50 | 572.88 | 1800.0 | 67 | 200 | 1029 | 800 |
| 15 | 1.58 | 4.95 | 636.54 | 2000.0 | 70 | 233 | 1270 | 1011 |
| 16 | 1.25 | 3.93 | 802.04 | 2520.0 | 76 | 320 | 2016 | 1664 |
| 17 | 1.05 | 3.30 | 954.81 | 3000.0 | 80 | 400 | 2857 | 2400 |
| 18 | 0.75 | 2.36 | 1336.73 | 4200.0 | 86 | 600 | 5600 | 4800 |
| 19 | 0.53 | 1.65 | 1909.61 | 6000.0 | 90 | 900 | 11429 | 9900 |

Fig. 90: Fourth Stage Data Table

Fig. 91: First Stage Spring Rate Table

| e | $L_{1e}$ (in) | $\%\Delta L_{1e}$ | $F_{1e}$ (lbs) | $\Delta L_{1e}$ | $SR_{1e}$ (lbs/in) |
|---|---|---|---|---|---|
| 1 | 7.13 | — | 2000 | — | 281 |
| 2 | 6.42 | 10 | 2222 | 0.71 | 346 |
| 3 | 5.70 | 20 | 2500 | 0.70 | 438 |
| 4 | 4.99 | 30 | 2857 | 0.71 | 572 |
| 5 | 4.28 | 40 | 3333 | 0.71 | 779 |
| 6 | 3.57 | 50 | 4000 | 0.71 | 1122 |
| 7 | 2.85 | 60 | 5000 | 0.71 | 1753 |
| 8 | 2.14 | 70 | 6667 | 0.71 | 3117 |
| 9 | 1.43 | 80 | 10000 | 0.71 | 7013 |
| 10 | 0.71 | 90 | 20000 | 0.71 | 28050 |

Fig. 92: Second Stage Spring Rate Table

| f | $L_{2f}$ (in) | $\%\Delta L_{2f}$ | $F_{2f}$ (lbs) | $\Delta L_{2f}$ | $SR_{2f}$ (lbs/in) |
|---|---|---|---|---|---|
| 1 | 6.38 | — | 1500 | — | 235 |
| 2 | 5.74 | 10 | 1667 | 0.64 | 290 |
| 3 | 5.10 | 20 | 1875 | 0.64 | 367 |
| 4 | 4.79 | 25 | 2000 | 0.32 | 418 |
| 5 | 4.47 | 30 | 2143 | 0.64 | 480 |
| 6 | 3.83 | 40 | 2500 | 0.64 | 653 |
| 7 | 3.19 | 50 | 3000 | 0.64 | 940 |
| 8 | 2.55 | 60 | 3750 | 0.64 | 1469 |
| 9 | 1.91 | 70 | 5000 | 0.64 | 2612 |
| 10 | 1.28 | 80 | 7500 | 0.64 | 5878 |
| 11 | 0.64 | 90 | 15000 | 0.64 | 23511 |

Fig. 93: Third Stage Spring Rate Table

| g | $L_{3g}$ (in) | $\%\Delta L_{3g}$ | $F_{3g}$ (lbs) | $\Delta L_{3g}$ | $SR_{3g}$ (lbs/in) |
|---|---|---|---|---|---|
| 1 | 5.75 | — | 1050 | — | 183 |
| 2 | 5.18 | 10 | 1167 | 0.58 | 225 |
| 3 | 4.60 | 20 | 1313 | 0.57 | 285 |
| 4 | 4.03 | 30 | 1500 | 0.58 | 373 |
| 5 | 3.45 | 40 | 1750 | 0.58 | 507 |
| 6 | 2.88 | 50 | 2100 | 0.58 | 730 |
| 7 | 2.30 | 60 | 2625 | 0.58 | 1141 |
| 8 | 1.73 | 70 | 3500 | 0.58 | 2029 |
| 9 | 1.15 | 80 | 5250 | 0.58 | 4565 |
| 10 | 0.58 | 90 | 10500 | 0.58 | 18261 |

Fig. 94: Fourth Stage Spring Rate Table

| h | $L_{4h}$ (in) | $\%\Delta L_{4h}$ | $F_{4h}$ (lbs) | $\Delta L_{4h}$ | $SR_{4h}$ (lbs/in) |
|---|---|---|---|---|---|
| 1 | 5.25 | — | 600 | — | 114 |
| 2 | 4.73 | 10 | 667 | 0.52 | 141 |
| 3 | 4.20 | 20 | 750 | 0.53 | 179 |
| 4 | 3.68 | 30 | 857 | 0.53 | 233 |
| 5 | 3.15 | 40 | 1000 | 0.53 | 317 |
| 6 | 3.00 | 43 | 1050 | 0.15 | 350 |
| 7 | 2.63 | 50 | 1200 | 0.53 | 457 |
| 8 | 2.10 | 60 | 1500 | 0.53 | 714 |
| 9 | 1.58 | 70 | 2000 | 0.53 | 1270 |
| 10 | 1.05 | 80 | 3000 | 0.53 | 2857 |
| 11 | 0.53 | 90 | 6000 | 0.53 | 11429 |

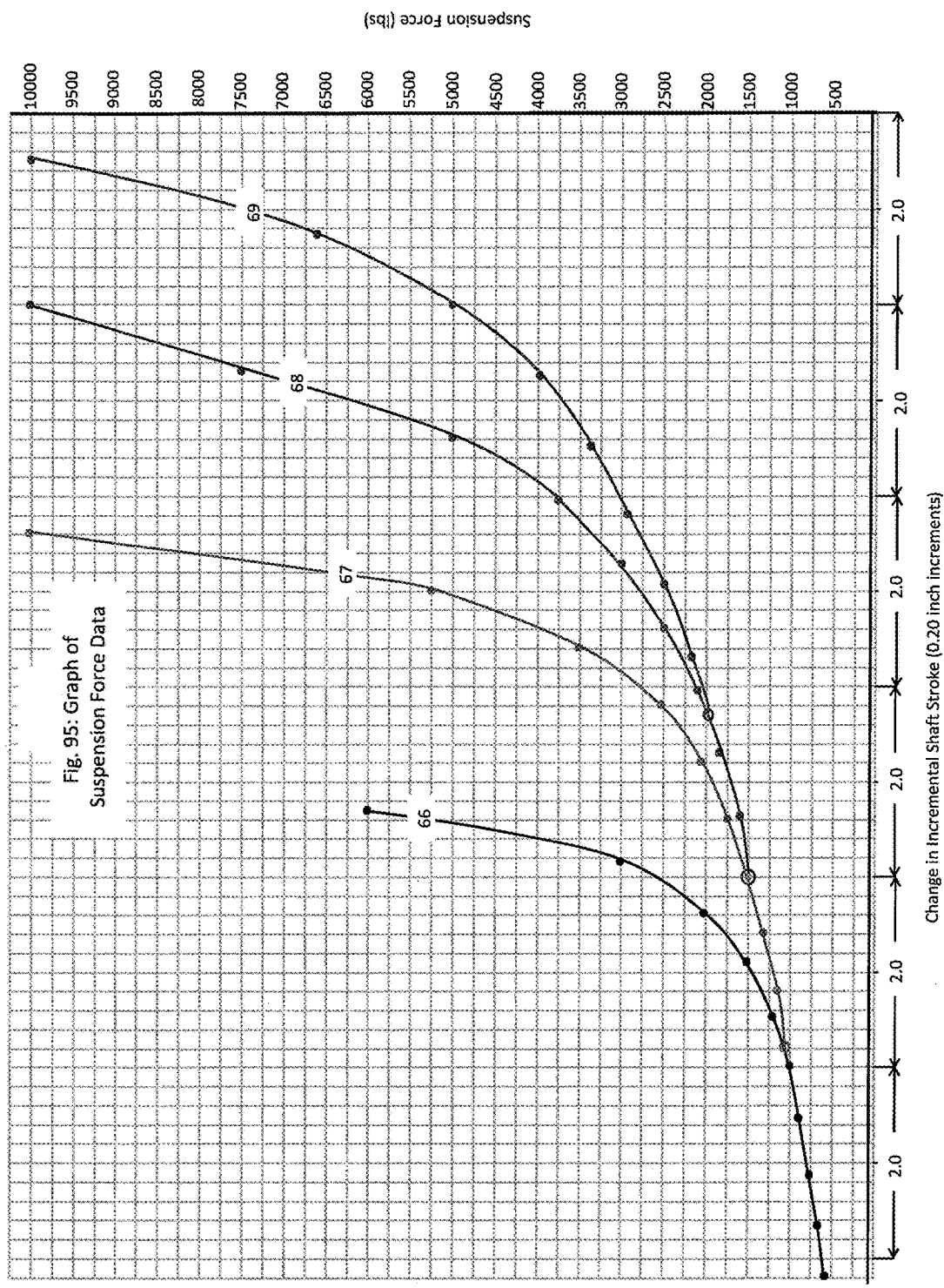

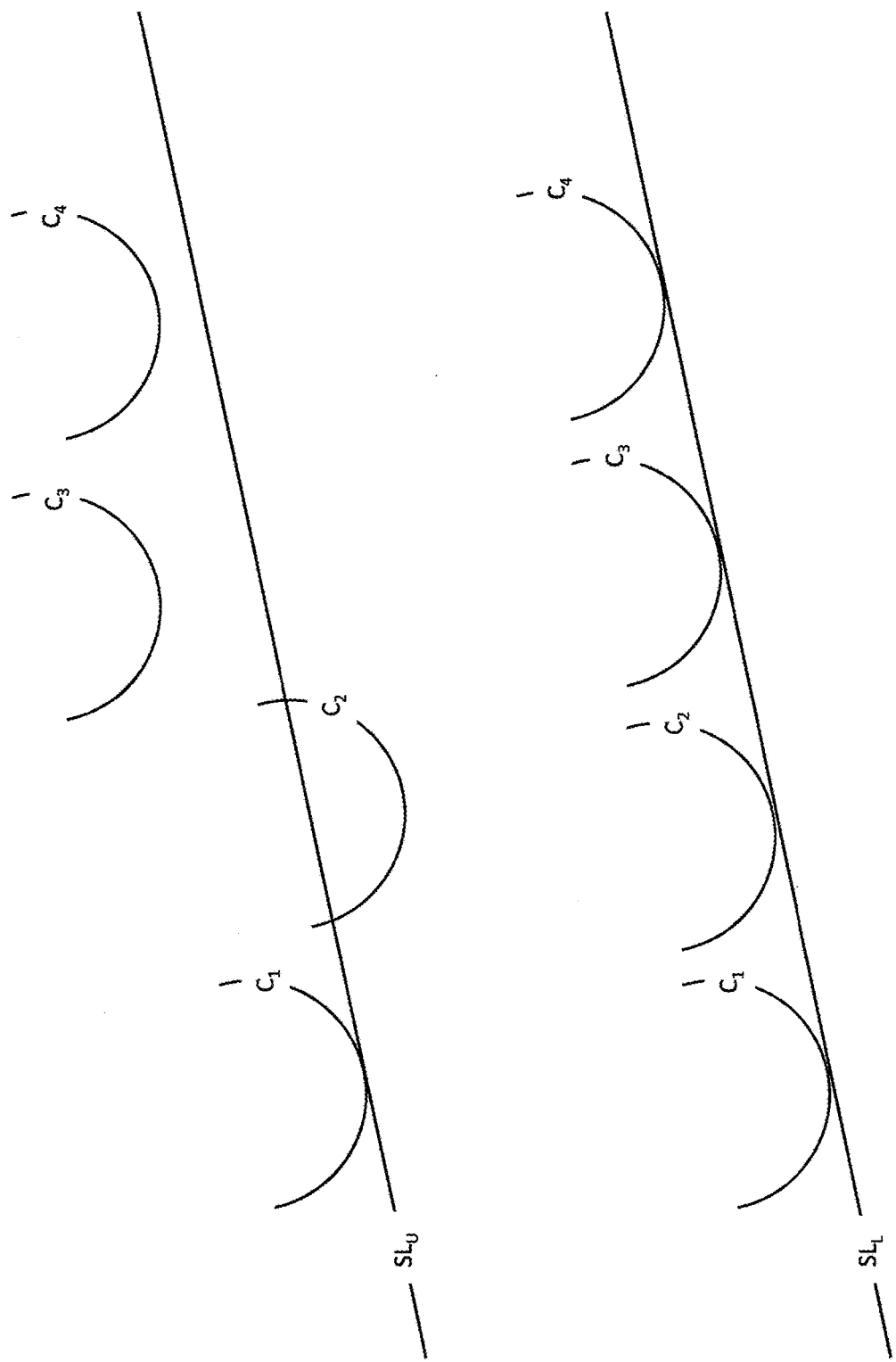
Fig. 96: Curved Lines Tangent to a Straight Line

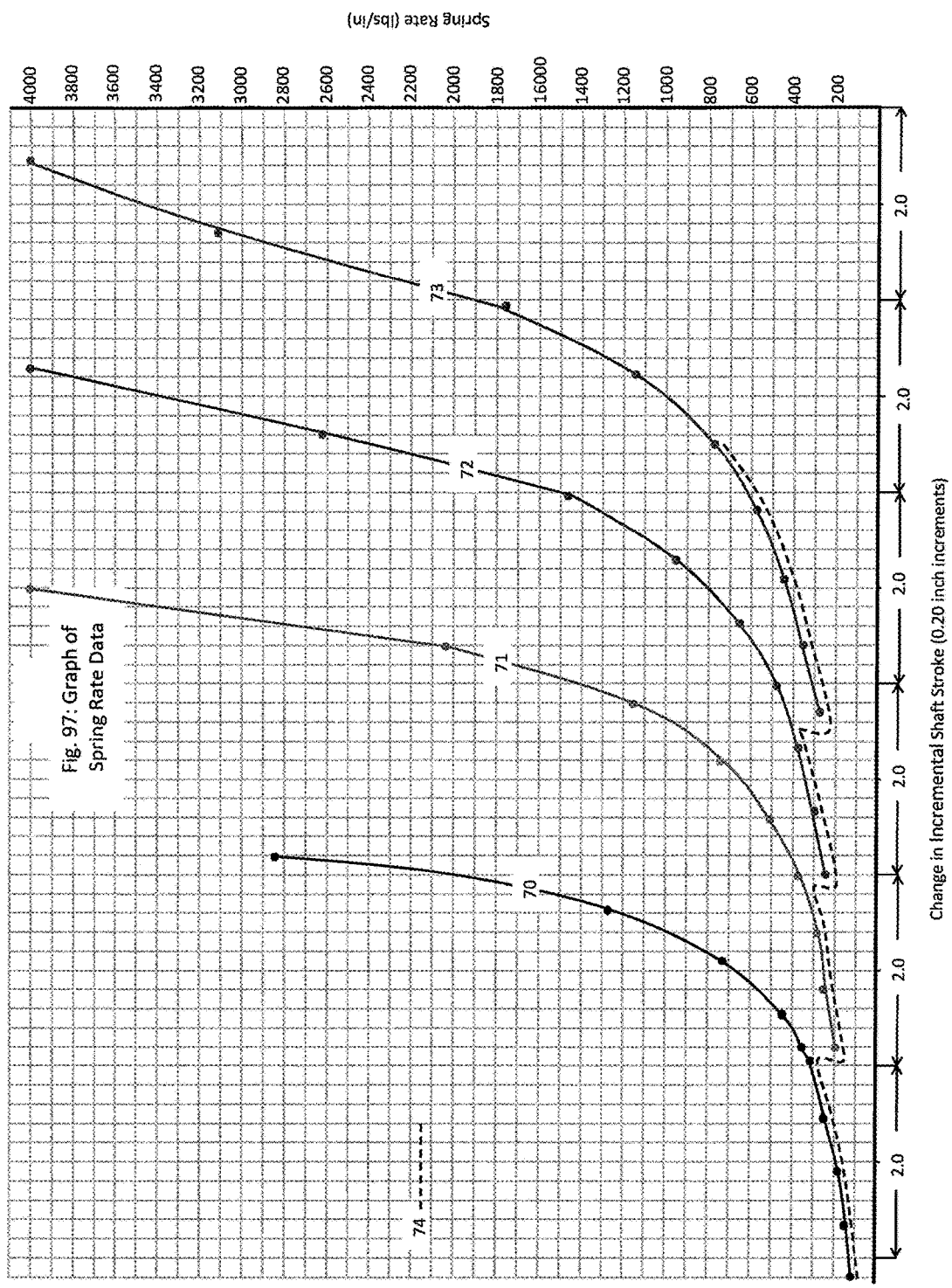
Fig. 97: Graph of Spring Rate Data

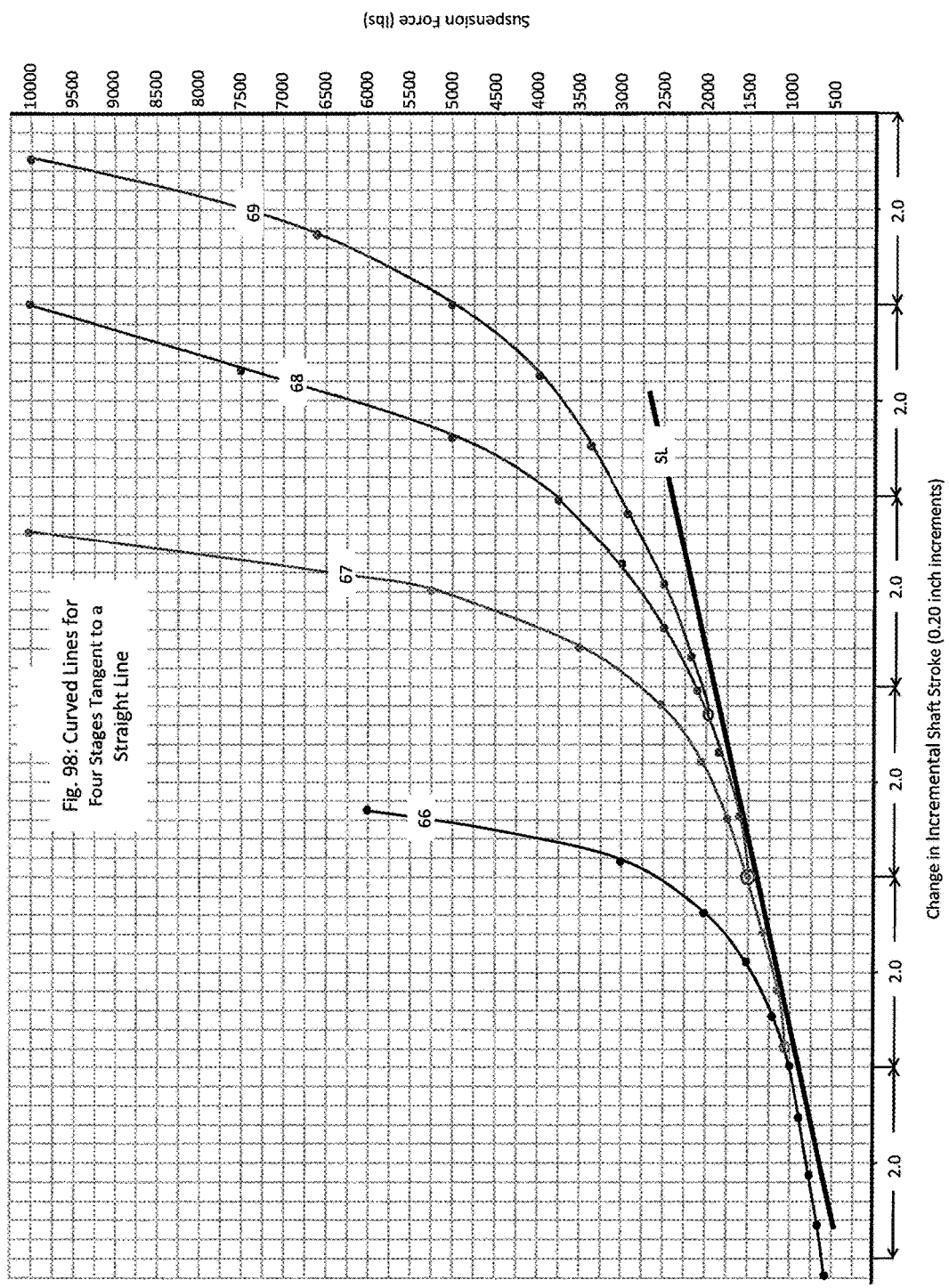
Fig. 98: Curved Lines for Four Stages Tangent to a Straight Line

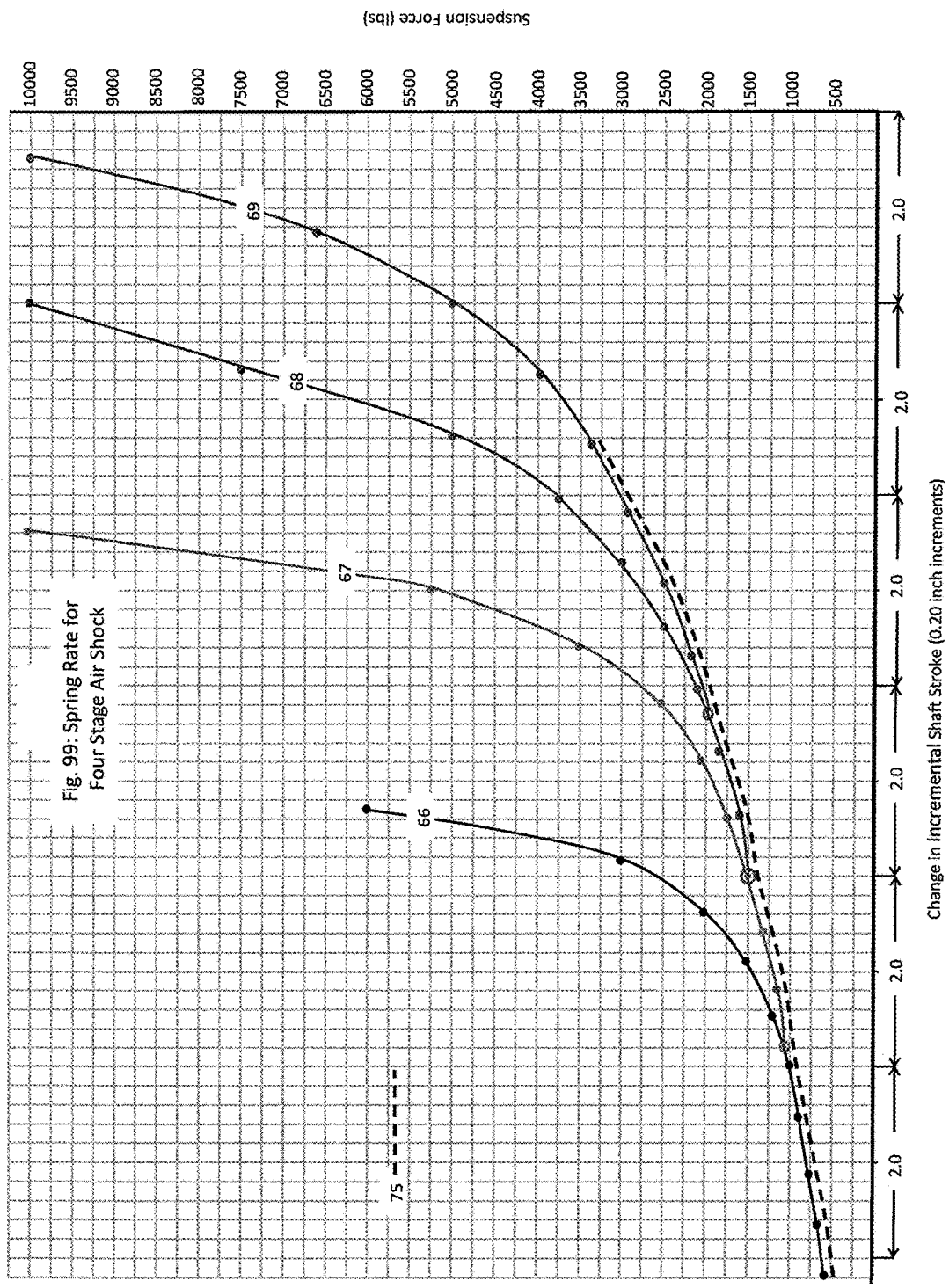
Fig. 99: Spring Rate for Four Stage Air Shock

PROCESS FOR CONSTRUCTING THE MULTIPLE STAGE AIR SHOCK

CROSS-REFERENCE TO RELATED APPLICATIONS

This application is a continuation-in-part of U.S. patent application Ser. No. 13/854,055 filed on Mar. 30, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

In connection with our investigation of the independent and solid axle suspension systems for four wheel drive vehicles, which are disclosed in patent application Ser. Nos. 14/059,062 and 14/324,105, respectively, we sought a shock absorber with unique compressed length, extended length properties. A survey of the art uncovered one feature common to virtually all shock absorbers—the extended length is less than twice the compressed length. This feature results from the inherent design of a shock absorber, namely, a single shaft that travels into/out of a single working tube. The length of the shaft defines the shock's travel. A shaft length of 6-8 inches is common and adequate for most vehicles. Such shocks have a relatively short compressed length thereby easing installation on production-based vehicles. However, in the off-road environment, a vehicle routinely encounters trail obstacles—e.g., boulders, fallen trees, ravines, cliffs—that exceed the limit of shock travel. To contend with such obstacles, engineers have designed long travel shocks with 12 inches or more of shaft length. These shocks require a working tube length at least equal to their shaft length. To account for the working piston, the working tube length of these shocks can be several inches longer than their shaft length—at least 14 inches or more. Such shocks have a relatively long compressed length thereby hampering installation on production-based vehicles. Typical methods of dealing with long travel shock issues include allowing the upper portion of the shock to protrude through the hood of the vehicle (for front shocks), or to protrude into the bed or trunk of the vehicle (for rear shocks). Such intrusive methods of installation are not practical for our needs, nor for production-based vehicles. Rather, our attention was drawn to a concept for a shock absorber whose extended length is greater than twice its compressed length. Moreover, given that many types of production-based vehicles are routinely used in industries that involve off-road driving, e.g., construction, farming and ranching, mining, forestry, gas and oil exploration, then automobile manufacturers and numerous other industries would greatly benefit from a long travel shock that could be easily installed on production-based vehicles.

A technique for resolving long travel shock issues would involve a shock with a relatively short compressed length and a relatively long travel length. Conceptually, this technique would require a shock that could extend several times greater than just twice its compressed length. A shock whose shaft would push down completely into a working tube of the same length thus giving a fully compressed shock; and, then push out of and seemingly grow several times greater than the working tube thus giving a fully extended shock whose length is several times greater than its compressed length.

In principle, a shock whose shaft was segmented like a simple telescope or spyglass could extend many times beyond its original compressed length. This principle refers to a design that consists of more than one independent shock-unit operating in series where the working tube for one shock-unit serves as the shaft for the next larger shock-unit, and so on. This design would have one shock-unit pushing down into the next larger one, and so on, so that by ignoring end caps and working pistons, the length of just one (the largest) working tube is representative of the shock's compressed length while the number of shock-units used in the shock's construction is representative of its extended length—e.g., three shock-units could extend three times beyond the compressed length, four shock units could extend four times beyond the compressed length, and so on—in effect, a shock within a shock. This shock within a shock design is ideally suited for our needs, and for installation on production-based vehicles thereby fulfilling the need of numerous industries that would benefit from a long travel shock with a short compressed length.

During the course of our investigation, it was brought to our attention that the shock within a shock design is known in the art as a multiple stage shock absorber. Therefore, our investigation was re-focused on developing a process for constructing this shock absorber. The construction process comprises novel means that are absent in the art, including means for adding stages to the shock, determining various lengths for the shock, and determining various spring rates for the shock.

BRIEF SUMMARY OF THE INVENTION

The present invention offers a process for constructing the multiple stage shock absorber. The multiple stage shock absorber is defined in terms of the multiple stage air shock. The multiple stage air shock is disclosed in the patent application Ser. No. 13/854,055 filed on Mar. 30, 2013, and serves as the basis for developing the process, the process including means for adding stages, determining compressed, extended, and optimized lengths[,] and estimating linear spring rates.

The present invention also offers a process that includes:

a means of adding more stages to the multiple stage air shock, the addition is based on adding a new first stage and involves the re-specification of the components comprising existing stages;

a means of determining the compressed and extended lengths of the multiple stage air shock, the determination is based on one methodology. The one methodology uses equations to compute the dimensions of the parts for each stage whereby various dimensions used in constructing each stage can be applied to a second methodology for estimating a linear spring rate;

the one methodology enabling the extended length to be greater than twice the compressed length thereby producing a long travel multiple stage air shock with a short compressed length. The extended length is able to be computed in terms of the compressed length whereby the extended length reaches a maximum value and then decreases as stages are added to the multiple stage air shock, the extended length with the maximum value referring to the optimized extended length;

a means of making the spring rate relatively linear, the means being due to the second methodology. The second methodology derives a set-up for the multiple stage air shock that is based on a graphical analysis of the operation of each stage. The graphical analysis describes the operation of each stage with a curved line, which in turn results in a description of the operation of the multiple stage air shock as a series of intersecting curved line parts and a specification of the gas charge for each stage necessary to set-up the shock. A line traced along the series of intersecting curved line parts represents an estimate of the spring rate for the multiple stage air shock. The straighter the line trace, the more linear the spring rate;

a means of making the spring rate more linear by adding more stages to the multiple stage air shock, the means being an attribute of the second methodology.

BRIEF DESCRIPTION OF THE SEVERAL VIEWS OF THE DRAWING

Brief Description of the Drawings

Figure 1:
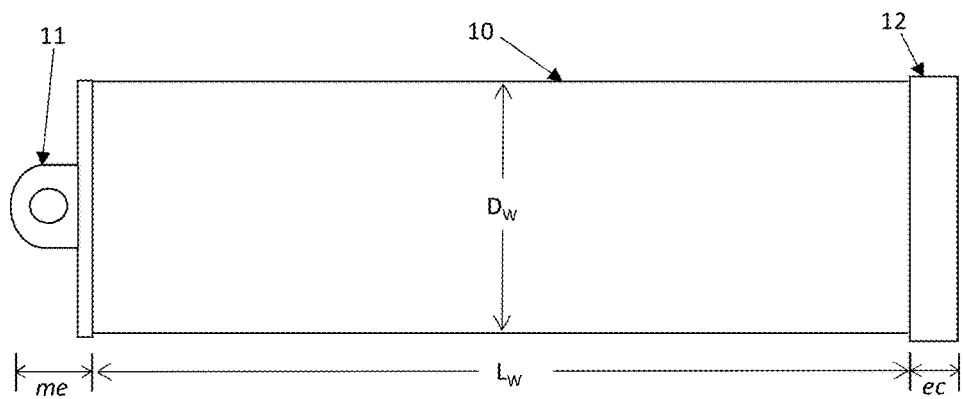
Figure 2:
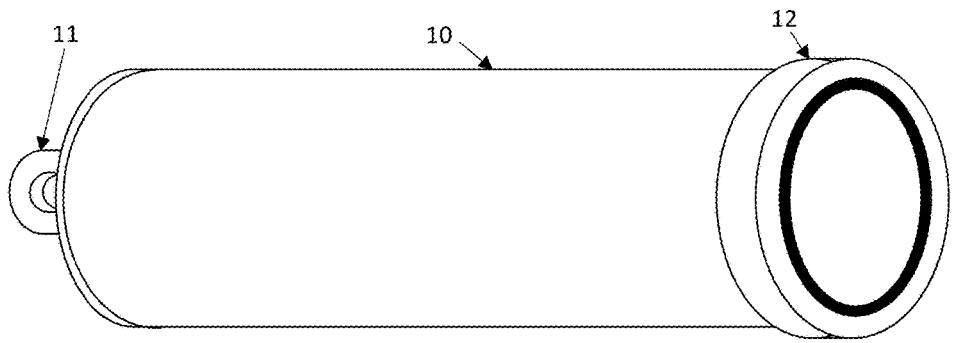
Figure 3:
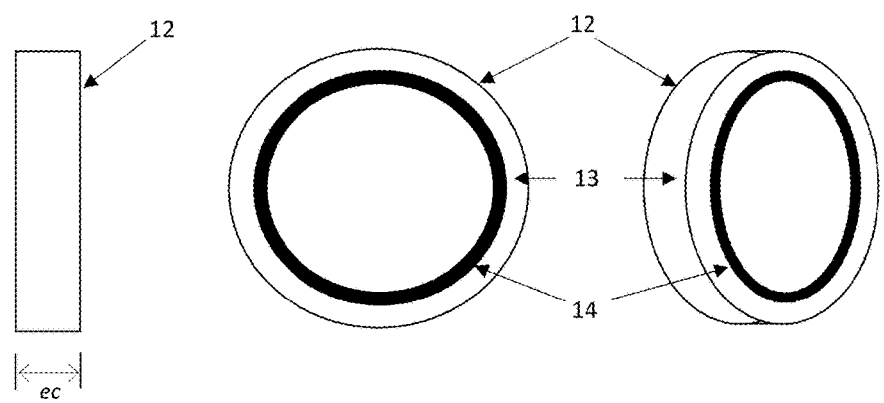
Figure 4:
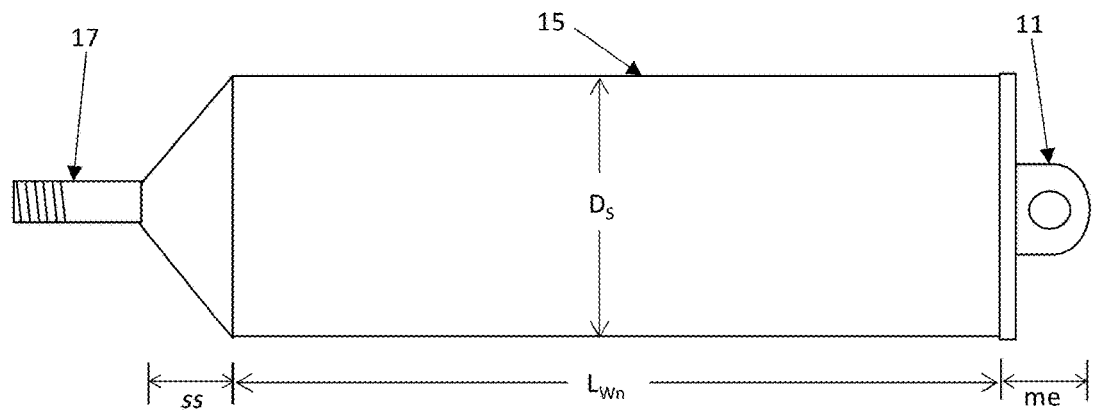
Figure 5:
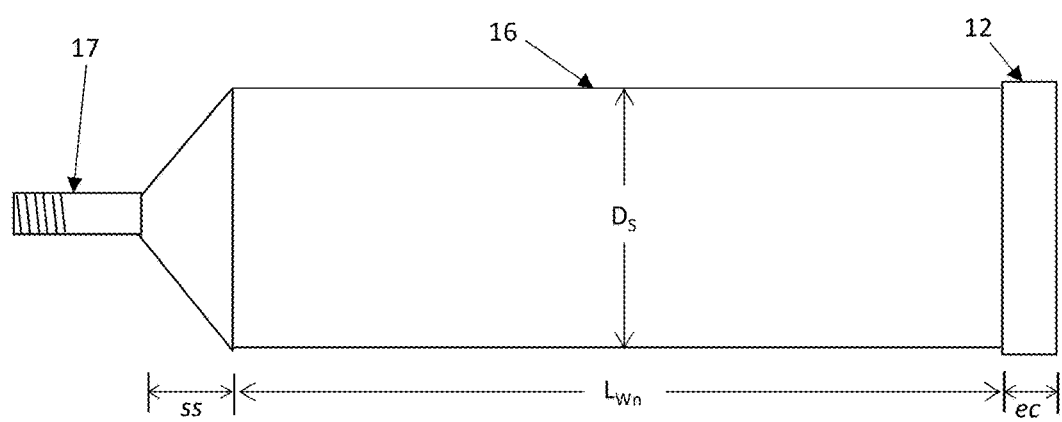
Figure 6:
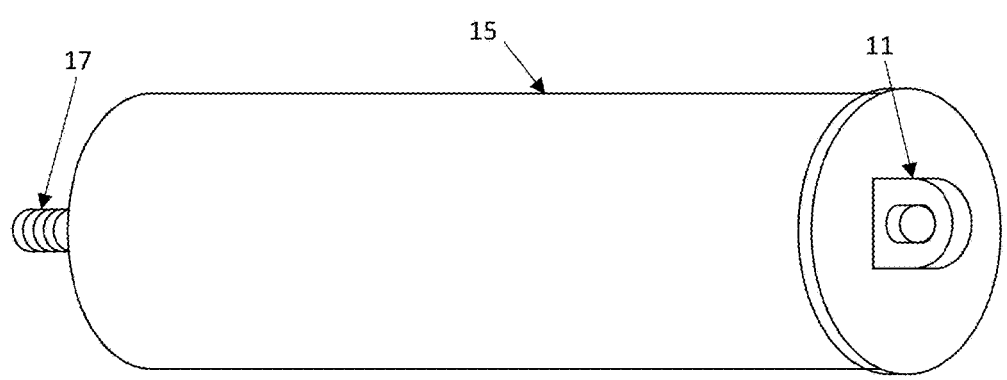
Figure 7:
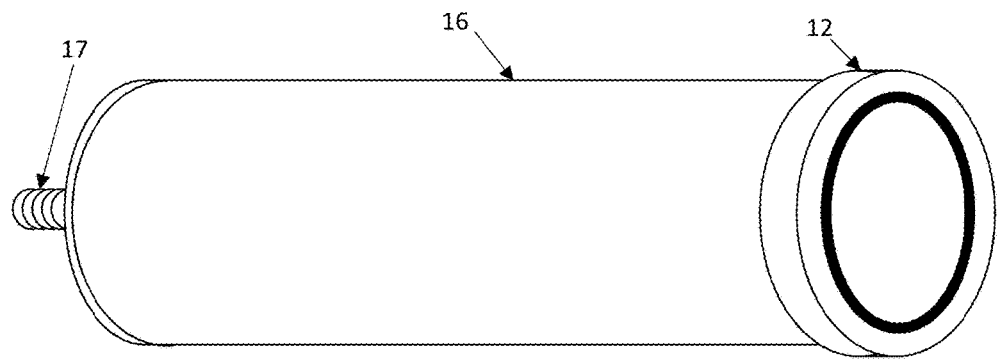
Figure 8:
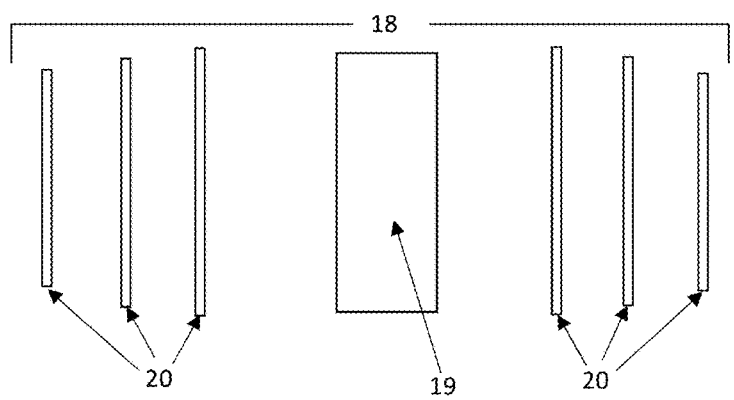
Figure 9:
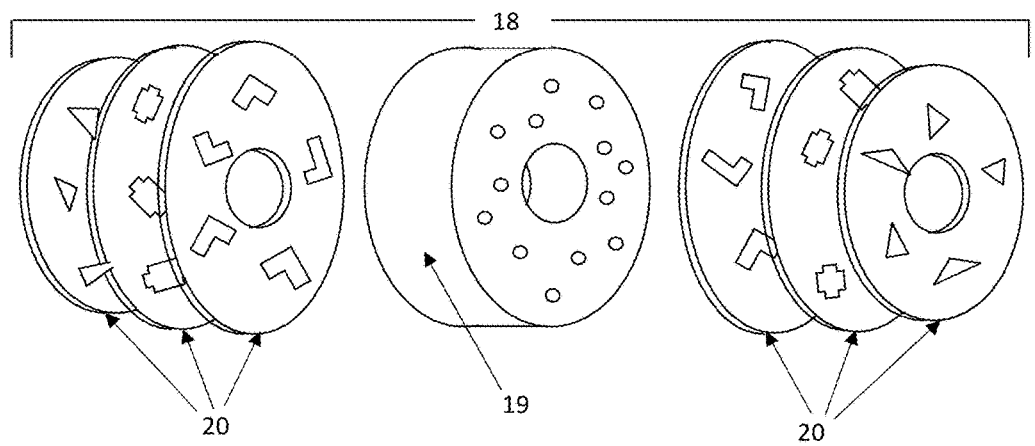
Figure 10:
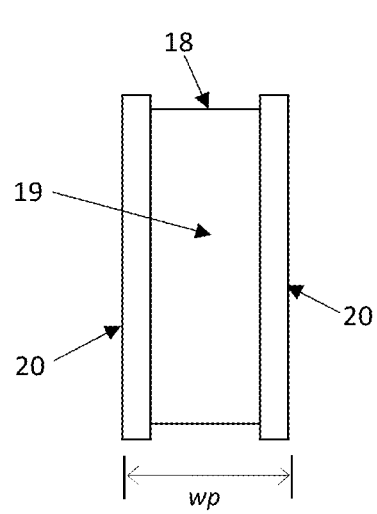
Figure 11:
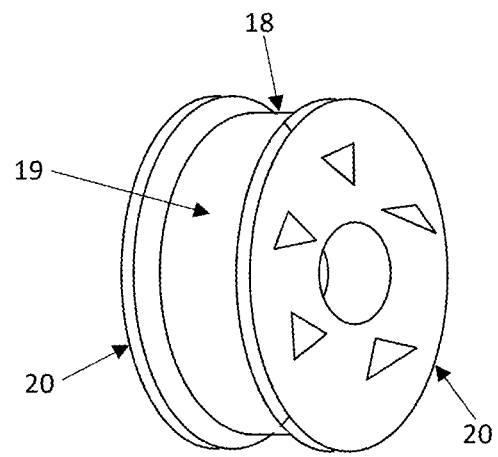
Figure 22:
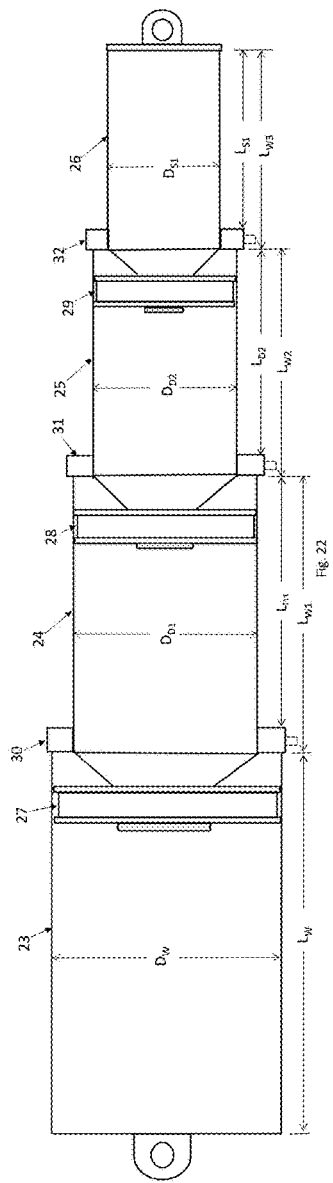
Figure 23:
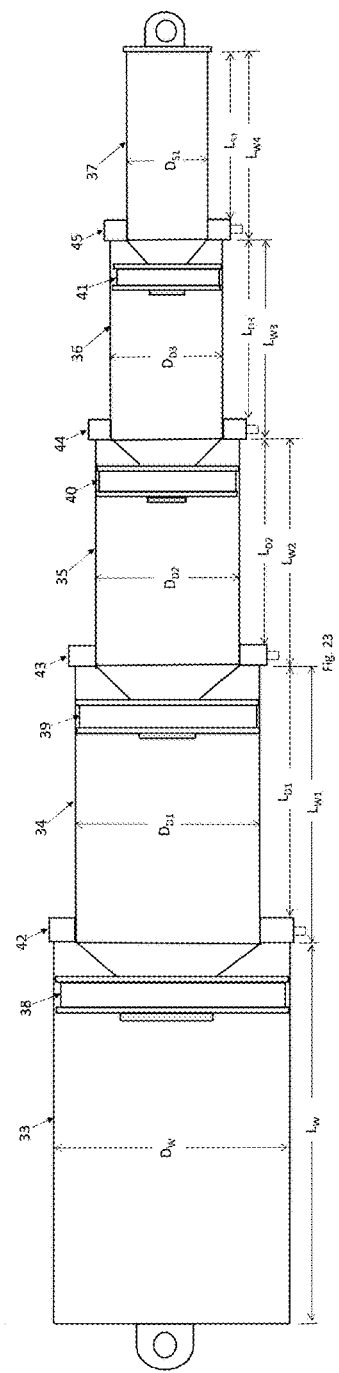
Figure 24:
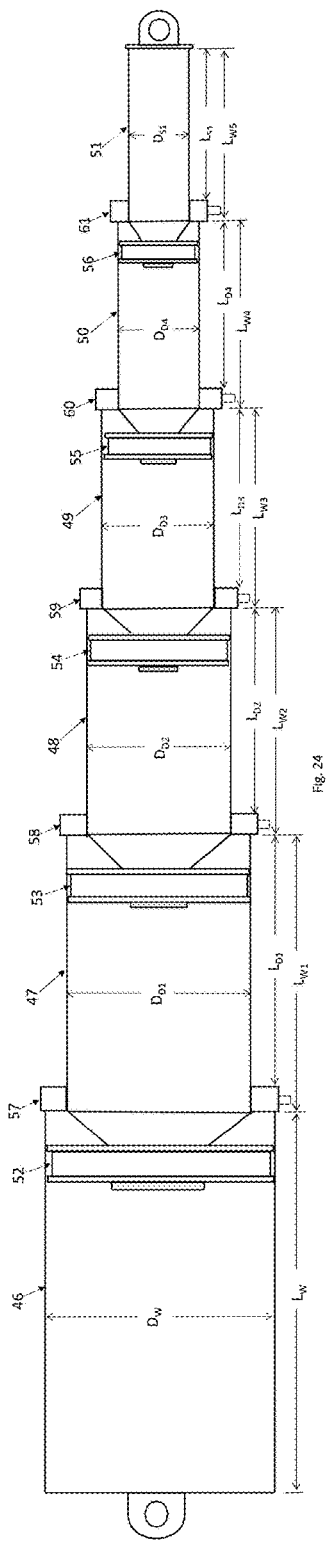
Figures 31, 32, 33, 34, 35:
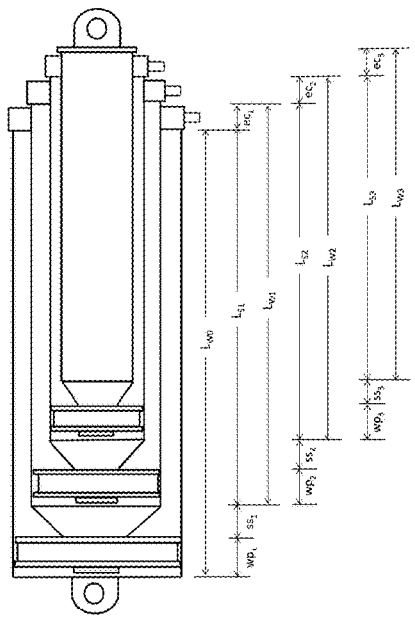
Figure 36:
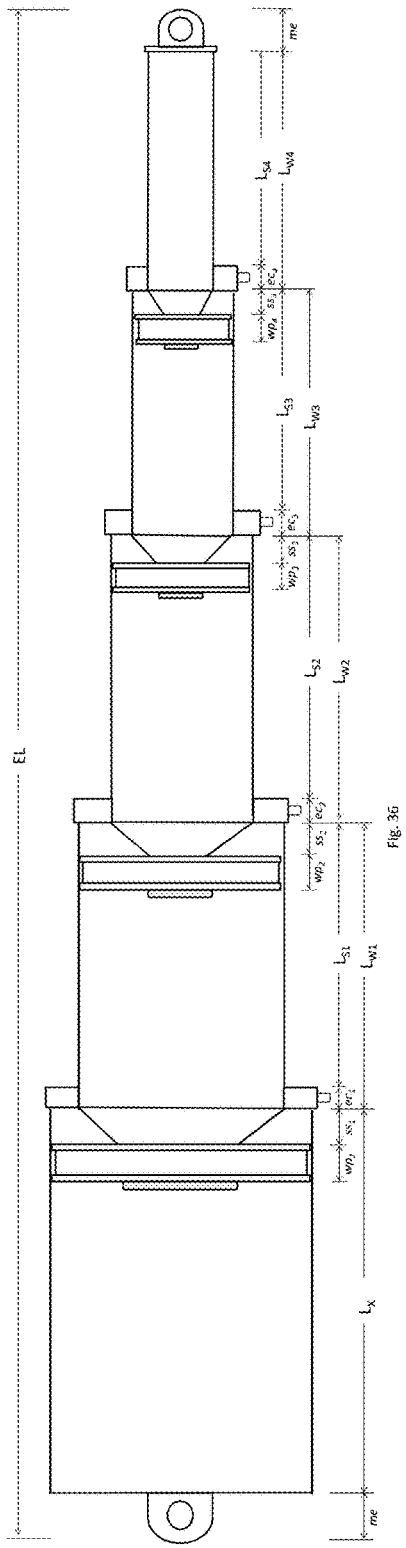
Figure 37:
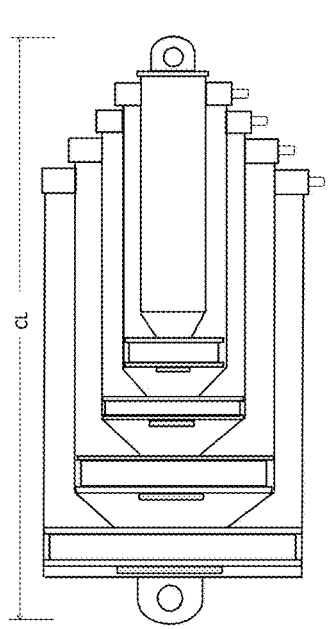
Figure 62:
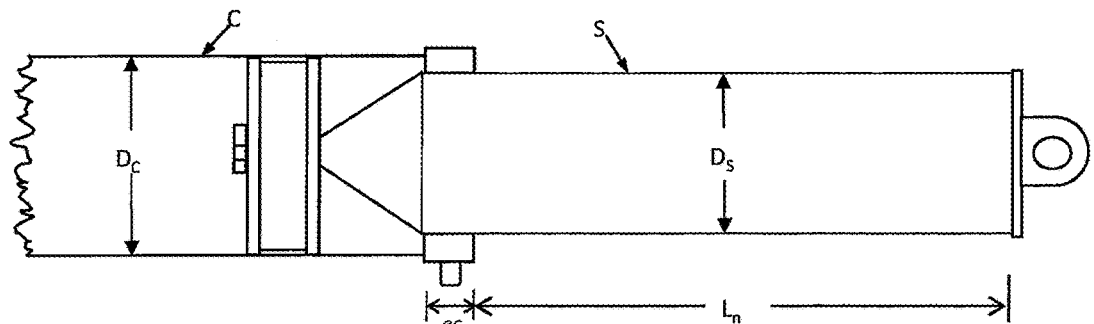
Figure 63:
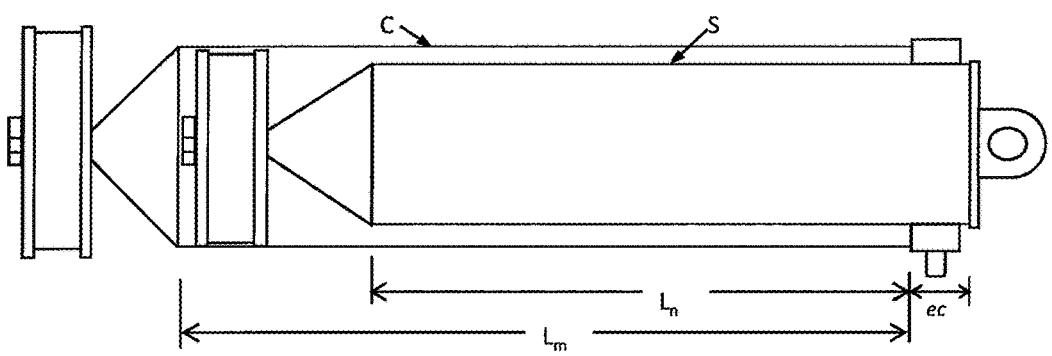
Figure 64:
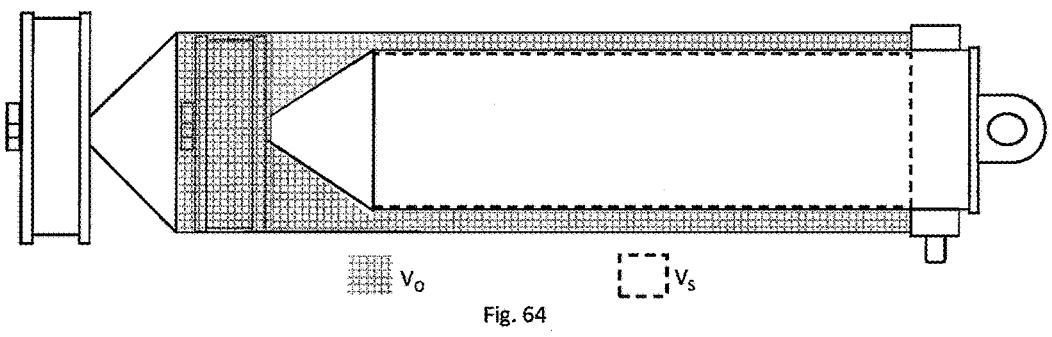
Figure 65:
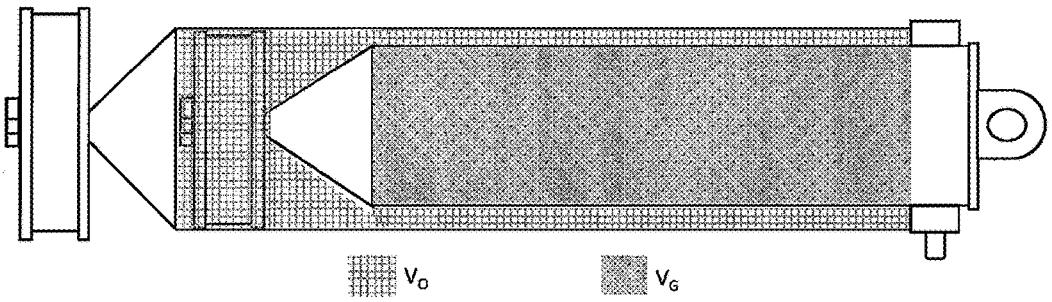
Figures 100, 101, 102:
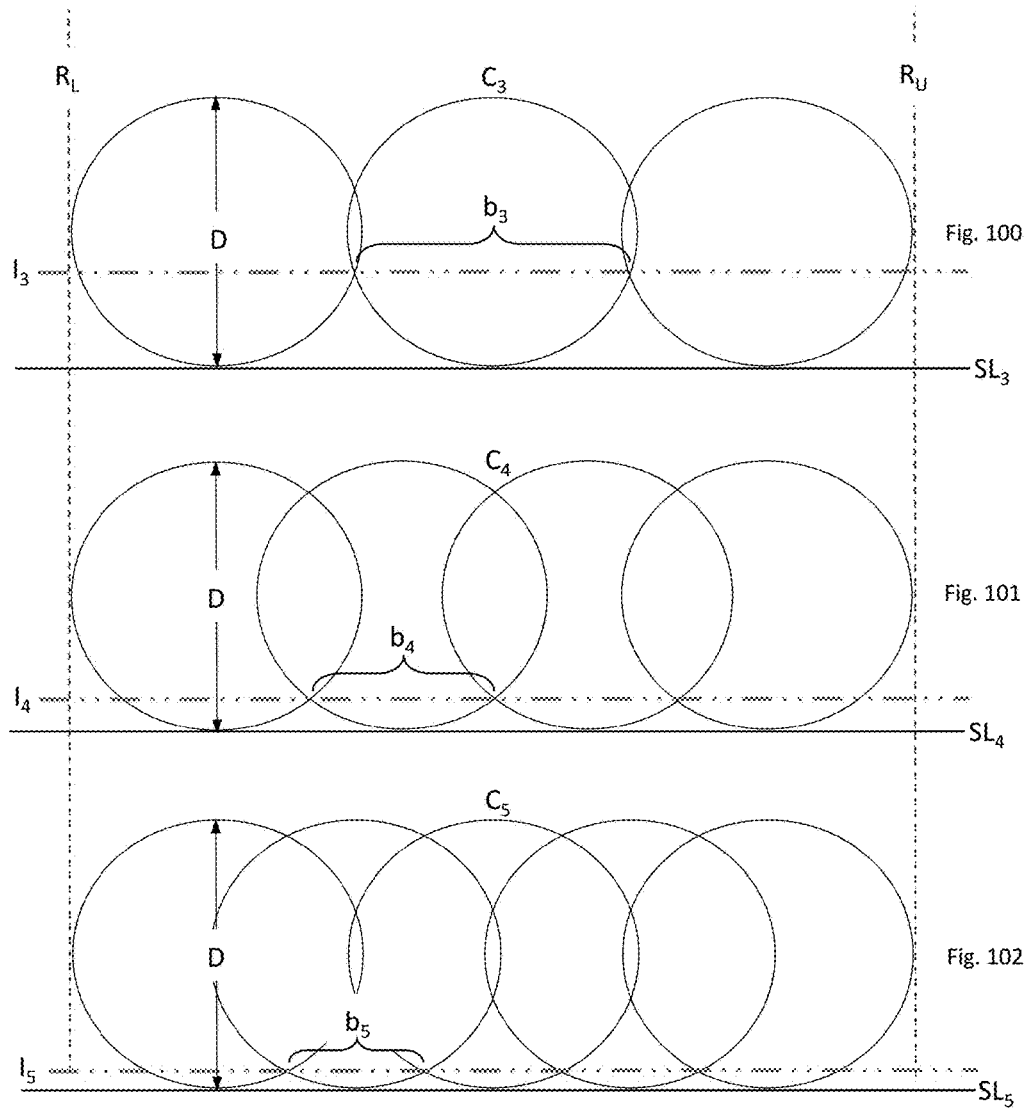

For purposes of discussion, for drawings illustrated in the plan view, the end cap is shown as two small parts at the open end of a component so that the shaft is fully exposed. This way, the features of the shaft are easier to view and understand. In contrast, for drawings illustrated in the side perspective view, the end cap is shown as a single part at the open end of a component in order to enhance the cylindrical shape of the air shock. It is appreciated that these drawings depict only illustrated embodiments of the invention and are therefore not limited to the precise arrangements and instrumentalities shown:

FIG. 1 is a side plan view of the working tube;

FIG. 2 is a side perspective view of the working tube;

FIG. 3 is a plan, top, and side perspective views of the end cap;

FIG. 4 is a side plan view of the single function shaft;

FIG. 5 is a side plan view of the dual function shaft;

FIG. 6 is a side perspective view of the single function shaft;

FIG. 7 is a side perspective view of the dual function shaft;

FIG. 8 is a side plan view of the disk and shims for the working piston;

FIG. 9 is a side perspective view of the disk and shims for the working piston;

FIG. 10 is a side plan view of the working piston;

FIG. 11 is a side perspective view of the working piston;

FIG. 12 is a plan view of the stage comprising the working tube and dual function shaft;

FIG. 13 is a plan view of the stage comprising two dual function shafts;

FIG. 14 is a side perspective view of the stage that comprises the working tube and dual function shaft;

FIG. 15 is a side perspective view of the stage that comprises two dual function shafts;

FIG. 16 is a plan view of the stage that comprises dual and single function shafts undergoing compression;

FIG. 17 is a plan view of the stage that comprises dual and single function shafts undergoing extension;

FIG. 18 is a plan view of the stage that comprises dual and single function shafts at full compression;

FIG. 19 is a plan view of the stage that comprises dual and single function shafts at full extension;

FIG. 20 is a side perspective view of the stage that comprises dual and single function shafts at full compression;

FIG. 21 is a side perspective view of the stage that comprises dual and single function shafts at full extension;

FIG. 22 is a plan view of the three stage air shock at full extension;

FIG. 23 is a plan view of the four stage air shock at full extension;

FIG. 24 is a plan view of the five stage air shock at full extension;

FIG. 25 is a plan view of the four stage air shock at full extension, spaces are identified;

FIG. 26 is a plan view of the four stage air shock at full compression, check valves are identified;

FIG. 27 is a side perspective view of the four stage air shock at full extension;

FIG. 28 is a side perspective view of the four stage air shock at full compression;

FIG. 29 is a plan view of the four stage air shock in which the first and second stages are at full extension and the third and fourth stages are at partial compression;

FIG. 30 is a side perspective view of the four stage air shock in which the first and second stages are at full extension and the third and fourth stages are at partial compression;

FIG. 31 is a plan view of the three stage air shock at full compression;

FIG. 32 is a plan view of the three stage air shock transforming to the four stage air shock;

FIG. 33 is a plan view of the four stage air shock at full compression;

FIG. 34 is a plan view of the four stage air shock transforming to the five stage air shock;

FIG. 35 is a plan view of the five stage air shock at full compression;

FIG. 36 is a plan view of the two stage air shock at full compression emphasizing a constant compressed length;

FIG. 37 is a plan view of the three stage air shock at full compression emphasizing a constant compressed length;

FIG. 38 is a plan view of the four stage air shock at full compression emphasizing a constant compressed length;

FIG. 39 is a plan view of the five stage air shock at full compression emphasizing a constant compressed length;

FIG. 40 is an algorithm including a plan view of the three stage air shock at full compression emphasizing computation of the relationships among the lengths/shaft strokes of the components for each stage;

FIG. 41 is a plan view of the four stage air shock at full extension emphasizing the lengths of the air shock and parts of each stage;

FIG. 42 is a plan view of the four stage air shock at full compression emphasizing the length of the air shock;

FIG. 43 is an equation used to compute the length of the working tube $L_{X+1}$ for the multiple stage air shock comprising X+1 stages where X=7;

FIG. 44 is an equation used to compute the lengths of the nth dual function shafts $L_{W_n}$ for the multiple stage air shock comprising X stages where n=1, 2, . . . , X−1 and X=2-8;

FIG. 45 is an equation used to compute the shaft stroke for the first stage $L_{S1}$ for the multiple stage air shock comprising X stages where X=1-8;

FIG. 46 is an equation used to compute the shaft stroke for the nth stage $L_{S_n}$ for the multiple stage air shock comprising X stages where n=2, 3, . . . , X and X=2-8;

FIG. 47 is an equation used to compute the compressed length $CL_X$ for the multiple stage air shock comprising X stages where X=1-8;

FIG. 48 is an equation used to compute the extended length $EL_X$ for the multiple stage air shock comprising X stages where X=1-8;

FIG. 49 shows the selected value for the mounting eyelet me;

FIGS. 50-57 are tables of the selected values for $wp_n$, $ss_n$, and $ec_n$ for the nth stage for the multiple stage air shock comprising X stages where n=1, 2, ..., X and X=1-8;

FIGS. 58-60 are tables of the computed values for $L_X$, $L_{W1-7}$, $L_{S1-8}$, $CL_X$, $EL_X$, and $EL_X/CL_X$ for the multiple stage air shock comprising X stages where X=1-8 and $L_1$ is a selected value;

FIG. 61 is a table of the computed values for the optimum extended length $EL_{MAX}$ for the multiple stage air shock comprising X stages where X=4-6;

FIG. 62 is a partial plan view of the stage that comprises a component and shaft at full extension;

FIG. 63 is a plan view of the stage that comprises a component and shaft at full compression;

FIG. 64 is a plan view of the stage that comprises a component and shaft at full compression emphasizing the volume of the shaft;

FIG. 65 is a plan view of the stage that comprises a component and shaft at full compression emphasizing the volumes of the oil and gas;

FIG. 66 is an equation used to compute the area of the working tube, or first, second, or third dual function shaft or area of the first, second, or third dual function shaft stroke or single function shaft stroke, $A_n$;

FIG. 67 is an equation used to compute the volume of the working tube, or first, second, or third dual function shaft, $V_m$;

FIG. 68 is an equation used to compute the volume of the first, second, or third dual function shaft stroke or single function shaft stroke, $V_n$;

FIG. 69 is an equation used to compute the volume of the gas charge for the first, second, third, or fourth stage, $V_{Gt}$;

FIG. 70 is an equation used to compute the volume of the oil charge in cubic inches for the first, second, third, or fourth stage, $V_{Ot}$ (in³);

FIG. 71 is an equation used to compute the volume of the oil charge in cubic centimeters for the first, second, third, or fourth stage, $V_{Ot}$ (cc);

FIG. 72 is an equation used to compute the shaft stroke at ride height for the first, second, third, or fourth stage, $L_t$;

FIG. 73 is an equation used to compute the volume of the shaft stroke at ride height for the first, second, third, or fourth stage, $V_t$;

FIG. 74 is an equation used to compute the gas charge at ride height for the first, second, third, or fourth stage, $P_{Gt}$;

FIG. 75 is an equation used to compute the constant in Boyle's Law for the first, second, third, or fourth stage, $c_t$;

FIG. 76 is an equation used to compute the volume of the stage at the selected incremental shaft stroke for the first, second, third, or fourth stage, $V_Z$;

FIG. 77 is an equation used to compute the gas pressure at the selected incremental shaft stroke for the first, second, third, or fourth stage, $P_Z$;

FIG. 78 is an equation used to compute the suspension force at the selected incremental shaft stroke for the first, second, third, or fourth stage, $F_Z$;

FIG. 79 is an equation used to compute the spring rate at the selected incremental shaft stroke for the first, second, third, or fourth stage, $SR_Z$;

FIG. 80 is an equation used to compute the percent change in incremental shaft stroke at the selected incremental shaft stroke for the first, second, third, or fourth stage, % $\Delta L_Z$;

FIG. 81 is an equation used to compute the percent change in gas pressure at the selected incremental shaft stroke for the first, second, third, or fourth stage, % $\Delta P_Z$;

FIG. 82 is an equation used to compute the percent change in spring rate at the selected incremental shaft stroke for the first, second, third, or fourth stage, % $\Delta SR_Z$;

FIG. 83 is an equation used to compute the change in incremental shaft stroke at the selected incremental shaft stroke for the first, second, third, or fourth stage, $\Delta L_Z$;

FIG. 84 is a table of the selected values for $D_W$, $D_n$, $L_W$, $L_n$, % $L_t$, and $F_t$ where n=D1, D2, D3, or S1 and t=1-4, respectively;

FIG. 85 is a table of the computed values for $A_W$, $A_n$, $V_m$, $V_n$, $V_{Gt}$, $V_{Ot}$(in), $V_{Ot}$(cc), and $c_t$ where m=W, W1, W2, or W3, n=D1, D2, D3, or S1, and t=1-4, respectively;

FIG. 86 is a table of the computed values for $L_t$, $V_t$, and $P_{Gt}$ where t=1-4;

FIG. 87 is a table of the computed values for $V_{1e}$, $P_{1e}$, $F_{1e}$, % $\Delta L_{1e}$, % $\Delta P_{1e}$, $SR_{1e}$, % $\Delta SR_{1e}$, and selected value for $L_{1e}$ where 1e refers to the first stage;

FIG. 88 is a table of the computed values for $V_{2f}$, $P_{2f}$, $F_{2f}$, % $\Delta L_{2f}$, % $\Delta P_{2f}$, $SR_{2f}$, % $\Delta SR_{2f}$, and selected value for $L_{2f}$ where 2f refers to the second stage;

FIG. 89 is a table of the computed values for $V_{3g}$, $P_{3g}$, $F_{3g}$, % $\Delta L_{3g}$, % $\Delta P_{3g}$, $SR_{3g}$, % $\Delta SR_{3g}$, and selected value for $L_{3g}$ where 3g refers to the third stage;

FIG. 90 is a table of the computed values for $V_{4h}$, $P_{4h}$, $F_{4h}$, % $\Delta L_{4h}$, % $\Delta P_{4h}$, $SR_{4h}$, % $\Delta SR_{4h}$, and selected value for $L_{4h}$ where 4h refers to the fourth stage;

FIG. 91 is a table of the computed values for % $\Delta L_{1e}$, $F_{1e}$, $\Delta L_{1e}$, $SR_{1e}$ and selected value for $L_{1e}$ where 1e refers to the first stage;

FIG. 92 is a table of the computed values for % $\Delta L_{2f}$, $F_{2f}$, $\Delta L_{2f}$, $SR_{2f}$, and selected value for $L_{2f}$ where 2f refers to the second stage;

FIG. 93 is a table of the computed values for % $\Delta L_{3g}$, $F_{3g}$, $\Delta L_{3g}$, $SR_{3g}$, and selected value for $L_{3g}$ where 3g refers to the third stage;

FIG. 94 is a table of the computed values for % $\Delta L_{4h}$, $F_{4h}$, $\Delta L_{4h}$, $SR_{4h}$, and selected value for $L_{4h}$ where 4h refers to the fourth stage;

FIG. 95 is a graph of the curved lines of suspension force $F_{1-4}$ vs change in incremental shaft stroke $L_{1-4}$ for the first, second, third, and fourth stages;

FIG. 96 is an illustration of a curved line tangent to a straight line;

FIG. 97 is a graph of the curved lines of spring rate $SR_{1-4}$ vs change in incremental shaft stroke $L_{1-4}$ for the first, second, third, and fourth stages in which a disjointed jagged dotted line is traced over a part of each curved line;

FIG. 98 is an illustration of the curved lines for four stages tangent to a straight line;

FIG. 99 is a graph of the curved lines of suspension force $F_{1-4}$ vs change in incremental shaft stroke $L_{1-4}$ for the first, second, third, and fourth stages in which a dotted line is traced over a part of each curved line;

FIG. 100 is an illustration of a set of three circles, each circle represents a curved line for a stage in a three stage air shock, the illustration emphasizing the size of the curved line part of each stage;

FIG. 101 is an illustration of a set of four circles, each circle represents a curved line for a stage in a four stage air shock, the illustration emphasizing the size of the curved line part of each stage;

FIG. 102 is an illustration of a set of five circles, each circle represents a curved line for a stage in a five stage air shock, the illustration emphasizing the size of the curved line part of each stage.

DETAILED DESCRIPTION OF THE INVENTION

Discussed herein is a process suitable for constructing the multiple stage air shock. While the multiple stage design is known in the art, our investigation uncovered characteristics about the design that are absent in the art. These characteristics define a process for constructing an air shock with the multiple stage design. Since the multiple stage air shock that is disclosed in the patent application Ser. No. 13/854,055 filed on Mar. 30, 2013 is representative of the multiple stage design, the multiple stage air shock serves as the basis for the present invention. The construction process includes means for adding stages to the multiple stage air shock, determining the compressed, extended, and optimized extended lengths for the multiple stage air shock, and determining relatively linear spring rates for the multiple stage air shock. To exemplify the present invention, the multiple stage air shock comprising four stages is described in detail.

To facilitate understanding of the present invention, the multiple stage air shock and its constituent parts are described in detail, the parts including a working tube, two or more shafts, working pistons, and end caps.

Referring to FIGS. 1-3, the working tube 10 is illustrated in detail. The working tube 10 is constructed of metal such as aluminum with the structure of a thin-walled cylinder. The working tube has a diameter $D_W$ and length $L_W$ and one and the second ends whereby the one end is closed and the second end is open. The closed end is attached to a mounting eyelet 11 while the open end is attached to an end cap 12. The end cap 12 has a composite construction that includes a metal part 13 such as aluminum and flexible material part 14 such as rubber. The end cap 12 has the structure of a thick ring. The end cap 12 has a thickness ec whereby the metal part 13 serves to attach the end cap 12 to the working tube 10 while the flexible material part 14 serves as a seal in a manner like a torus gasket. The mounting eyelet 11 has a thickness me and enables the air shock to be attached to a suspended part of the vehicle.

Referring to FIGS. 4-7, the shaft is illustrated in detail. The shaft is constructed of metal such as aluminum with the structure of a thin-walled cylinder. The shaft has a diameter $D_S$ and length $L_{Wn}$ and one and the second ends whereby the one end is closed and the second end is either closed or open. The one end is narrowed down into a threaded shank 17. The narrowed down part defines a shaft shoulder and has a thickness ss while the threaded shank 17 serves as a fastener that is attached to a working piston. When the second end is closed, the second end is attached to a mounting eyelet 11 and the shaft is a single function shaft 15. When the second end is open, the second end is attached to the end cap 12 and the shaft is a dual function shaft 16. The mounting eyelet 11 enables the air shock to be attached to a non-suspended part of the vehicle.

Referring to FIGS. 8-11, the working piston 18 is illustrated in detail. The working piston 18 has a composite construction that includes a disk 19 and shims 20. The disk 19 is made from a hardened material such as aluminum or plastic with the structure of a thick circular bushing. The disk 19 contains a large hole in the center and smaller surrounding holes whereby the center hole fits over the threaded shank 17 such that the working piston 18 can be attached to the shaft. The shims 20 are made from steel or aluminum in the shape of thin, flat, round, washers; and the washers have varying holes, diameters, and thicknesses. The shims 20 are arranged sequentially on each side of the disk 19 whereby the combination of the disk and shims gives the working piston 18 a thickness wp.

Referring to FIGS. 12-21, the stage is illustrated in detail. A stage refers to one and the second interconnected components whereby the one component is the single or dual function shaft 15 or 16 while the second component is the dual function shaft 16 or working tube 10. The interconnection refers to the one closed end of the one component being slidably inserted through the end cap 12 and into the open end of the second component. The working piston 18 is attached to the one closed end of the one component while the end cap 12 is attached to the open end of the second component whereby the one component is enabled to slide into and out of the second component under cooperative guidance by the working piston 18 and end cap 12. The insertion of one component into the second component defines a space 21 within the second component whereby the space 21 is between the closed end and end cap 12. The space 21 has a volume and refers to the volume of the stage. The end cap 12 is equipped with a check valve 22 whereby the check valve 22 permits oil and gas to be added to or removed from the second component. The addition of a given amount of oil or gas refers to the oil or gas charge, respectively. This way, the space 21 within the second component is occupied by the oil and gas whereby the sealing action of the end cap 12 confines the oil and gas to the space 21. The confinement allows the oil to have a volume and the gas to have both a volume and pressure.

Road obstructions encountered by the vehicle refer to forces that act on the suspension system thereby causing the suspension system to move. These forces are referred to as suspension forces, and are transferred from the vehicle to the air shock and then to the stage. The suspension forces exerted on the stage cause the one component to slide into or out of the second component. Referring to FIGS. 16 and 17, the action of one component sliding into or out of the second component refers to shaft compression or extension whereby the compression or extension of the shaft refers to compression or extension of the stage, respectively, such that the compression or extension of the stage refers to the operation of the stage. Referring to FIG. 18 or 19, the operation results in the stage being able to be in a state of full compression or extension, respectively, or in any variation thereof, whereby the shaft motion from full compression to full extension or vice versa refers to the shaft stroke $L_S$. Referring to FIG. 19, the dimensions of the parts comprising the stage are shown whereby the length of the shaft that protrudes out of the second component is defined as the shaft stroke $L_S$. The shaft motion causes a change in the volume of the second component occupied by the oil and gas which in turn causes a change in the pressure of the gas. The shaft motion also results in a mixing of the oil and gas whereby the mixing of the oil and gas refers to an emulsion. The gas pressure is related to the gas charge and defines a force whereby the force is able to be a suspension spring force. The suspension spring force provides the stage with a suspension spring capability thereby enabling the stage both to support a part of a weight of the vehicle and to react to suspension movements. Since the suspension spring capability of the stage refers to suspension movements which in turn cause the stage to undergo the operation of compression or extension, then the suspension spring capability of the stage defines the operation of the stage such that partial compression or extension of the stage refers to part of the suspension spring capability being utilized in the operation of the stage. The part of the suspension spring capability that is utilized in the operation of the stage is dependent on the gas charge. The action of the working piston 18 sliding into or out of the second component causes the oil to flow through the holes in the working piston 18. The flow of the oil through the holes causes the working piston 18 to resist the sliding of the one component whereby the resistance acts to dampen the suspension spring motion of the stage. The shims 20 control the amount of resistance of the working piston 18 by regulating the rate of the oil flow through the holes.

The multiple stage air shock is constructed on the basis of one and the second interconnecting components being able to belong to one and another stages, respectively, whereby the one component for one stage is able to slide into and out of the second component for another stage such that the interconnection between one and the second components refers to one and another stages being interconnected in series. In order for one component to be inserted into and then slide completely into and out of the second component, the diameter and length of the one component must cooperate with that of the second component. Therefore, the components are interconnected according to diameter and length: diameter whereby one component with a smaller diameter is inserted into the second component with a larger diameter; and length whereby the one component is shorter than is the second component in order to account for the thicknesses of the working piston and shaft shoulder; and the length of each single or dual function shaft refers to each single or dual function shaft stroke, respectively. Further discussion about the lengths of one and the second components is covered below.

Regarding diameter: to fully utilize the capability of the multiple stage design, the diameter of the one component must be just slightly smaller than that of the second component such that the one component is able to be inserted into the second component. The just slightly smaller concept allows for the maximum number of stages to be added to a shock with a given diameter for the working tube. Since the diameter of the one component is only slightly smaller than that of the second component, then the sliding motion of the one component will cause a significant change in the volume of the space within the second component. Since the oil is non-compressible, this change in volume must be accounted for by the gas. The net result is that a significant part of the space within the second component must be filled with a gas whereby the sliding motion of the one component will cause a significant change in the volume of the space which in turn will cause a significant change in the gas pressure. In the art, any shock absorber comprising a shaft whose motion causes a significant change in the volume of the space within the working tube is known as an air shock whereby the air shock possesses both dampening and suspension spring properties, the suspension spring property being determined by the gas pressure. Therefore by definition, any shock absorber comprising a multiple stage design must be an air shock.

Referring to FIGS. 22-24, symbols for the diameters and lengths of stages in the multiple stage air shock are defined. In particular, the working tube has the largest diameter and length; the diameter and length of each dual function shaft are smaller than the working tube, while the single function shaft has the smallest diameter and length. For example, consider a multiple stage air shock constructed with three, four, or five stages whereby the components of each construct are able to involve a working tube, first dual function shaft, second dual function shaft, third dual function shaft, fourth dual function shaft, and single function shaft. For purposes of discussion, the diameters and lengths of the working tube, first dual function shaft, second dual function shaft, third dual function shaft, fourth dual function shaft, and single function shaft are defined as $D_W$, $D_{D1}$, $D_{D2}$, $D_{D3}$, $D_{D4}$, and $D_{S1}$ and $L_W$, $L_{W1}$, $L_{W2}$, $L_{W3}$, $L_{W4}$, and $L_{W5}$, respectively. The shaft strokes of the first dual function shaft, second dual function shaft, third dual function shaft, fourth dual function shaft, and single function shaft are defined as $L_{D1}$, $L_{D2}$, $L_{D3}$, $L_{D4}$, and $L_{S1}$, respectively. Referring to FIG. 22 in the three stage air shock, the diameters and lengths of the working tube 23, first dual function shaft 24, second dual function shaft 25, and single function shaft 26 decrease in the order $D_W > D_{D1} > D_{P2} > D_{S1}$, and $L_W > L_{W1} > L_{W2} > L_{W3}$, respectively, such that the first dual function shaft 24 is slidably inserted into the working tube 23, the second dual function shaft 25 is slidably inserted into the first dual function shaft 24, and the single function shaft 26 is slidably inserted into the second dual function shaft 25. Referring to FIG. 23 in the four stage air shock, the diameters and lengths of the working tube 33, first dual function shaft 34, second dual function shaft 35, third dual function shaft 36, and single function shaft 37 decrease in the order $D_W > D_{D1} > D_{D2} > D_{D3} > D_{S1}$ and $L_W > L_{W1} > L_{W2} > L_{W3} > L_{W4}$, respectively, such that the first dual function shaft 34 is slidably inserted into the working tube 33, the second dual function shaft 35 is slidably inserted into the first dual function shaft 34, the third dual function shaft 36 is slidably inserted into the second dual function shaft 35, and the single function shaft 37 is slidably inserted into the third dual function shaft 36. Referring to FIG. 24 in the five stage air shock, the diameters and lengths of the working tube 46, first dual function shaft 47, second dual function shaft 48, third dual function shaft 49, fourth dual function shaft 50, and single function shaft 51 decrease in the order $D_W > D_{D1} > D_{D2} > D_{D3} > D_{D4} > D_{S1}$ and $L_W > L_{W1} > L_{W2} > L_{W3} > L_{W4} > L_{W5}$, respectively, such that the first dual function shaft 47 is slidably inserted into the working tube 46, the second dual function shaft 48 is slidably inserted into the first dual function shaft 47, the third dual function shaft 49 is slidably inserted into the second dual function shaft 48, the fourth dual function shaft 50 is slidably inserted into the third dual function shaft 49, and the single function shaft 51 is slidably inserted into the fourth dual function shaft 50.

Referring to FIGS. 25 and 27, the multiple stage air shock comprising four stages is illustrated, and thereby defines a four stage air shock:

The first stage refers to the working tube 33 and first dual function shaft 34. The working tube 33 has a closed end and an open end, the closed end is affixed to a mounting eyelet 11 while the open end is attached to a first end cap 42. The first dual function shaft 34 has a closed end and an open end, the closed end is narrowed down thereby defining a first shaft shoulder and threaded shank, the threaded shank is attached to a first working piston 38 while the open end is attached to a second end cap 43. The closed end of the first dual function shaft 34 is slidably inserted through the first end cap 42 and into the open end of the working tube 33 thereby the first dual function shaft 34 is enabled to slide into and out of the working tube 33 under cooperative guidance by the first working piston 38 and first end cap 42. The act of the first dual function shaft 34 being inserted into the working tube 33 defines a space 62 within the working tube 33 between the closed end of the working tube 33 and first end cap 42. The space 62 has a volume $V_W$ and refers to the volume $V_W$ of the first stage. The first end cap 42 is equipped with a check valve 22, the check valve 22 serves as a means to add oil and gas to or remove oil and gas from the first stage such that the space 62 is occupied by the oil and gas whereby the first end cap 42 acts as a seal such that the oil and gas are confined to the space 62, and the confinement allows the oil to have a volume and gas to have both a volume and pressure.

The second stage refers to the first dual function shaft 34 and second dual function shaft 35. The second dual function shaft 35 has a closed end and an open end, the closed end is narrowed down thereby defining a second shaft shoulder and threaded shank, the threaded shank is attached to a second working piston 39 while the open end is attached to a third end cap 44. The closed end of the second dual function shaft 35 is slidably inserted through the second end cap 43 and into the open end of the first dual function shaft 34 thereby the second dual function shaft 35 is enabled to slide into and out of the first dual function shaft 34 under cooperative guidance by the second working piston 39 and second end cap 43. The act of the second dual function shaft 35 being inserted into the first dual function shaft 34 defines a space 63 within the first dual function shaft 34 between the closed end of the first dual function shaft 34 and second end cap 43. The space 63 has a volume $V_{W1}$ and refers to the volume $V_{W1}$ of the second stage. The second end cap 43 is equipped with a check valve 22, the check valve 22 serves as a means to add oil and gas to or remove oil and gas from the second stage such that the space 63 is occupied by the oil and gas whereby the second end cap 43 acts as a seal such that the oil and gas are confined to the space 63, and the confinement allows the oil to have a volume and gas to have both a volume and pressure.

The third stage refers to the second dual function shaft 35 and third dual function shaft 36. The third dual function shaft 36 has a closed end and an open end, the closed end is narrowed down thereby defining a third shaft shoulder and threaded shank, the threaded shank is attached to a third working piston 40 while the open end is attached to a fourth end cap 45. The closed end of the third dual function shaft 36 is slidably inserted through the third end cap 44 and into the open end of the second dual function shaft 35 thereby the third dual function shaft 36 is enabled to slide into and out of the second dual function shaft 35 under cooperative guidance by the third working piston 40 and third end cap 44. The act of the third dual function shaft 36 being inserted into the second dual function shaft 35 defines a space 64 within the second dual function shaft 35 between the closed end of the second dual function shaft 35 and third end cap 44. The space 64 has a volume $V_{W2}$ and refers to the volume $V_{W2}$ of the third stage. The third end cap 44 is equipped with a check valve 22, the check valve 22 serves as a means to add oil and gas to or remove oil and gas from the third stage such that the space 64 is occupied by the oil and gas whereby the third end cap 44 acts as a seal such that the oil and gas are confined to the space 64, and the confinement allows the oil to have a volume and gas to have both a volume and pressure.

The fourth stage refers to the third dual function shaft 36 and single function shaft 37. The single function shaft 37 has one and the other closed ends, the one closed end is narrowed down thereby defining a fourth shaft shoulder and threaded shank, the threaded shank is attached to a fourth working piston 41 while the other closed end is affixed to a mounting eyelet 11. The one closed end of the single function shaft 37 is slidably inserted through the fourth end cap 45 and into the open end of the third dual function shaft 36 thereby the single function shaft 37 is enabled to slide into and out of the third dual function shaft 36 under cooperative guidance by the fourth working piston 41 and fourth end cap 45. The act of the single function shaft 37 being inserted into the third dual function shaft 36 defines a space 65 within the third dual function shaft 36 between the closed end of the third dual function shaft 36 and fourth end cap 45. The space 65 has a volume $V_{W3}$ and refers to the volume $V_{W3}$ of the fourth stage. The fourth end cap 45 is equipped with a check valve 22, the check valve 22 serves as a means to add oil and gas to or remove oil and gas from the fourth stage such that the space 65 is occupied by the oil and gas whereby the fourth end cap 45 acts as a seal such that the oil and gas are confined to the space 65, and the confinement allows the oil to have a volume and gas to have both a volume and pressure.

The first, second, third, or fourth stage is charged with both sufficient oil such that the first working piston 38, second working piston 39, third working piston 40, or fourth working piston 41 is submerged in oil as the first dual function shaft 34, second dual function shaft 35, third dual function shaft 36, or single function shaft 37 slides fully into or out of the working tube 33, first dual function shaft 34, second dual function shaft 35, or third dual function shaft 36, and sufficient gas such that the gas pressure in the first, second, third, or fourth stage supports one-fourth of the weight of the vehicle (one-fourth based on four air shocks per vehicle), respectively. The combination of the first dual function shaft 34 sliding into and out of the working tube 33, the second dual function shaft 35 sliding into and out of the first dual function shaft 34, the third dual function shaft 36 sliding into and out of the second dual function shaft 35, and the single function shaft 37 sliding into and out of the third dual function shaft 36 refers to the first, second, third, and fourth stages being interconnected in series, respectively. The sliding actions of the first dual function shaft 34, second dual function shaft 35, third dual function shaft 36, and single function shaft 37 are independent of one another such that the first, second, third, and fourth stages operate independently of one another.

Referring to FIGS. 25-30, each stage in the four stage air shock is illustrated in various states of operation whereby the operation refers to extension and compression; in particular, referring to: FIGS. 25 and 27, the first, second, third, and fourth stages are all fully extended; FIGS. 26 and 28, the first, second, third, and fourth stages are all fully compressed; and FIGS. 29 and 30, the first and second stages are fully extended while the third stage is compressed to 70% of shaft stroke and fourth stage is compressed to 40% of shaft stroke:

Regarding operation of the first stage, during compression the first dual function shaft 34 slides into the working tube 33 thereby both pushing the first working piston 38 through the oil and decreasing the volume of the first stage, the decrease in volume acting to increase the gas pressure while during extension the first dual function shaft 34 slides out of the working tube 33 thereby both pulling the first working piston 38 through the oil and increasing the volume of the first stage, the increase in volume acting to decrease the gas pressure. The length of the first dual function shaft 34 from full extension to full compression or vice versa refers to the first dual function shaft stroke $L_{D1}$ or shaft stroke of the first stage $L_{D1}$. The pressure of the gas is related to the gas charge and provides the first stage with a suspension spring capability thereby enabling the first stage both to support part of the weight of the vehicle and to react to suspension movements. The suspension movements cause the first stage to undergo an operation of compression or extension whereby the suspension spring capability of the first stage defines the operation of the first stage such that partial compression or extension of the first stage refers to part of the suspension spring capability being utilized in the operation of the first stage. The part of the suspension spring capability that is utilized in the operation of the first stage is dependent on the gas charge. The movement of the first working piston 38 through the oil acts to dampen the suspension spring movement of the first stage, the suspension spring movement of the first stage is caused by the change in pressure of the gas in the first stage, the change in pressure of the gas in the first stage is caused by the change in volume of the first stage. The change in volume of the first stage is caused by the first dual function shaft 34 sliding into or out of the working tube 33. The motion by the first dual function shaft 34 is caused by suspension forces exerted on the first stage, and also results in a mixing of the oil and gas occupying the first stage.

Regarding operation of the second stage, during compression the second dual function shaft 35 slides into the first dual function shaft 34 thereby both pushing the second working piston 39 through the oil and decreasing the volume of the second stage, the decrease in volume acting to increase the gas pressure while during extension the second dual function shaft 35 slides out of the first dual function shaft 34 thereby both pulling the second working piston 39 through the oil and increasing the volume of the second stage, the increase in volume acting to decrease the gas pressure. The length of the second dual function shaft 35 from full extension to full compression or vice versa refers to the second dual role shaft stroke $L_{D2}$ or shaft stroke of the second stage $L_{D2}$. The pressure of the gas is related to the gas charge and provides the second stage with a suspension spring capability thereby enabling the second stage both to support part of the weight of the vehicle and to react to suspension movements. The suspension movements cause the second stage to undergo an operation of compression or extension whereby the suspension spring capability of the second stage defines the operation of the second stage such that partial compression or extension of the second stage refers to part of the suspension spring capability being utilized in the operation of the second stage. The part of the suspension spring capability that is utilized in the operation of the second stage is dependent on the gas charge. The movement of the second working piston 39 through the oil acts to dampen the suspension spring movement of the second stage, the suspension spring movement of the second stage is caused by the change in pressure of the gas in the second stage, the change in pressure of the gas in the second stage is caused by the change in volume of the second stage. The change in volume of the second stage is caused by the second dual function shaft 35 sliding into or out of the first dual function shaft 34. The motion of the second dual function shaft 35 is caused by suspension forces exerted on the second stage, and also results in a mixing of the oil and gas occupying the second stage.

Regarding operation of the third stage, during compression the third dual function shaft 36 slides into the second dual function shaft 35 thereby both pushing the third working piston 40 through the oil and decreasing the volume of the third stage, the decrease in volume acting to increase the gas pressure while during extension the third dual function shaft 36 slides out of the second dual function shaft 35 thereby both pulling the third working piston 40 through the oil and increasing the volume of the third stage, the increase in volume acting to decrease the gas pressure. The length of the third dual function shaft 36 from full extension to full compression or vice versa refers to the third dual function shaft stroke $L_{D3}$ or shaft stroke of the third stage $L_{D3}$. The pressure of the gas is related to the gas charge and provides the third stage with a suspension spring capability thereby enabling the third stage both to support part of the weight of the vehicle and to react to suspension movements. The suspension movements cause the third stage to undergo an operation of compression or extension whereby the suspension spring capability of the third stage defines the operation of the third stage such that partial compression or extension of the third stage refers to part of the suspension spring capability being utilized in the operation of the third stage. The part of the suspension spring capability that is utilized in the operation of the third stage is dependent on the gas charge. The movement of the third working piston 40 through the oil acts to dampen the suspension spring movement of the third stage, the suspension spring movement of the third stage is caused by the change in pressure of the gas in the third stage, the change in pressure of the gas in the third stage is caused by the change in volume of the third stage. The change in volume of the third stage is caused by the third dual function shaft 36 sliding into or out of the second dual function shaft 35. The motion of the third dual function shaft 36 is caused by suspension forces exerted on the third stage, and also results in a mixing of the oil and gas occupying the third stage.

Regarding operation of the fourth stage, during compression the single function shaft 37 slides into the third dual function shaft 36 thereby both pushing the fourth working piston 41 through the oil and decreasing the volume of the fourth stage, the decrease in volume acting to increase the gas pressure while during extension the single function shaft 37 slides out of the third dual function shaft 36 thereby both pulling the fourth working piston 41 through the oil and increasing the volume of the fourth stage, the increase in volume acting to decrease the gas pressure. The length of the single function shaft 37 from full extension to full compression or vice versa refers to the single function shaft stroke $L_{S1}$ or shaft stroke of the fourth stage $L_{S1}$. The pressure of the gas is related to the gas charge and provides the fourth stage with a suspension spring capability thereby enabling the fourth stage both to support part of the weight of the vehicle and to react to suspension movements. The suspension movements cause the fourth stage to undergo an operation of compression or extension whereby the suspension spring capability of the fourth stage defines the operation of the fourth stage such that partial compression or extension of the fourth stage refers to part of the suspension spring capability being utilized in the operation of the fourth stage. The part of the suspension spring capability that is utilized in the operation of the fourth stage is dependent on the gas charge. The movement of the fourth working piston 41 through the oil acts to dampen the suspension spring movement of the fourth stage, the suspension spring movement of the fourth stage is caused by the change in pressure of the gas in the fourth stage, the change in pressure of the gas in the fourth stage is caused by the change in volume of the fourth stage. The change in volume of the fourth stage is caused by the single function shaft 37 sliding into or out of the third dual function shaft 36. The motion of the single function shaft 37 is caused by suspension forces exerted on the fourth stage, and also results in a mixing of the oil and gas occupying the fourth stage.

Referring to FIGS. 31-35, there is shown a means for adding a stage to the three or four stage air shock:

In principle, a stage can be added to the multiple stage air shock with two different ways: one way refers to adding a stage onto the working tube end of the multiple stage air shock while the other way refers to adding a stage onto the single function shaft end of the multiple stage air shock. In the one way, a new working tube is added while the existing working tube is removed and replaced with a new dual function shaft whereby the new dual function shaft is attached to a new working piston. The new working tube is attached to a new end cap such that the new dual function shaft is slidably inserted through the new end cap and into the new working tube. The new working tube and dual function shaft define the stage that is added to the multiple stage air shock. In the other way, the existing single function shaft is removed and replaced with a new dual function shaft whereby the new dual function shaft is attached to a new end cap. A new single function shaft is slidably inserted through the new end cap and into the new dual function shaft. The new single and dual function shafts define the stage that is added to the multiple stage air shock. In the one way in order for the new dual function shaft to be inserted into the new working tube, the diameter of the new working tube must be greater than is that of the existing working tube; whereas, in the other way in order for the new single function shaft to be inserted into the new dual function shaft, the diameter of the new single function shaft must be smaller than is that of the existing single function shaft. In the other way as new stages are added, the diameter of the new single function shaft will become so small that the new single function shaft will not be able to serve as a shaft in the multiple stage air shock. Therefore as a practical matter, the multiple stage air shock is able to be constructed with the one way only whereby a stage is added onto the working tube end of the multiple stage air shock. This way, the additional stage becomes the first stage for the multiple stage air shock. The existing stages and their parts are also changed in order to accommodate the addition of the new first stage: the new working tube becomes the working tube, the existing working tube is removed and replaced with a new first dual function shaft, and the new first dual function shaft, new first working piston, shaft shoulder, and end cap become the first dual function shaft, working piston, shaft shoulder, and end cap; whereas, the existing first dual function shaft, working piston, shaft shoulder, and end cap become the second dual function shaft, working piston, shaft shoulder, and end cap, respectively, and so on, until the nth end cap that is attached to the existing n−1th dual function shaft becomes the n+1th end cap while the nth working piston and shaft shoulder that are attached to the single function shaft become the n+1th working piston and shaft shoulder, whereby n+1 refers to the new number of stages in the multiple stage air shock.

Referring to FIGS. 31-33, the four stage air shock can be constructed by adding a new first stage to the three stage air shock. The three stage air shock comprises an existing working tube 23, and existing first dual function shaft 24, working piston 27, shaft shoulder, and end cap 30; existing second dual function shaft 25, working piston 28, shaft shoulder, and end cap 31; and, existing single function shaft 26, and existing third working piston 29, shaft shoulder, and end cap 32. The four stage air shock comprises a working tube 33, and first dual function shaft 34, working piston 38, shaft shoulder, and end cap 42; second dual function shaft 35, working piston 39, shaft shoulder, and end cap 43; third dual function shaft 36, working piston 40, shaft shoulder, and end cap 44; and, single function shaft 37, and fourth working piston 41, shaft shoulder, and end cap 45. The new first stage refers to the new working tube, and new first dual function shaft, working piston, shaft shoulder, and end cap which in turn refer to the working tube 33, and first dual function shaft 34, working piston 38, shaft shoulder, and end cap 42 of the four stage air shock, respectively. Referring to FIG. 32, the three stage air shock is transformed into the four stage air shock by adding the new working tube, and new first working piston, shaft shoulder, and end cap to the three stage air shock while the existing working tube 23 is removed and replaced with the new first dual function shaft in the three stage air shock. The transformation involves the following steps: (1a) the new first dual function shaft slides into and out of the new working tube and (1b) the new working tube, and new first dual function shaft, working piston, shaft shoulder, and end cap are specified as the working tube 33, and first dual function shaft 34, working piston 38, shaft shoulder, and end cap 42 whereby a cooperation between (1a) and (1b) enables the first dual function shaft 34 to slide into and out of the working tube 33 thereby defining the first stage in the four stage air shock; (2a) the existing first dual function shaft 24 slides into and out of the new first dual function shaft, (2b) the existing first dual function shaft 24, working piston 27, shaft shoulder, and end cap 30 are specified as the second dual function shaft 35, working piston 39, shaft shoulder, and end cap 43, and (2c) the new first dual function shaft, working piston, shaft shoulder, and end cap are specified as the first dual function shaft 34, working piston 38, shaft shoulder, and end cap 42 whereby a cooperation among (2a), (2b), and (2c) enables the second dual function shaft 35 to slide into and out of the first dual function shaft 34 thereby defining the second stage in the four stage air shock; (3a) the existing second dual function shaft 25 slides into and out of the existing first dual function shaft 24, (3b) the existing second dual function shaft 25, working piston 28, shaft shoulder, and end cap 31 are specified as the third dual function shaft 36, working piston 40, shaft shoulder, and end cap 44, and (3c) the existing first dual function shaft 24, working piston 27, shaft shoulder, and end cap 30 are specified as the second dual function shaft 35, working piston 39, shaft shoulder, and end cap 43 whereby a cooperation among (3a), (3b), and (3c) enables the third dual function shaft 36 to slide into and out of the second dual function shaft 35 thereby defining the third stage in the four stage air shock; and (4a) the existing single function shaft 26 slides into and out of the existing second dual function shaft 25, (4b) the existing single function shaft 26, and existing third working piston 29, shaft shoulder, and end cap 32 are specified as the single function shaft 37, and fourth working piston 41, shaft shoulder, and end cap 45, and (4c) the existing second dual function shaft 25, working piston 28, shaft shoulder, and end cap 31 are specified as the third dual function shaft 36, working piston 40, shaft shoulder, and end cap 44 whereby a cooperation among (4a), (4b), and (4c) enables the single function shaft 37 to slide into and out of the third dual function shaft 36 thereby defining the fourth stage in the four stage air shock.

Referring to FIGS. 33-35, the five stage air shock can be constructed by adding a new first stage to the four stage air shock. The four stage air shock comprises an existing working tube 33, and existing first dual function shaft 34, working piston 38, shaft shoulder, and end cap 42; existing second dual function shaft 35, working piston 39, shaft shoulder, and end cap 43; existing third dual function shaft 36, working piston 40, shaft shoulder, and end cap 44; and, existing single function shaft 37, and existing fourth working piston 41, shaft shoulder, and end cap 45. The five stage air shock comprises a working tube 46, and first dual function shaft 47, working piston 52, shaft shoulder, and end cap 57; second dual function shaft 48, working piston 53, shaft shoulder, and end cap 58; third dual function shaft 49, working piston 54, shaft shoulder, and end cap 59; fourth dual function shaft 50, working piston 55, shaft shoulder, and end cap 60; and, single function shaft 51, and fifth working piston 56, shaft shoulder, and end cap 61. The new first stage refers to the new working tube, and new first dual function shaft, working piston, shaft shoulder, and end cap which in turn refer to the working tube 46, and first dual function shaft 47, working piston 52, shaft shoulder, and end cap 57 of the five stage air shock, respectively. Referring to FIG. 34, the four stage air shock is transformed into the five stage air shock by adding the new working tube, and new first working piston, shaft shoulder, and end cap to the four stage air shock while the existing working tube 33 is removed and replaced with the new first dual function shaft in the four stage air shock. The transformation involves the following steps: (1a) the new first dual function shaft slides into and out of the new working tube and (1b) the new working tube, and new first dual function shaft, working piston, shaft shoulder, and end cap are specified as the working tube 46, and first dual function shaft 47, working piston 52, shaft shoulder, and end cap 57 whereby a cooperation between (1a) and (1b) enables the first dual function shaft 47 to slide into and out of the working tube 46 thereby defining the first stage in the five stage air shock; (2a) the existing first dual function shaft 34 slides into and out of the new first dual function shaft, (2b) the existing first dual function shaft 34, working piston 38, shaft shoulder, and end cap 42 are specified as the second dual function shaft 48, working piston 53, shaft shoulder, and end cap 58, and (2c) the new first dual function shaft, working piston, shaft shoulder, and end cap are specified as the first dual function shaft 47, working piston 52, shaft shoulder, and end cap 57 whereby a cooperation among (2a), (2b), and (2c) enables the second dual function shaft 48 to slide into and out of the first dual function shaft 47 thereby defining the second stage in the five stage air shock; (3a) the existing second dual function shaft 35 slides into and out of the existing first dual function shaft 34, (3b) the existing second dual function shaft 35, working piston 39, shaft shoulder, and end cap 43 are specified as the third dual function shaft 49, working piston 54, shaft shoulder, and end cap 59, and (3c) the existing first dual function shaft 34, working piston 38, shaft shoulder, and end cap 42 are specified as the second dual function shaft 48, working piston 53, shaft shoulder, and end cap 58 whereby a cooperation among (3a), (3b), and (3c) enables the third dual function shaft 49 to slide into and out of the second dual function shaft 48 thereby defining the third stage in the five stage air shock; (4a) the existing third dual function shaft 36 slides into and out of the existing second dual function shaft 35, (4b) the existing third dual function shaft 36, working piston 40, shaft shoulder, and end cap 44 are specified as the fourth dual function shaft 50, working piston 55, shaft shoulder, and end cap 60, and (4c) the existing second dual function shaft 35, working piston 39, shaft shoulder, and end cap 43 are specified as the third dual function shaft 49, working piston 54, shaft shoulder, and end cap 59 whereby a cooperation among (4a), (4b), and (4c) enables the fourth dual function shaft 50 to slide into and out of the third dual function shaft 49 thereby defining the fourth stage in the five stage air shock; and (5a) the existing single function shaft 37 slides into and out of the existing third dual function shaft 36, (5b) the existing single function shaft 37, and existing fourth working piston 41, shaft shoulder, and end cap 45 are specified as the single function shaft 51, and fifth working piston 56, shaft shoulder, and end cap 61, and (5c) the existing third dual function shaft 36, working piston 40, shaft shoulder, and end cap 44 are specified as the fourth dual function shaft 50, working piston 55, shaft shoulder, and end cap 60 whereby a cooperation among (5a), (5b), and (5c) enables the single function shaft 51 to slide into and out of the fourth dual function shaft 50 thereby defining the fifth stage in the five stage air shock.

Referring to FIGS. 36-61, there is shown the one methodology for determining the compressed and extended lengths of the four stage air shock, in this case emphasizing the capability of the one methodology to provide an air shock with an extended length that is greater than twice its compressed length. The dimensions derived from the one methodology are utilized in a second methodology discussed below to estimate a relatively linear spring rate for the four stage air shock.

Any shock absorber must have a compressed length that accommodates the "bottomed out" condition of a vehicle's suspension system. Given that the "bottomed out" condition of a vehicle's suspension system is constant/never changes, then the compressed length must be the same for any shock absorber installed on the vehicle. Therefore for a particular multiple stage air shock, the compressed length is constant regardless of the number of stages. Inspection of FIGS. 36-40 shows the two, three, four, and five stage air shocks, respectively, and highlights two prominent features; each air shock has the same compressed length, and the lengths of the components for a given stage decrease while viewing sequentially from the two, three, four, and then five stage air shock, the components referring to one and the second components. In order to maintain a constant compressed length, the lengths of the components comprising each stage must be decreased as the number of stages comprising the multiple stage air shock increases. Referring to FIG. 40, there is shown a means to determine the lengths of the components in a three stage air shock whereby this means serve as the basis for creating the one methodology. The one methodology includes a set of equations that is used for computing various dimensions of each stage whereby the dimensions include the lengths of the working tube and each dual function shaft, and the shaft stroke of each dual function shaft and single function shaft and thereby the shaft stroke of each stage. The one methodology is flexible and can be applied to the construction of the multiple stage air shock with any given number of stages. Although the construction of the multiple stage air shock is defined in terms of both the diameter and length of each component comprising the stage, the diameter is not discussed herein because it does not require computation. Instead, values for the diameters of one and the other interconnected components are selected whereby the selection considers that the diameter of the one component must be less than is that of the second component such that the one component is able to slide into and out of the second component.

Application of the one methodology is exemplified in the tables shown in FIGS. 58-60. Each table is derived for a particular multiple stage air shock and includes eight rows of data. Each row represents the multiple stage air shock with a different number of stages such that each table represents eight different multiple stage air shocks each with a given number of stages and the same compressed length whereby particular refers to different numbers of stages but the same compressed length. When viewing the eight rows in a table in descending order, the eight rows represent the data for the multiple stage air shock with an increasing number of stages, i.e., after a new first stage has been added to the multiple stage air shock. As a matter of principle, the multiple stage air shock must comprise at least one first stage. When the one first stage is the only stage in the multiple stage air shock, the one first stage represents one stage thereby defining the multiple stage air shock as a single stage air shock, the single stage air shock being an ordinary air shock that is well known in the art.

The one methodology is designed to compute various linear dimensions for each stage when a new first stage is added to the multiple stage air shock; this application requires the use of the equations shown in FIGS. 43-48 and is exemplified by the eight rows of data for each table shown in FIGS. 58-60. However, the one methodology can be applied to compute various linear dimensions for each stage when a new first stage is not added to the multiple stage air shock; this application requires the use of the equations shown in FIGS. 44-48, ignores the equation shown in FIG. 43, and is exemplified by any given row of data for each table shown in FIGS. 58-60.

For purposes of discussion, for any multiple stage air shock the length of the working tube for the one first stage is specified with the symbol, $L_1$. When new first stages are added to the multiple stage air shock, the addition of the new first stage defines the addition of the second, third, fourth, . . . eighth first stage, and the length of the working tube for the second, third, fourth, . . . eighth first stage is specified with the symbol, $L_2$, $L_3$, $L_4$, . . . $L_8$, respectively. When a new first stage is not added to the multiple stage air shock, the multiple stage air shock comprises a given number of stages, the one first stage defines the first stage, the length of the working tube for the first stage defines the length of the working tube, and the length of the working tube is specified with the symbol, $L_1$.

The one methodology involves the following steps:

(1) Referring to FIGS. 41 and 42, the following dimensions of the four stage air shock are defined: extended length, EL; compressed length, CL; lengths of the working tube and first, second, and third dual function shafts and single function shaft, $L_X$ and $L_{W1-4}$; shaft strokes of the first, second, third, and fourth stages, $L_{S1-4}$; and thicknesses of the first, second, third, and fourth working pistons, $wp_{1-4}$; shaft shoulders, $ss_{1-4}$; and end caps, $ec_{1-4}$. These dimensions serve as the basis for the dimensions shown in FIGS. 43-61. A value is selected for the thickness of the mounting eyelet, me, whereby this value is shown in FIG. 49;

and a value is selected for the length of working tube, $L_1$, whereby this value is shown in FIGS. 58-60 and a different value for $L_1$ is selected for each figure;

The length of the working tube is able to be interpreted in two different ways, depending on the application of the one methodology: (1) If the one methodology is applied to determine the length of the working tube for each first stage when a new first stage is added to the multiple stage air shock, then a value for the length of the working tube for the one first stage, $L_1$, is selected while a value for the length of the working tube for each additional first stage, $L_{2-8}$, is computed with the equation shown in FIG. 43. (2) If the one methodology is used to determine the length of the working tube for the one first stage when a new first stage is not added to the multiple stage air shock, then the multiple stage air shock comprises a given number of stages, the one first stage defines the first stage, a value for the length of the working tube, $L_1$, is selected, and the equation shown in FIG. 43 is ignored;

(2) values are selected for the thicknesses of the working piston, $wp_n$, shaft shoulder, $ss_n$, and end cap, $ec_n$, for the nth or n+1th stage whereby these values are shown in FIGS. 50-57. Each FIG. 50-57 refers to n number of stages such that a new first stage is added when reading step-wise from one figure to the next figure. A new set of values are selected for $wp_n$, $ss_n$, and $ec_n$ for the new first stage. This way, the values for $wp_n$, $ss_n$, and $ec_n$ for the nth stage in FIG. 50 are applied to the n+1th stage in FIG. 51 and so on where n or n+1=1, 2, . . . , 8;

(3) the selected values are used in the equations shown in FIGS. 43-48 to compute the values for the: length of the working tube, $L_{2-8}$; length of the first, second, third, fourth, fifth, sixth, or seventh dual function shaft, $L_{W1-7}$; shaft strokes of the first, second, third, fourth, fifth, sixth, seventh, or eighth stage, $L_{S1-8}$; compressed length, $CL_X$; extended length, $EL_X$; and ratio of extended length vs compressed length, $EL_X/CL_X$. These computed values are shown in FIGS. 58-60 whereby for each figure, each row of values refers to the air shock with X number of stages and X=1-8;

(4) the largest value computed for the extended length $EL_X$ refers to the optimum extended length $EL_{MAX}$ and is copied from FIG. 58-60 to FIG. 61;

(5) referring to FIGS. 58-60, each row where X=4 refers to the four stage air shock whereby the value computed for $EL_4$ represents the extended length based on a given compressed length $CL_4$.

Application of the one methodology for the four stage air shock involves the following steps:

(1) defining the four stage air shock as a multiple stage air shock with a given number of stages, defining the one first stage as the first stage, specifying the length of the working tube with the symbol, $L_1$, using the equations shown in FIGS. 44-48 to determine the compressed and extended lengths, and ignoring the equation shown in FIG. 43;

(2) selecting values for the: (a) length of the working tube, $L_1$, (b) thicknesses of the first, second, third, and fourth working pistons, $wp_{1-4}$, shaft shoulders, $ss_{1-4}$, and end caps, $ec_{1-4}$, and (c) thickness of the mounting eyelet me;

(3) computing values for the lengths of the first, second, and third dual function shafts, $L_{W1-3}$ and single function shaft, $L_{W4}$;

(4) accounting for the thicknesses of the working piston, $wp_{1-4}$, shaft shoulder, $ss_{1-4}$, and end cap, $ec_{1-4}$ when computing the length of the one component: (a) the first dual function shaft 34, working piston 38, and shaft shoulder are located inside the working tube 33 while the first end cap 42 is located at the open end of the working tube 33 when the first dual function shaft 34 slides fully into the working tube 33, (b) the second dual function shaft 35, working piston 39, and shaft shoulder are located inside the first dual function shaft 34 while the second end cap 43 is located at the open end of the first dual function shaft 34 when the second dual function shaft 35 slides fully into the first dual function shaft 34, (c) the third dual function shaft 36, working piston 40, and shaft shoulder are located inside the second dual function shaft 35 while the third end cap 44 is located at the open end of the second dual function shaft 35 when the third dual function shaft 36 slides fully into the second dual function shaft 35, and (d) the single function shaft 37 and fourth working piston 41 and shaft shoulder are located inside the third dual function shaft 36 while the fourth end cap 45 is located at the open end of the third dual function shaft 36 when the single function shaft 37 slides fully into the third dual function shaft 36;

(5) computing the length of the one component in terms of the length of the second component: the locations of the: (a) first dual function shaft 34, working piston 38, shaft shoulder, and end cap 42 when the first dual function shaft 34 slides fully into the working tube 33 define the length of the first dual function shaft, $L_{W1}$, as the sum of the length of the working tube, $L_1$, less the thicknesses of the first working piston, $wp_1$, and shaft shoulder, $ss_1$, plus the thickness of the first end cap, $ec_1$, (b) second dual function shaft 35, working piston 39, shaft shoulder, and end cap 43 when the second dual function shaft 35 slides fully into the first dual function shaft 34 define the length of the second dual function shaft, $L_{W2}$, as the sum of the length of the first dual function shaft, $L_{W1}$, less the thicknesses of the second working piston, $wp_2$, and shaft shoulder, $ss_2$, plus the thickness of the second end cap, $ec_2$, (c) third dual function shaft 36, working piston 40, shaft shoulder, and end cap 44 when the third dual function shaft 36 slides fully into the second dual function shaft 35 define the length of the third dual function shaft $L_{W3}$, as the sum of the length of the second dual function shaft, $L_{W2}$, less the thicknesses of the third working piston, $wp_3$, and shaft shoulder, $ss_3$, plus the thickness of the third end cap, $ec_3$, and (d) single function shaft 37 and the fourth working piston 41, shaft shoulder, and end cap 45 when the single function shaft 37 slides fully into the third dual function shaft 36 define the length of the single function shaft, $L_{W4}$, as the sum of the length of the third dual function shaft, $L_{W3}$, less the thicknesses of the fourth working piston, $wp_4$, and shaft shoulder, $ss_4$, plus the thickness of the fourth end cap, $ec_4$;

(6) computing the shaft stroke of each stage in terms of the length of the other component: the first, second, and third dual function shaft strokes, $L_{S1-3}$, are equal to the sums of the lengths of the first, second, and third dual function shafts, $L_{W1-3}$, less the thicknesses of the first, second, and third end cap, $ec_{1-3}$ while the single function shaft stroke, $L_{S4}$, is equal to the sum of the length of the single function shaft, $L_{W4}$, less the thickness of the fourth end cap, $ec_4$, the summations define the shaft stroke of the: (a) first stage, $L_{S1}$, as the sum of the length of the working tube, $L_1$, less the thicknesses of the first working piston, $wp_1$, and shaft shoulder, $ss_1$, (b) second stage, $L_{S2}$, as the sum of the length of the first dual function shaft $L_{W1}$, less the thicknesses of the second working piston, $wp_2$, and shaft shoulder, $ss_2$, (c) third stage, $L_{S3}$, as the sum of the length of the second dual function shaft, $L_{W2}$, less the thicknesses of the third working piston, $wp_3$, and shaft shoulder, $ss_3$, and (d) fourth stage, $L_{S4}$, as the sum of the length of the third dual function shaft, $L_{W3}$, less the thicknesses of the fourth working piston, $wp_4$, and shaft shoulder, $ss_4$, respectively;

(7) computing the compressed length $CL_4$, as the sum of the length of the working tube, $L_1$, plus the thicknesses of two mounting eyelets, 2·me, plus the sum of the thickness of each end cap, $ec_{1-4}$;

(8) computing the extended length, $EL_4$, as the sum of the compressed length, $CL_4$, plus the sum of the shaft stroke of each stage, $L_{S1-4}$;

Conclusions of the application of the one methodology for the four stage air shock include:

(1) referring to FIGS. 58-60, the value for $EL_4/CL_4$ for the four stage air shock is 2.43, 2.81, and 3.10, respectively. These values highlight an important feature—the multiple stage design is capable of producing an air shock whose extended length $EL_X$ is greater than twice its compressed length $CL_X$—a feature inherently unobtainable for any ordinary shock absorber in the art;

(2) referring to FIGS. 58-60, as the number of stages comprising the multiple stage air shock increases from one to eight, the extended length $EL_X$ reaches a maximum value and then decreases where X=1-8. This discovery indicates that the one methodology offers an optimum extended length $EL_{MAX}$ for a multiple stage air shock with a given compressed length $CL_X$ where X=1-8;

(3) the number of stages required to reach the optimum extended length $EL_{MAX}$ for a multiple stage air shock is related to the compressed length $CL_X$ where X=1-8;

(4) the values for the shaft strokes for each stage can be used in a second methodology to estimate the spring rate for the four stage air shock;

Note: referring to FIGS. 49-57 and $L_1$ in FIGS. 58-60, the dimensions and values listed therein are selected for purposes of discussion only and are not meant to imply proper values for any stage in the multiple stage air shock.

Referring to FIGS. 62-99, there is shown the second methodology for estimating the spring rate for the four stage air shock, in this case emphasizing the capability of the second methodology to provide a relatively linear spring rate. The dimensions derived from the one methodology discussed above are utilized herein to derive a set-up for the four stage air shock, the set-up is a feature of the second methodology and serves to estimate the linearity of the spring rate.

The ordinary air shock has a progressive spring rate and provides little resistance for the first 60-75% of shock travel and then gets exponentially harder for the final 30% of shock travel. Arguably the air shock would serve as a better suspension spring if it possessed a linear spring rate similar to that for a steel spring. The spring rate for an air shock is well-known in the art and serves as the basis for creating the second methodology. The second methodology includes a set of equations that is used for computing various properties of each stage. The properties of each stage relate to the set-up for the four stage air shock and lead to a graphical analysis of the operation of each stage. The second methodology is flexible and can be used to determine the spring rate for the multiple stage air shock with any given number of stages. Referring to FIGS. 62-65, there is shown part of a stage that is fully extended and a stage that is fully compressed whereby for purposes of discussion: (1) the stage comprises the shaft S and component C whereby the shaft S refers to the dual or single function shaft 16 or 15 while the component C refers to the working tube 10 or dual function shaft 16; (2) the shaft S has a diameter $D_S$ and shaft stroke $L_n$ while the component C has a diameter $D_C$ and length $L_m$, and (3) the part of the working piston that is not saturated by the oil is ignored and the shaft shoulder is ignored whereby the oil and gas occupy the space within the component C such that the volume of the space is the sum of the volumes of the oil and gas, $V_O$ and $V_G$, respectively. Since the shaft stroke $L_n$ defines how far the shaft S is able to slide into and out of the component C, then at full compression the volume of the space within the component C that is occupied by the shaft S is defined by the volume of the shaft stroke $V_S$. Therefore, the volume of the shaft stroke $V_S$ defines the volume of the gas $V_G$ and the change in the volume of the shaft stroke defines the change in the volume of the gas.

The second methodology involves the following of steps:

(1) the following properties are defined for each stage whereby one or the second component of each stage is referred to as the component: (a) diameter of the component, $D_W$, $D_{D1}$, $D_{D2}$, $D_{D3}$, $D_{S1}$, (b) length of the component, $L_W$, $L_{W1}$, $L_{W2}$, $L_{W3}$, (c) shaft stroke of the component, $L_{D1}$, $L_{D2}$, $L_{D3}$, $L_{S1}$, (d) area of the component, $A_W$, $A_{D1}$, $A_{D2}$, $A_{D3}$, $A_{S1}$, (e) volume of the component, $V_W$, $V_{W1}$, $V_{W2}$, $V_{W3}$, (f) volume of the shaft stroke of the component, $V_{D1}$, $V_{D2}$, $V_{D3}$, $V_{S1}$, (g) volume of gas charge, $V_{Gr}$, (h) volume of oil charge, $V_{Or}$, (i) suspension force at ride height, $F_r$, (i) shaft stroke at ride height, $L_r$, (k) volume at ride height, $V_r$, (l) gas charge at ride height, $P_{Gr}$, (m) percent of shaft stroke not compressed at ride height, % $L_t$, (n) Boyles' constant, $c_t$, (o) incremental shaft stroke, $L_Z$, (p) gas volume, $V_Z$, (q) gas pressure, $P_Z$, (r) suspension force, $F_Z$, (s) spring rate, $SR_Z$, (t) percent change in incremental shaft stroke, % $\Delta L_Z$, (u) percent change in gas pressure, % $\Delta P_Z$, (v) percent change in spring rate, % $\Delta SR_Z$, and (w) change in incremental shaft stroke, $\Delta L_Z$.

The subscript: (a) W, D1, D2, D3, or S1 depicts the working tube, first dual function shaft, second dual function shaft, third dual function shaft, or single function shaft such that the symbol associated with the subscript represents the property of the working tube, first dual function shaft, second dual function shaft, third dual function shaft, or single function shaft; e.g., the subscript W depicts the working tube such that the symbol, $D_W$, represents the diameter of the working tube, (b) W1, W2, or W3 depicts the first, second, or third dual function shaft such that the symbol associated with the subscript represents the property of the first, second, or third dual function shaft, (c) t=1, 2, 3, or 4 whereby 1, 2, 3, or 4 depicts the first, second, third, or fourth stage such that the symbol associated with the subscript represents the property of the first, second, third, or fourth stage, (d) z=1e, 2f, 3g, or 4h whereby 1e, 2f, 3g, or 4h depicts the first, second, third, or fourth stage such that the symbol associated with the subscript represents the property of the first, second, third, or fourth stage, (e) X depicts the working tube such that $L_X$ represents the length of the working tube, and (f) S1, S2, S3, or S4 depicts the first dual function shaft, second dual function shaft, third dual function shaft, or single function shaft such that $L_{S1}$, $L_{S2}$, $L_{S3}$, or $L_{S4}$ represents the shaft stroke of the first dual function shaft, second dual function shaft, third dual function shaft, or single function shaft, respectively. The symbols in (e) and (f) are discussed below in step (2);

(2) values are selected for the following properties: $D_W$, $D_{D1}$, $D_{D2}$, $D_{D3}$, $D_{S1}$, $L_W$, $L_{W1}$, $L_{W2}$, $L_{W3}$, $L_{D1}$, $L_{D2}$, $L_{D3}$, $L_{S1}$, $F_{1-4}$, and % $L_{1-4}$. These selected values are used in the equations shown in FIGS. 66-71 to compute the values for the following properties: $A_W$, $A_{D1}$, $A_{D2}$, $A_{D3}$, $A_{S1}$, $V_W$, $V_{W1}$, $V_{W2}$, $V_{W3}$, $V_{D1}$, $V_{D2}$, $V_{D3}$, $V_{S1}$, $V_{G1-4}$, and $V_{O1-4}$. The selected values for $L_W$, $L_{W1}$, $L_{W2}$, $L_{W3}$, and $L_{D1}$, $L_{D2}$, $L_{D3}$, $L_{S1}$, are based on the computed values for $L_X$, $L_{W1}$, $L_{W2}$, $L_{W3}$, and $L_{S1}$, $L_{S2}$, $L_{S3}$, $L_{S4}$, respectively. The symbols $L_X$, $L_{W1}$, $L_{W2}$, $L_{W3}$, and $L_{S1}$, $L_{S2}$, $L_{S3}$, $L_{S4}$, and their respective computed values are defined in the one methodology discussed above. The selected and computed values are shown in FIGS. 84 and 85, respectively;

(3) specified selected and computed values from FIGS. 84 and 85 are used in the equations shown in FIGS. 72-74 to compute the values for the following ride height properties: $L_{1-4}$, $V_{1-4}$, $P_{G1-4}$, whereby these values are shown in FIG. 86. Computed values for $P_{G1-4}$ and $V_{G1-4}$, are used in the equation shown in FIG. 75 to compute the values for Boyles' constants, $c_{1-4}$. Values for $V_{G1-4}$ and $c_{1-4}$ are shown in FIG. 85. In particular, $P_{G1-4}$ refers to the gas charge and is the pressure of the gas necessary to support the suspension force at ride height, $F_{1-4}$, and set the shaft stroke at ride height, $L_{1-4}$, for each stage whereby the suspension force at ride height refers to part of the weight of the vehicle;

(4) the shaft stroke for each stage is divided up into incremental shaft strokes, $L_Z$, in order to reflect the operation of each stage from full extension to full compression or vice versa. In effect, values for $L_Z$, are selected. These selected values and specified computed values from FIG. 85 are used in the equations shown in FIGS. 76-82 to compute the values for the following properties at each $L_Z$: $V_Z$, $P_Z$, $F_Z$, $SR_Z$, % $\Delta L_Z$, % $\Delta P_Z$, % $\Delta SR_Z$. These selected and computed values are shown in FIGS. 87-90;

(5) referring to FIGS. 87-90, the values for $L_Z$ are selected based on three objectives: one, values are selected at 0.5 inch increments of the shaft stroke; two, values are selected at 10% intervals of the shaft stroke, i.e., % $\Delta L_Z$=10, 20, . . . 90; and three, values are selected such that the suspension force at a given incremental shaft stroke for the fourth stage is the same as the minimum suspension force for the third stage, the suspension force at a given incremental shaft stroke for the third stage is the same as the minimum suspension force for the second stage, and the suspension force at a given incremental shaft stroke for the second stage is the same as the minimum suspension force for the first stage. In particular, objectives two and three facilitate plotting data on a graph;

(6) referring to FIG. 84, a value for $F_{1-4}$ is selected in order to simulate one-fourth of the weight of the vehicle while the values for % $L_{1-4}$ are selected to determine the shaft stroke for each stage at ride height. The selections prepare the four stage air shock to support the vehicle at ride height. In particular, selecting a different value for $F_{1-4}$ or % $L_{1-4}$ serves to compute a value for $P_{G1-4}$ such that one interconnecting stage has undergone partial compression before the other interconnecting stage begins to compress. As a practical matter, for a given suspension force the smallest stage compresses the most such that the values for % $L_{1-4}$ increase in the order: fourth stage<third stage<second stage<first stage. This order ensures that the curved lines for two interconnected stages intersect. Referring to the equation in FIG. 74, the method of selecting values for $F_{1-4}$ and % $L_{1-4}$ serves to compute the value for $P_{G1-4}$ to set-up the four stage air shock;

(7) specified values for $L_Z$, % $\Delta L_Z$, $F_Z$, $SR_Z$, are copied from the data tables shown in FIGS. 87-90 to the spring rate tables shown in FIGS. 91-94; also, values for $L_Z$ are used in the equation shown in FIG. 83 to compute the values for $\Delta L_Z$ whereby these computed values are shown in FIGS. 91-94. The values shown in FIGS. 91-94 serve as the basis for plotting four graphs. The values of $F_Z$ and $\Delta L_Z$ for each stage are plotted on each graph whereby the plot for each stage defines a curved line such that each graph consists of four curved lines, one curved line for each stage;

(8) the first graph refers to $F_Z$ and $\Delta L_Z$ for each stage and is shown in FIG. 95. The $F_Z$ is depicted on the vertical axis while $\Delta L_Z$ is depicted on the horizontal axis. In particular, $\Delta L_Z$ is plotted on the graph rather than $L_Z$ in order to draw the curved line for each stage on a single graph. At the point of intersection between two interconnected stages, each interconnecting stage must have the same values for the properties defining the vertical and horizontal axes. At any given point of intersection, while two interconnected stages are able to have the same $F_Z$, they would also have a different $L_Z$. Therefore, if $F_Z$ is the property defining the vertical axis, then $L_Z$ cannot be the property defining the horizontal axis. In contrast, by defining the horizontal axis with $\Delta L_Z$, then the two interconnected stages are able to have the same values for both $F_Z$ and $\Delta L_Z$ at the point of intersection. The point of intersection between two interconnected stages is determined with $F_Z$ thereby establishing the graphical location where the two interconnected stages must have the same $\Delta L_Z$. Then the data for the two interconnected stages are plotted based on the point of intersection whereby the data plot for one of the two interconnected stages begins at this point. The values of $\Delta L_Z$ for the axis are selected such that the difference between two values for the axis is greater than that between two plotted points for each stage. Referring to FIGS. 91-94, the values for $F_Z$ and $\Delta L_Z$ are selected such that the curved lines for all four stages fit on a single graph. Since $F_Z$ is computed in terms of $F_{1-4}$ and % $L_{1-4}$, then the values for $F_Z$ are dependent on the values for $F_{1-4}$ and % $L_{1-4}$ whereby the selected values for $F_{1-4}$ and % $L_{1-4}$ locate the curve line for each stage on the graph thereby determining where the curved line for one stage intersects that for the interconnected stage. The process of locating the curved lines for all four stages on the graph results in a series of four intersecting curved lines.

Henceforth, the curve line for each stage refers to each curved line. The graphical location of each curved line refers to the alignment of each curved line. The intersection between the curved lines for two interconnected stages refers to the curved line part for one stage intersecting that for the interconnected stage whereby the graphical location of each curved line refers to the graphical location of each curved line part. The graphical location of each curved line part refers to where the curved line for one stage intersects that for the interconnected stage and thereby the alignment of each curved line part. Referring to FIG. 96, there is shown the principle of tangency whereby for the upper straight line $SL_U$, the first curved line $C_1$ is tangent to the upper straight line $SL_U$ while the second, third, and fourth curved lines $C_{2-4}$ are not tangent to the upper straight line $SL_U$ therefore the four curved lines $C_{1-4}$ have a low degree of tangency and are "non-aligned"; whereas for the lower straight line $SL_L$, the four curved lines $C_{1-4}$ are tangent to the lower straight line $SL_L$ therefore the four curved lines $C_{1-4}$ have a high degree of tangency and are "aligned". The degree of tangency to a straight line refers to the alignment of each curved line part whereby the straight line defines a tangency line. The first graph shows the following plots: the curved line 66 for the fourth stage intersects the low end of the curved line 67 for the third stage at a suspension force $F_{1-4}$ of 1050 lbs, the curved line 67 for the third stage intersects the low end of the curved line 68 for the second stage at a suspension force $F_{1-4}$ of 1500 lbs, and the curved line 68 for the second stage intersects the low end of the curved line 69 for the first stage at a suspension force $F_{1-4}$ of 2000 lbs;

(9) the second graph refers to $SR_{1-4}$ and $\Delta L_Z$ for each stage and is shown in FIG. 97. The second graph is derived in the same manner as the first graph such that the values for $SR_Z$ and $\Delta L_Z$ are plotted on the vertical and horizontal axes whereby each point on each curved line is plotted on the second graph at the same $\Delta L_Z$ as that on the first graph shown in FIG. 95. After positioning each point for each stage according to $SR_{1-4}$, a curved line is drawn for each stage whereby the two curved lines for each pair of interconnected stages do not intersect thereby resulting in four independent non-intersecting curved lines on the graph. A lack of intersection among any two curved lines makes the four curved lines unsuitable for interpreting the spring rate for the four stage air shock on the basis of a single, smooth line; e.g., observe the thin, jagged dotted line 74 traced below the curved lines for the four stages.

In principle, the curved lines can be made to intersect in the same manner as that in the first graph shown in FIG. 95 by shifting the curved lines. Assume the curved line 70 for the fourth stage is the reference line and then the curved lines for the first, second, and third stages 71, 72, and 73 are shifted until the low point of the curved line for third stage 71 intersects the curved line for the fourth stage 70, the low point of the curved line for second stage 72 intersects the curved line for the third stage 71, and the low point of the curved line for first stage 73 intersects the curved line for the second stage 72. The curved lines can be shifted in two ways: (a) one, the curved lines can be shifted up by increasing the value of $SR_Z$ at each point on each curved line. The value of $SR_Z$ at each point on each curved line can be increased by increasing the values for $SR_{1-3}$ and/or % $L_{1-3}$. However, the values for $SR_{1-3}$ and/or % $L_{1-3}$ for each stage would have to be increased so much that the first, second, and third stages would not operate properly. For example, in order to shift the curved line for the third stage 71 up such that the low point of the curved line 71 intersects the curved line for the fourth stage 70, the spring rate at full extension for the third stage $SR_{31}$ would have to be 350 lbs/in. In order for $SR_{31}$ to be 350 lbs/in, then the values for $F_3$ and % $L_3$ would have to be equal to 2010 lbs and 100%, respectively. In effect, the third stage would operate similarly to the first stage; (b) two, the curved lines can be shifted to the left by shifting all points for each curved line to the left by the same amount. However, once the curved lines for the first, second, and third stages have been shifted to the left, the curved lines for the four stages would be so close together that interpreting the shape of a single smooth line that is traced along the curved line parts for the four stages is unreasonable. As a practical matter, the spring rate is based on an analysis of the graph derived from $F_Z$ rather than that from $SR_Z$.

Since the shapes of the four curved lines in the second graph are similar the those in the first graph, the spring rate for the four stage air shock is estimated on the basis of interpreting a single, smooth line from the four curved lines in the first graph;

(10) the third and fourth graphs refer to a copy of the first graph that is shown in FIG. 95 whereby the third and fourth graphs are shown in FIGS. 98 and 99, respectively. Values for $F_{1-4}$ and % $L_{1-4}$ are selected in an iterative guess-and-check method until a line traced along the series of four intersecting curved line parts is relatively straight. Changing the selected values for $F_{1-4}$ and % $L_{1-4}$ changes the graphical location of each curved line part whereby changing the graphical location of each curved line part changes where the curved line part for one stage intersects that for the interconnected stage and thereby changes the alignment of each curved line part. In effect, the graphical location is changed until each curved line part is tangent to a straight line. Referring to FIG. 98, the curved lines for the four stages 66-69 are tangent to the straight line SL thereby showing that each curved line part has a high degree of tangency, and therefore, is aligned. The alignment ensures that a relatively straight line is able to be traced along each curved line part. Referring to the graph in FIG. 99, a dotted line 75 is traced next to each curved line part beginning at the low end of the curved line 66 for the fourth stage which is at $F_{1-4}$ of 600 lbs, along the curved line 66 for the fourth stage to the intersection with the low end of the curved line 67 for the third stage, then along the curved line 67 for the third stage to the intersection with the low end of the curved line 68 for the second stage, then along the curved line 68 for the second stage to the intersection with the low end of the curved line 69 for the first stage, then along the curved line 69 for the first stage and ending at a point on the curved line 69 for the first stage which is at $F_{1-4}$ of 3333 lbs. The dotted line trace 75 results in a single, smooth line that is also a relatively straight line. This relatively straight line represents an estimate of the spring rate for the four stage air shock.

Application of the second methodology for the four stage air shock involves the following steps:

(1) defining the following properties of each stage: the suspension force at ride height, $F_n$, percent of shaft stroke uncompressed at ride height, % $L_n$, suspension force, $F_Z$, shaft stroke, $L_{D1}$, $L_{D2}$, $L_{D3}$, $L_{S1}$, incremental shaft stroke, $L_Z$ gas pressure, $P_Z$, volume of the shaft, $V_Z$, change in incremental shaft stroke, $\Delta L_Z$, gas charge, $P_{Gn}$, volume of the shaft at ride height, $V_n$, and shaft stroke at ride height, $L_n$;

(2) selecting values for the suspension force at ride height, $F_n$, percent of shaft stroke uncompressed at ride height, % $L_n$, shaft stroke, $L_{D1}$, $L_{D2}$, $L_{D3}$, $L_{S1}$, and incremental shaft stroke, $L_Z$, whereby the selected value for the shaft stroke $L_{D1}$, $L_{D2}$, $L_{D3}$, $L_{S1}$, can be based on the value of the shaft stroke $L_{S1}$, $L_{S2}$, $L_{S3}$, $L_{S4}$, that is computed with the one methodology above;

(3) computing a value for the suspension force, $F_Z$, as a product of a multiplication that is dependent on the incremental shaft stroke, $L_Z$, the dependency is defined by the multiplication including the gas pressure, $P_Z$, the gas pressure, $P_Z$, is computed as a quotient of a division that includes the volume of the shaft, $V_Z$, the volume of the shaft, $V_Z$, is computed as a product of a multiplication that includes the incremental shaft stroke, $L_Z$;

(4) computing a value for the change in incremental shaft stroke, $\Delta L_Z$, as a difference of a subtraction between the incremental shaft stroke, $L_Z$, at one selected value and that at another selected value;

(5) computing a value for the gas charge, $P_{Gn}$, as a quotient of a division that includes the suspension force at ride height, $F_n$, and is dependent on the shaft stroke, $L_{D1}$, $L_{D2}$, $L_{D3}$, $L_{S1}$, and percent of shaft stroke uncompressed at ride height, % $L_n$, the dependency is defined by the division including the volume of the shaft at ride height, $V_n$, the volume of the shaft at ride height, $V_n$, is computed as a product of a multiplication that includes the shaft stroke at ride height, $L_n$, the shaft stroke at ride height, $L_n$, is computed as a product of a multiplication that includes the shaft stroke $L_{D1}$, $L_{D2}$, $L_{D3}$, $L_{S1}$, and percent shaft stroke uncompressed at ride height, % $L_n$. In particular, the gas charge, $P_{Gn}$, determines the set-up for the four stage air shock;

(6) drawing a two-axis graph whereby the vertical axis is suspension force, $F_Z$, while the horizontal axis is a change in incremental shaft stroke, $\Delta L_Z$;

(7) plotting the computed values for the suspension force, $F_Z$, and change in incremental shaft stroke, $\Delta L_Z$, on the graph whereby each plot defines a curved line. The curved line describes the operation of each stage such that a part of the curved line describes the part of the suspension spring capability that is utilized in the operation of each stage;

(8) selecting values for the suspension force at ride height, $F_n$, and percent of shaft stroke uncompressed at ride height, % $L_n$, to compute the gas charge, $P_{Gn}$, such that part of the suspension spring capability is utilized in the operation of each stage. The part of the suspension spring capability that is utilized in the operation of each stage is depicted by the fourth stage being partially compressed before the third stage begins to compress, the third stage being partially compressed before the second stage begins to compress, and the second stage being partially compressed before the first stage begins to compress. The fourth stage being partially compressed before the third stage begins to compress, the third stage being partially compressed before the second stage begins to compress, and the second stage being partially compressed before the first stage begins to compress are described on the graph as a series of four intersecting curved lines 66-69, one curved line for each stage. The series of four intersecting curved lines 66-69 can be depicted as a gradually sloping part of the curved line for the fourth stage 66 intersecting a gradually sloping part of the curved line for the third stage 67, the gradually sloping part of the curved line for the third stage 67 intersecting a gradually sloping part of the curved line for the second stage 68, and the gradually sloping part of the curved line for the second stage 68 intersecting a gradually sloping part of the curved line for the first stage 69 whereby the gradually sloping part of the curved line for one stage intersecting that for another stage defines a series of four intersecting curved line parts on the graph. Selecting values for the suspension force at ride height, $F_n$, and percent of shaft stroke uncompressed at ride height, % $L_n$, locates the gradually sloping part of each curved line on the graph. The location of the gradually sloping part of each curved line depicts an alignment of the gradually sloping part of each curved line. The alignment defines a given amount of tangency to a straight line whereby the straight line defines a tangency line. The location of the gradually sloping part of each curved line defines where the gradually sloping part of the curved line for the fourth stage 66 intersects the gradually sloping part of the curved line for the third stage 67, where the gradually sloping part of the curved line for the third stage 67 intersects the gradually sloping part of the curved line for the second stage 68, and where the gradually sloping part of the curved line for the second stage 68 intersects the gradually sloping part of the curved line for the first stage 69. Changing the selected values for the suspension force at ride height, $F_n$, and percent of shaft stroke uncompressed at ride height, % $L_n$, changes where the gradually sloping part of the curved line for the fourth stage 66 intersects the gradually sloping part of the curved line for the third stage 67, where the gradually sloping part of the curved line for the third stage 67 intersects the gradually sloping part of the curved line for the second stage 68, and where the gradually sloping part of the curved line for the second stage 68 intersects the gradually sloping part of the curved line for the first stage 69 and thereby changes the alignment of the gradually sloping part of each curved line;

(9) changing the values for the suspension force at ride height, $F_n$, and percent of shaft stroke uncompressed at ride height, % $L_n$, in an iterative guess-and-check method in order to change the locations of the gradually sloping part of each curved line until the gradually sloping part of each curved line is aligned. The values for suspension force at ride height, $F_n$, and percent of shaft stroke uncompressed at ride height, % $L_n$, that serve to align the gradually sloping part of each curved line also determine the gas charge, $P_{Gn}$, to set-up the four stage air shock;

(10) tracing a line next to the gradually sloping part of each curved whereby the line trace represents an estimate of the spring rate. Once the gradually sloping part of each curved line is aligned with the tangency line, then the line trace is substantially straight thereby indicating a substantially linear spring rate for the four stage air shock.

Conclusions of the application of the second methodology for the four stage air shock include:

(1) the operation of the four stages is described as a series of four intersecting curved lines. The intersections among the four curved lines indicate that the entire progressive suspension spring capability of each stage is not utilized in the operation of each stage. Specifically, the intersection of the: (a) curved lines 67 and 66 for the third and fourth stages at the suspension force $F_{1-4}$ of 1050 lbs indicates that the fourth stage has been compressed to 57% of shaft stroke $L_{4h}$ before the third stage begins to compress, and results in the stiff part of the suspension spring capability for the fourth stage being avoided as the soft part of the suspension spring capability for third stage begins to react to the suspension force $F_{1-4}$, (b) curved lines 68 and 67 for the second and third stages at a suspension force $F_{1-4}$ of 1500 lbs indicates that the third stage has been compressed to 70% of shaft stroke $L_{3g}$ before the second stage begins to compress, and results in the stiff part of the suspension spring capability for the third stage being avoided as the soft part of the suspension spring capability for second stage begins to react to the suspension force $F_{1-4}$, and (c) curved lines 69 and 68 for the first and second stages at a suspension force $F_{1-4}$ of 2000 lbs indicates that the second stage has been compressed to 75% of shaft stroke $L_{2f}$ before the first stage begins to compress, and results in the stiff part of the suspension spring capability for the second stage being avoided as the soft part of the suspension spring capability for the first stage begins to react to the suspension force $F_{1-4}$. In effect, the curved line describes the suspension spring capability for each stage while a part of the curved line describes a part of the suspension spring capability for each stage. Since for all four stages the gradually sloping part of the curved line for one stage intersects that for the other interconnecting stage, then the soft part of the suspension spring capability is utilized in the operation of each stage;

(2) the combined effect of the suspension spring capabilities of the four stages defines the suspension spring capability of the four stage air shock whereby the series of four intersecting curved lines describes to the operation of the four stage air shock. Since each stage operates independently of the other stages and since the suspension force exerted on each stage is the same, then the shaft for each stage will move according to the part of each stage's suspension spring capability that is being utilized regardless of the movements by the shafts for the other stages. Given that the soft part of each stage's suspension spring capability is utilized in the operation of each stage, then only the soft part of each stage's suspension spring capability is utilized in the suspension spring capability of the four stage air shock. In effect, the suspension spring capability of the four stage air shock is defined by the combined effect of the soft part of each stage's suspension spring capability;

(3) this second methodology allows a person to tune the multiple stage air shock. By adjusting the gas charge for each stage, a person can select which part of the progressive suspension spring capability will be utilized in the operation of each stage. For example, if the multiple stage air shock reacts too harshly against suspension forces, the gas charge for each stage can be decreased. The amount of the decrease in gas charge for each stage can be determined with the iterative guess-and-check method of selecting values for $F_{1-4}$ and % $L_{1-4}$. A graphical analysis of this decrease would appear as each plot intersecting at a point lower on the curved line for each stage—in effect the slope of the linear spring rate would be decreased. Conversely, if the multiple stage air shock reacts too softly against suspension forces, the gas charges for each stage can be increased, and the opposite analysis on a graph would appear;

Note: referring to FIGS. 84-94, the properties and values listed therein are selected for purposes of discussion only and are not meant to imply proper values for any stage in a multiple stage air shock.

Referring to FIGS. 100-102, there is shown a means for changing the linearity of the spring rate for a three or four stage air shock, in this case emphasizing that the means can make the spring rate for the multiple stage air shock more linear, the means being an attribute of the second methodology.

Each figure illustrates a set of three, four, or five circles whereby each set represents a graphical description of the multiple stage air shock comprising three, four, or five stages, respectively. The three, four, or five circles in each set are represented by $C_{3-5}$, whereby each circle defines the curved line for each stage in the three, four, or five stage air shock, respectively. Each circle in each set intersects the adjacent circle such that each set of three, four, or five circles defines a series of three, four, or five intersecting curved lines, respectively: the set of four circles represents a graphical description of adding a new first stage to the three stage air shock such that a new first curved line is added to a series of three intersecting curved lines thereby transforming the series of three intersecting curved lines into a series of four intersecting curved lines; while the set of five circles represents a graphical description of adding a new first stage to the four stage air shock such that a new first curved line is added to a series of four intersecting curved lines thereby transforming the series of four intersecting curved lines into a series of five intersecting curved lines.

Each circle has the same diameter D; also the circles in each set are aligned both horizontally and vertically. The horizontal solid lines $SL_{3-5}$ refer to tangency lines while the vertical dashed lines $R_L$, and $R_U$ refer to a given range of the change in incremental shaft stroke whereby each set of circles occupy the same range. The horizontal dashed line $l_{3-5}$ in each set of circles shows where each circle in a set intersects the adjacent circle thereby indicating the distance between the two points of intersection on each circle, the distance between the two points of intersection on each circle is represented by the bracket $b_{3-5}$. The bracket $b_{3-5}$ depicts a part of each circle such that the part of each circle defines the curved line part for each stage whereby the curved line part for each stage describes the part of the suspension spring capability that is utilized in the operation of each stage.

Inspection of the sets of circles reveals that as the number of circles increases from three to four to five, then the size of the brackets $b_{3-5}$ decreases thereby depicting that the distance between the two points of intersection on each circle also decreases. Since each: (a) circle has the same diameter, then the decrease in the distance between the two points of intersection on each circle is not due to a change in the curvature of each circle and (b) set of circles occupy the same range of the change in incremental shaft stroke, then the decrease in the distance between the two points of intersection on each circle is not due to squeezing the circles closer together by decreasing the range. Instead of (a) or (b), the decrease in the distance between the two points of intersection on each circle is due to increasing the number of circles within the range whereby the increase acts to squeeze the circles closer together in order to fit within the range. Squeezing the circles closer together moves the two points of intersection on each circle closer to the tangency line $SL_{3-5}$ whereby this movement causes a decrease in the distance between the horizontal dashed line $l_{3-5}$ and tangency line $SL_{3-5}$.

The decrease in the size of each bracket $b_{3-5}$ indicates that the part of each circle is less curved whereby less curved is depicted as flatter. This flattening of the part of each circle is confirmed by the decrease in the distance between the horizontal dashed line $l_{3-5}$ and tangency line $SL_{3-5}$ for each set of circles. The flattening of the part of each circle indicates that the curved line part for each stage becomes flatter. A flatter curved line part for each stage indicates a decrease in the part of the suspension spring capability that is utilized in the operation of each stage, and that the curved line part is less curved, i.e., straighter. Since the curved line part for each stage becomes straighter, then a line that is traced over the curved line part for each stage would become straighter and thereby indicates that the spring rate for the multiple stage air shock becomes more linear, i.e., straighter with the addition of another stage. In effect, the decrease in the part of the suspension spring capability that is utilized in the operation of each stage indicates that a smaller part of the progressive spring rate for each stage contributes to the spring rate for the multiple stage air shock. This analysis also suggests that, assuming other factors are equivalent, for a given multiple stage air shock, the spring rate can be made more linear as the number of stages increases.

While the invention has been illustrated and described as a process for constructing a multiple stage shock absorber, it is not intended to be limited to the details shown, since it will be understood that various omissions, modifications, substitutions and changes in the forms and details of the device illustrated and in its operation can be made by those skilled on the art without departing in any way from the scope and spirit of the present invention.

What is claimed is:

1. A process for constructing a multiple stage air shock, the process comprising the steps of:
    providing
        a plurality of dual function shafts, each dual function shaft having a dual function shaft cylinder-like structure with a dual function shaft closed end and a dual function shaft open end, a dual function shaft working piston an attached to the dual function shaft closed end, a dual function shaft end cap configured as a seal attached to the dual function shaft open end, and
        a dual function shaft cell in the dual function shaft cylinder-like structure between the dual function shaft closed end and the dual function shaft open end, the dual function shaft cell housing a dual function shaft cell gas and a dual function shaft cell oil;
    providing
        a first stage working tube having a first stage cylinder-like structure with a first stage closed end with an attached eyelet and a first stage open end with a first stage end cap configured as a seal, and
        a first stage cell in the first stage cylinder-like structure of the first stage working tube between the first stage closed end and the first stage open end of the first stage working tube, the first stage cell housing a first stage cell gas and a first stage cell oil,
        wherein the first stage working tube is configured to slidably receive the dual function shaft;
    providing
        a final stage shaft having a final stage cylinder-like structure with a first final stage closed end and a second final stage closed end,
        a final stage shaft working piston attached to the first final stage closed end, and
        wherein the final stage shaft is configured to slide into and out of the dual function shaft;
    selecting a multiple stage air shock linear spring rate;
    determining a number of stages for the multiple stage air shock, wherein connecting the first stage working tube to the dual function shaft comprises a first stage air shock with a first stage air shock spring rate, connecting the final stage shaft to the dual function shaft comprises a final stage air shock with a final stage air shock spring rate, and connecting two dual function shafts comprises an interconnecting stage air shock with an interconnecting stage air shock spring rate;
    calculating a number of interconnecting stages for the multiple stage air shock;
    connecting the first stage working tube, at least one dual function shaft, and the final stage shaft to create the multiple stage air shock with a non-calibrated multiple stage air shock spring rate; and
    linearizing the non-calibrated multiple stage air shock spring rate to the multiple stage air shock linear spring rate by adjusting the first stage air shock spring rate, at least one interconnecting stage air shock spring rate, and the final stage air shock spring rate.

2. A process for constructing a multiple stage shock comprising the steps of:
    providing a first dual function shaft comprising
        a first dual function shaft cylinder-like structure with a first dual function shaft first end and a first dual function shaft second end,
        a first dual function shaft working piston attached to the first dual function shaft first end, and
        a first dual function shaft cell in the first dual function shaft cylinder-like structure between the first dual function shaft first end and the first dual function shaft second end, the first dual function shaft cell housing a first dual function shaft cell gas having a first dual function shaft spring rate;
    providing a first stage working tube comprising
        a first stage working tube cylinder-like structure with a first stage working tube first end and a first stage working tube second end, and
        a first stage working tube cell in the first stage working tube cylinder-like structure between the first stage working tube first end and the first stage working tube second end, the first stage working tube cell housing a first stage working tube cell gas having a first stage working tube spring rate; and
    providing a final stage shaft comprising
        a final stage shaft cylinder-like structure with a final stage shaft first end and a final stage shaft second end, and
        a final stage shaft working piston attached to the final stage shaft first end; connecting the first stage working tube, the first dual function shaft, and the final stage shaft to create the multiple stage shock with a non-calibrated multiple stage shock spring rate;
    selecting a multiple stage shock linear spring rate; and
    linearizing the non-calibrated multiple stage shock spring rate to the multiple stage shock linear spring rate by adjusting the first dual function shaft spring rate and the first stage working tube spring rate.

3. The process for constructing multiple stage shock of claim 1, further comprising the steps of:
    providing a second dual function shaft comprising
        a second dual function shaft cylinder-like structure with a second dual function shaft first end and a second dual function shaft second end,
        a second dual function shaft working piston attached to the second dual function shaft first end, and
        a second dual function shaft cell in the second dual function shaft cylinder-like structure between the second dual function shaft first end and the second dual function shaft second end, the second dual function shaft cell housing a second dual function shaft cell gas having a second dual function spring rate; and
    connecting the first stage working tube, the first dual function shaft, the second dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, and the second dual function spring rate.

4. The process for constructing the multiple stage shock of claim 3, further comprising the steps of:

providing a third dual function shaft comprising a third dual function shaft cylinder-like structure with a third dual function shaft first end and a third dual function shaft second end, a third dual function shaft working piston attached to the third dual function shaft first end, and a third dual function shaft cell in the third dual function shaft cylinder-like structure between the third dual function shaft first end and the third dual function shaft second end, the third dual function shaft cell housing a third dual function shaft cell gas having a third dual function shaft spring rate;

connecting the first stage working tube, the first dual function shaft, the second dual function shaft, the third dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, the second dual function spring rate, and the third dual function shaft spring rate.

5. The process for constructing the multiple stage shock of claim 4, further comprising the steps of:

providing a fourth dual function shaft comprising a fourth dual function shaft cylinder-like structure with a fourth dual function shaft first end and a fourth dual function shaft second end, a fourth dual function shaft working piston attached to the fourth dual function shaft first end, and a fourth dual function shaft cell in the fourth dual function shaft cylinder-like structure between the fourth dual function shaft first end and the fourth dual function shaft second end, the fourth dual function shaft cell housing a fourth dual function shaft cell gas having a fourth dual function shaft spring rate;

connecting the first stage working tube, the first dual function shaft, the second dual function shaft, the third dual function shaft, the fourth dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, the second dual function spring rate, the third dual function shaft spring rate, and the fourth dual function shaft spring rate.

6. A process for constructing a multi-stage shock comprising the steps of:

providing a first dual function shaft comprising a first dual function shaft cylinder-like structure with a first dual function shaft closed end and a first dual function shaft open end, a first dual function shaft working piston attached to the first dual function shaft closed end, and a first dual function shaft cell in the first dual function shaft cylinder-like structure between the first dual function shaft closed end and the first dual function shaft open end, the first dual function shaft cell housing a first dual function shaft cell gas and a first dual function shaft cell oil having a first dual function shaft spring rate;

providing a first stage working tube comprising a first stage working tube cylinder-like structure with a first stage working tube closed end and a first stage working tube open end, a first stage working tube cell in the first stage working tube cylinder-like structure between the first stage working tube closed end and the first stage working tube open end housing a first stage working tube cell gas and a first stage working tube cell oil having a first stage working tube spring rate;

providing a final stage shaft comprising a final stage shaft cylinder-like structure with a final stage shaft first closed end and a final stage shaft second closed end, and a final stage shaft working piston attached to the final stage shaft first closed end; and connecting the first stage working tube, the first dual function shaft, and the final stage shaft to create the multiple stage shock with a non-calibrated multiple stage shock spring rate;

selecting a multiple stage shock linear spring rate; and linearizing the non-calibrated multiple stage shock spring rate to the multiple stage shock linear spring rate by adjusting the first dual function shaft spring rate and the first stage working tube spring rate.

7. The process for constructing the multi-stage shock of claim 6, further comprising the steps of:

providing a second dual function shaft comprising a second dual function shaft cylinder-like structure with a second dual function shaft closed end and a second dual function shaft open end, a second dual function shaft working piston attached to the second dual function shaft closed end, and a second dual function shaft cell in the second dual function shaft cylinder-like structure between the second dual function shaft closed end and the second dual function shaft open end, the second dual function shaft cell housing a second dual function shaft cell gas and a second dual function shaft cell oil having a second dual function shaft spring rate; and connecting the first stage working tube, the first dual function shaft, the second dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, and the second dual function spring rate.

8. The process for constructing the multi-stage shock of claim 7, further comprising the steps of:

providing a third dual function shaft comprising a third dual function shaft cylinder-like structure with a third dual function shaft closed end and a third dual function shaft open end, a third dual function shaft working piston attached to the third dual function shaft closed end, and a third dual function shaft cell in the third dual function shaft cylinder-like structure between the third dual function shaft closed end and the third dual function shaft open end, the third dual function shaft cell housing a third dual function shaft cell gas and a third dual function shaft cell oil having a third dual function shaft spring rate;

connecting the first stage working tube, the first dual function shaft, the second dual function shaft, the third dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, the second dual function spring rate, and the third dual function shaft spring rate.

9. The process for constructing the multi-stage shock of claim 8, further comprising the steps of:

providing a fourth dual function shaft comprising
- a fourth dual function shaft cylinder-like structure with a fourth dual function shaft closed end and a fourth dual function shaft open end,
- a fourth dual function shaft working piston attached to the fourth dual function shaft closed end, and
- a fourth dual function shaft cell in the fourth dual function shaft cylinder-like structure between the fourth dual function shaft closed end and the fourth dual function shaft open end, the fourth dual function shaft cell housing a fourth dual function shaft cell gas and a fourth dual function shaft cell oil having a fourth dual function shaft spring rate;

connecting the first stage working tube, the first dual function shaft, the second dual function shaft, the third dual function shaft, the fourth dual function shaft, and the final stage shaft to create the multiple stage shock with the non-calibrated multiple stage shock spring rate; and linearizing the non-calibrated multiple stage shock spring rate to the multiple stage shock linear spring rate by adjusting the first dual function shaft spring rate, the first stage working tube spring rate, the second dual function spring rate, the third dual function shaft spring rate, and the fourth dual function shaft spring rate.

\* \* \* \* \*